(12) United States Patent
Potter et al.

(10) Patent No.: US 12,070,159 B2
(45) Date of Patent: Aug. 27, 2024

(54) FOOD PROCESSING APPARATUS AND METHOD

(71) Applicant: SharkNinja Operating LLC, Needham, MA (US)

(72) Inventors: Daniel Stephen Potter, Seabrook, NH (US); Devin Joseph Coakley, Bellingham, MA (US); Michael Joseph Smith, Arlington, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/142,247

(22) Filed: May 2, 2023

(65) Prior Publication Data

US 2023/0270290 A1   Aug. 31, 2023

Related U.S. Application Data

(60) Division of application No. 17/126,876, filed on Dec. 18, 2020, now Pat. No. 11,638,500, which is a division of application No. 15/903,803, filed on Feb. 23, 2018, now Pat. No. 10,869,577, which is a continuation of application No. 14/324,014, filed on Jul. 3, 2014, now Pat. No. 9,924,838.

(51) Int. Cl.
| | |
|---|---|
| *A47J 43/00* | (2006.01) |
| *A47J 43/07* | (2006.01) |
| *A47J 43/08* | (2006.01) |

(52) U.S. Cl.
CPC ....... *A47J 43/0727* (2013.01); *A47J 43/0705* (2013.01); *A47J 43/0716* (2013.01); *A47J 43/082* (2013.01); *A47J 43/085* (2013.01); *A47J 43/087* (2013.01)

(58) Field of Classification Search
CPC ...... A47J 43/082; A47J 43/085; A47J 43/087; A47J 43/0705; A47J 43/0727
See application file for complete search history.

(56) References Cited

U.S. PATENT DOCUMENTS

| | | | |
|---|---|---|---|
| 1,431,715 | A | 10/1922 | Wolters |
| 2,187,272 | A | 1/1940 | Kochner |
| 2,687,284 | A | 8/1954 | Gerber et al. |
| 2,710,098 | A | 6/1955 | Tilton |
| 2,727,395 | A | 12/1955 | White |

(Continued)

FOREIGN PATENT DOCUMENTS

| | | |
|---|---|---|
| CN | 2536169 | 2/2003 |
| CN | 201082133 | 7/2008 |

(Continued)

*Primary Examiner* — Faye Francis
(74) *Attorney, Agent, or Firm* — The Webb Law Firm

(57) ABSTRACT

Food processing apparatuses having a drive unit which has more than one mode of operation, works with more than one food processing container, and/or may be operated in more than orientation are disclosed. The drive unit may be operated in first and second modes of operation. In some embodiments, the drive unit may be actuated in a different manner in the second mode of operation as compared to the first mode of operation. In some embodiments, the orientation of the drive unit in the second mode of operation is vertically flipped upside-down as compared to the orientation of the drive unit in the first mode of operation.

9 Claims, 45 Drawing Sheets

(56) References Cited

U.S. PATENT DOCUMENTS

| | | |
|---|---|---|
| 2,730,901 A | 1/1956 | Ripple |
| 2,762,613 A | 9/1956 | Burton |
| 2,801,545 A | 8/1957 | Schottle |
| 2,833,576 A | 5/1958 | Cirone |
| 2,841,723 A | 7/1958 | Corbett |
| 2,864,257 A | 12/1958 | Lappin et al. |
| 3,279,265 A | 10/1966 | Braun et al. |
| 3,704,864 A | 12/1972 | Lee |
| 4,135,828 A | 1/1979 | Cabak |
| 4,325,643 A | 4/1982 | Scott et al. |
| 4,480,926 A | 11/1984 | Lattery, Jr. et al. |
| 4,708,487 A | 11/1987 | Marshall |
| 4,738,858 A | 4/1988 | Mukouyama et al. |
| 4,863,278 A | 9/1989 | Otto |
| 4,957,373 A * | 9/1990 | Derksen ............ B01F 27/808 366/206 |
| 5,129,589 A | 7/1992 | Papaleo et al. |
| 5,360,170 A | 11/1994 | Cartellone |
| 5,533,801 A | 7/1996 | Safont et al. |
| 5,979,806 A | 11/1999 | Borger |
| 6,000,650 A | 12/1999 | Peñaranda et al. |
| 6,089,746 A | 7/2000 | Martin |
| 6,189,441 B1 | 2/2001 | Beaudet et al. |
| 6,258,394 B1 | 7/2001 | Hochstein et al. |
| 6,640,698 B2 | 11/2003 | Pavlovic et al. |
| 6,641,298 B2 | 11/2003 | Safont et al. |
| 6,672,757 B2 | 1/2004 | Hallett, Jr. |
| 6,758,592 B2 | 7/2004 | Wulf |
| 6,802,641 B2 | 10/2004 | Ladatto et al. |
| 6,817,750 B1 | 11/2004 | Sands |
| 7,066,640 B2 | 6/2006 | Sands |
| 7,395,751 B2 | 7/2008 | Liu |
| 7,419,111 B2 | 9/2008 | Gursel |
| 7,430,957 B2 | 10/2008 | Sands |
| 7,441,944 B2 | 10/2008 | Sands |
| 7,476,018 B2 | 1/2009 | McGill et al. |
| 7,520,659 B2 | 4/2009 | Wulf et al. |
| 7,677,485 B2 | 3/2010 | Gursel |
| 7,841,764 B2 | 11/2010 | Wulf et al. |
| 7,958,819 B2 | 6/2011 | Sands |
| 7,993,054 B2 | 8/2011 | Wulf et al. |
| 8,353,620 B2 | 1/2013 | Ogrizek et al. |
| 8,376,253 B2 | 2/2013 | Oblak et al. |
| 8,382,018 B2 | 2/2013 | Oblak et al. |
| 8,469,586 B2 * | 6/2013 | Schleinzer ............ A47J 43/046 366/205 |
| 2002/0078834 A1 | 6/2002 | Thackray |
| 2003/0132236 A1 | 7/2003 | Safont et al. |
| 2005/0078549 A1 | 4/2005 | Hamelin |
| 2005/0185507 A1 | 8/2005 | Beesley |
| 2008/0093883 A1 | 4/2008 | Shibata et al. |
| 2009/0158941 A1 | 6/2009 | Lee et al. |
| 2010/0005977 A1 | 1/2010 | Menashes |
| 2010/0107893 A1 | 5/2010 | Goodrick-Meech |
| 2012/0085851 A1 | 4/2012 | Allen |
| 2012/0152131 A1 | 6/2012 | Sands |
| 2012/0167712 A1 | 7/2012 | Cheung et al. |
| 2014/0042255 A1 | 2/2014 | Allen |
| 2018/0177341 A1 | 6/2018 | Potter et al. |

FOREIGN PATENT DOCUMENTS

| | | | |
|---|---|---|---|
| CN | 101461674 | 6/2009 | |
| CN | 101467848 | 7/2009 | |
| CN | 102368937 | 3/2012 | |
| CN | 202653893 | 1/2013 | |
| CN | 103848089 | 6/2014 | |
| CN | 205041273 | 2/2016 | |
| DE | 1859343 | 10/1962 | |
| DE | 1529235 | 7/1969 | |
| DE | 2000171 | 7/1971 | |
| DE | 29602684 | 6/1996 | |
| DE | 19732261 | 1/1999 | |
| DE | 202011101707 | 9/2011 | |
| DE | 102011077334 | 12/2011 | |
| EP | 0257732 | 3/1988 | |
| EP | 0529287 | 3/1993 | |
| EP | 1586259 | 10/2005 | |
| EP | 1839545 | 10/2007 | |
| EP | 2394546 | 12/2011 | |
| FR | 2725383 | 4/1996 | |
| GB | 726460 | 3/1955 | |
| GB | 752247 | 7/1956 | |
| GB | 773492 | 4/1957 | |
| GB | 957475 | 5/1964 | |
| GB | 995612 | 6/1965 | |
| GB | 2030010 | 3/1980 | |
| GB | 2287176 | 9/1995 | |
| GB | 2347094 | 8/2000 | |
| GB | 2456045 | 7/2009 | |
| JP | 2010251076 | 11/2010 | |
| KR | 19980010667 | 4/1998 | |
| KR | 20050022255 | 3/2005 | |
| SE | 159678 | 7/1957 | |
| WO | WO8204407 | * 12/1982 | ............ A47J 43/046 |
| WO | 1996010943 | 4/1996 | |
| WO | 2000048498 | 8/2000 | |
| WO | 2009021842 | 2/2009 | |

\* cited by examiner

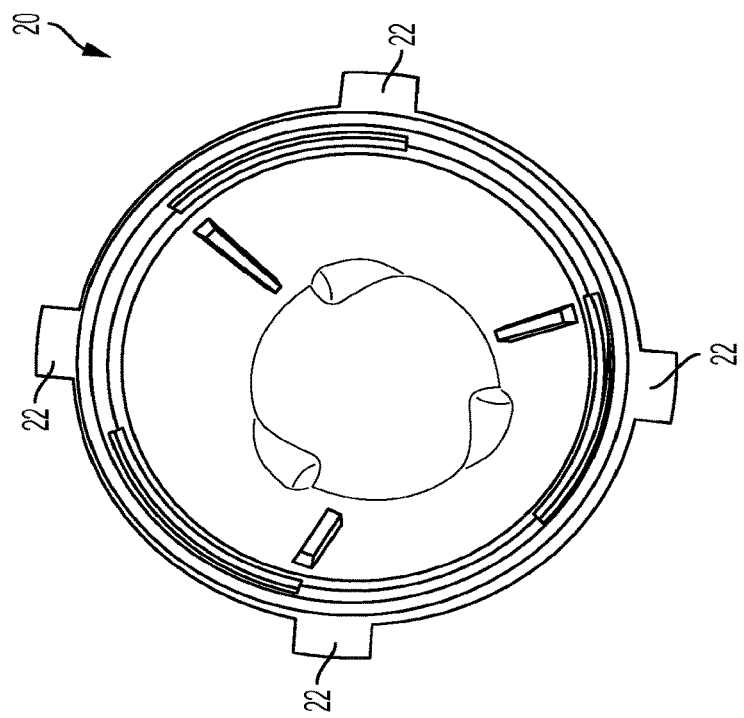
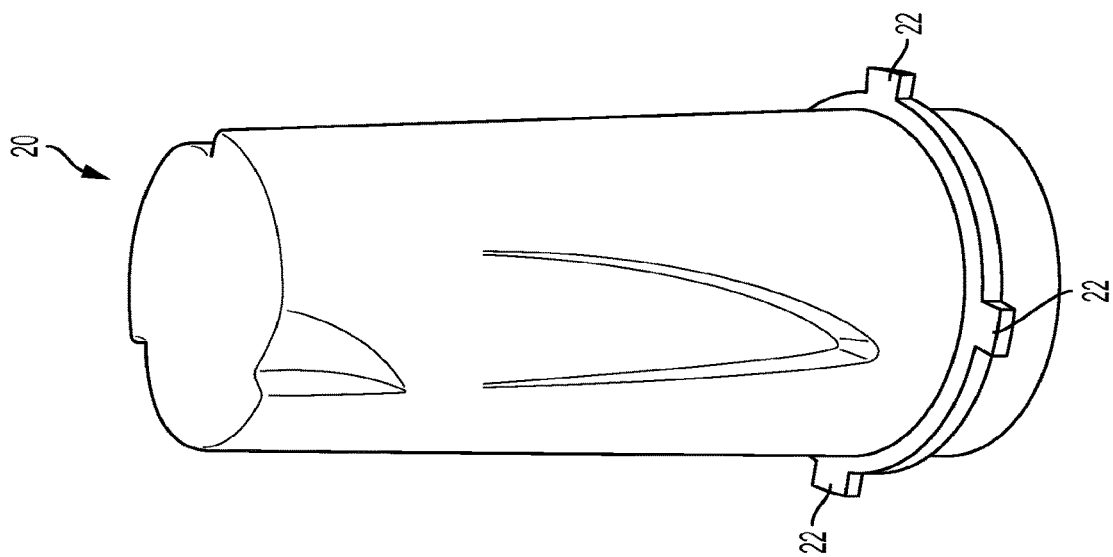
FIG. 8B
FIG. 8A

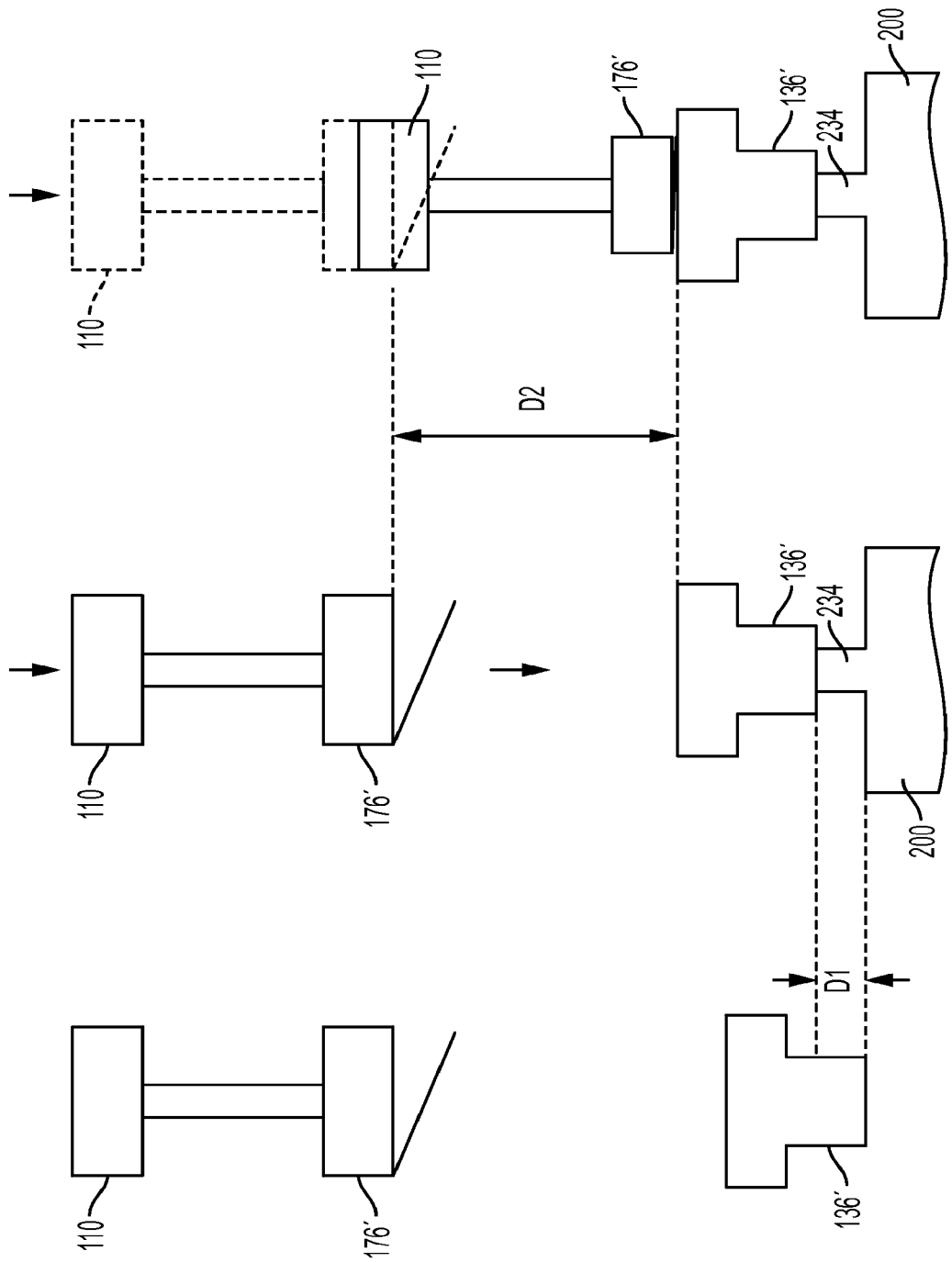

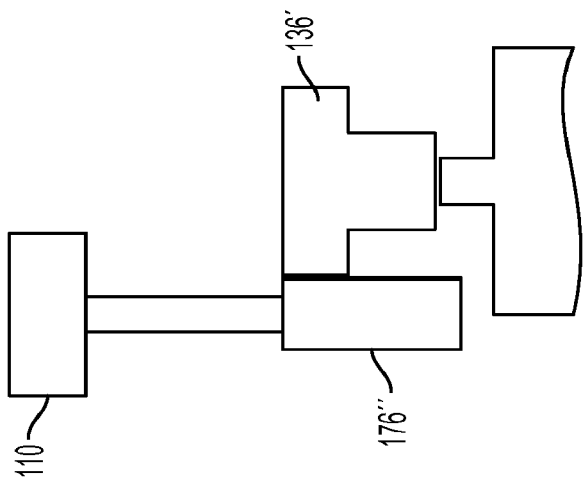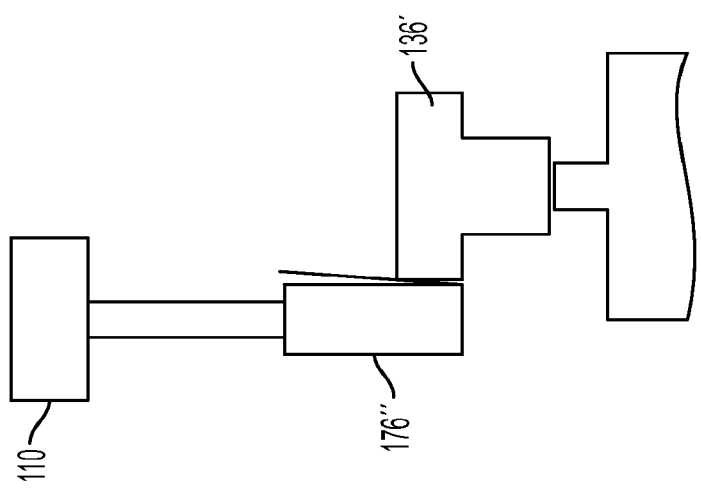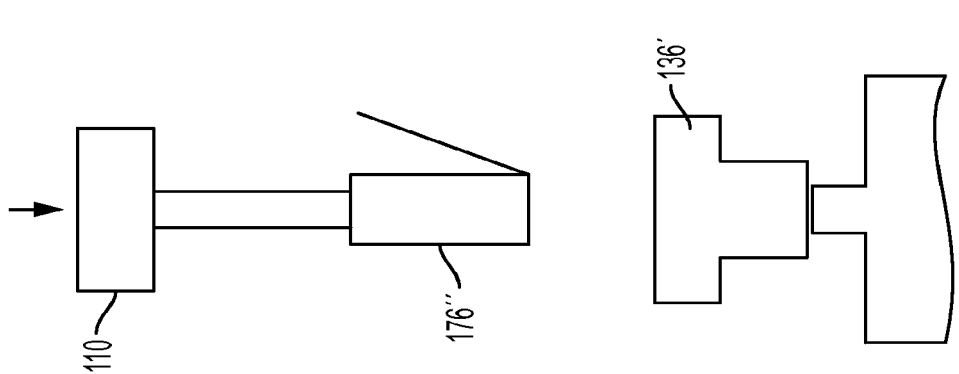

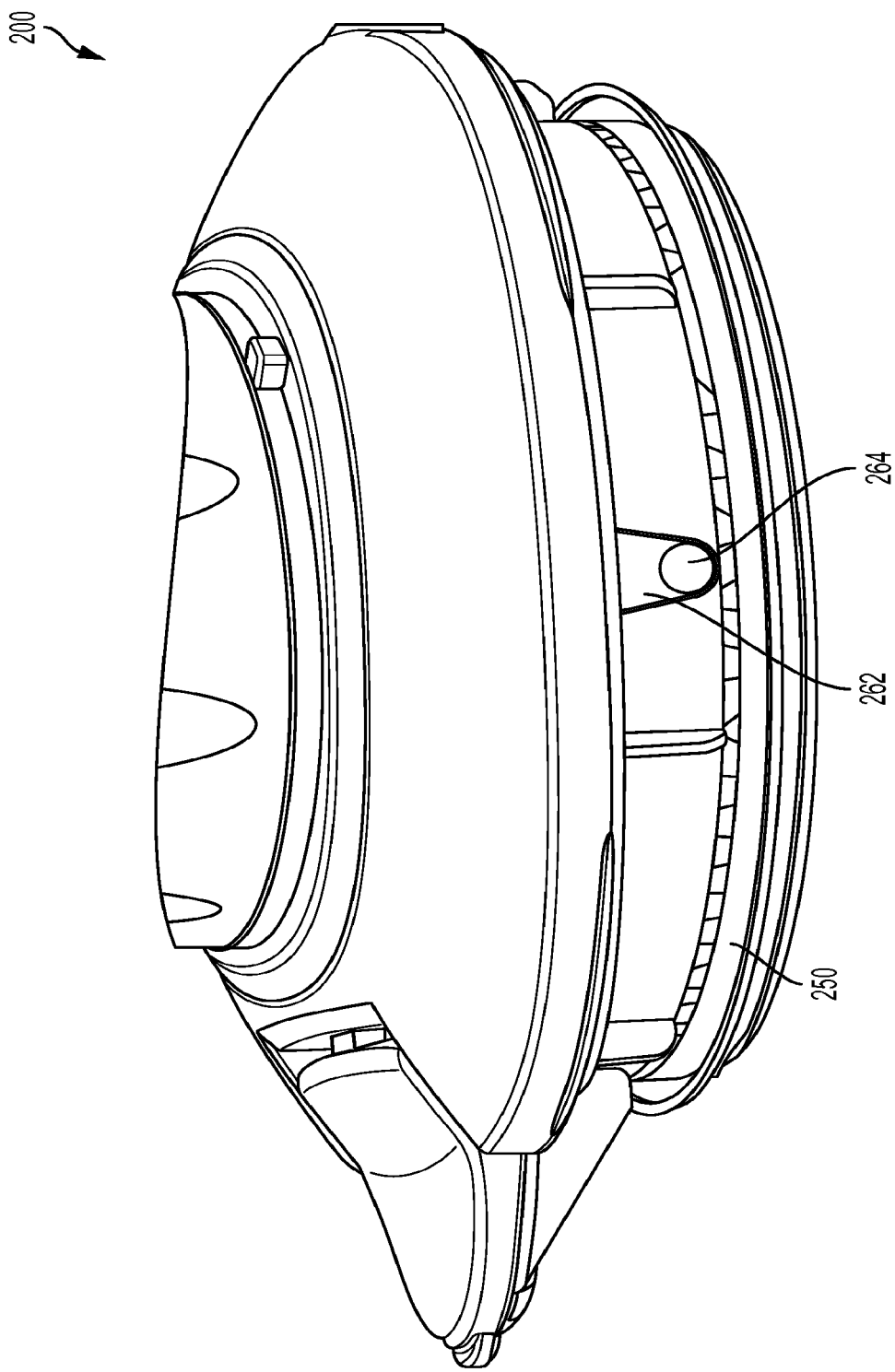

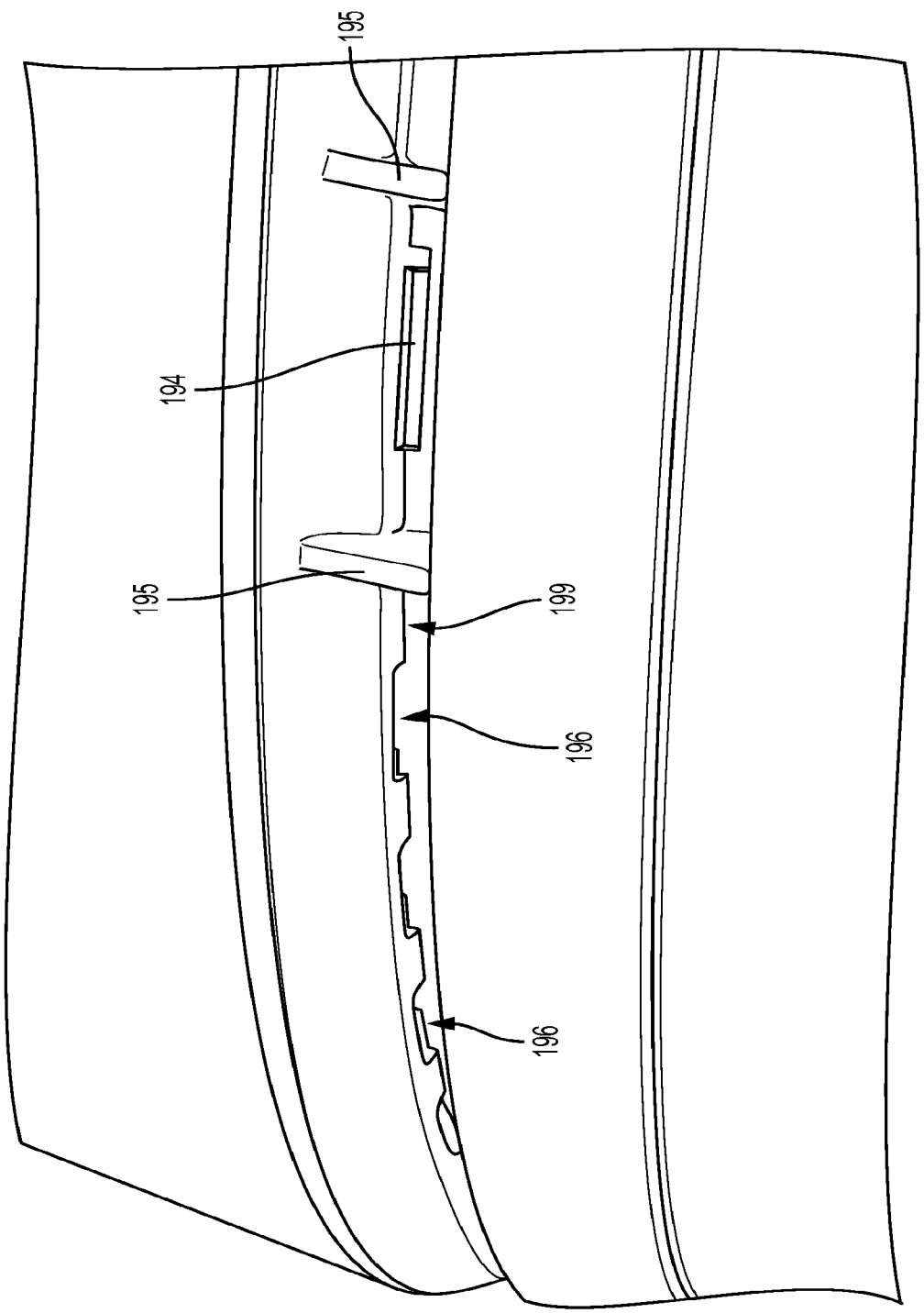

FOOD PROCESSING APPARATUS AND METHOD

CROSS-REFERENCE TO RELATED APPLICATIONS

This application is a Divisional of U.S. application Ser. No. 17/126,876 filed Dec. 18, 2020, entitled FOOD PROCESSING APPARATUS AND METHOD, which in turn is a Divisional of U.S. application Ser. No. 15/903,803 filed Feb. 23, 2018 (now patented as U.S. Pat. No. 10,869,577), which in turn is a Continuation of U.S. Non-Provisional application Ser. No. 14/324,014 filed Jul. 3, 2014 (now patented as U.S. Pat. No. 9,924,838), all of which are incorporated herein by reference in their entirety for all purposes.

FIELD

Aspects herein generally relate to a food processing apparatus and to a method of processing food using a food processing apparatus. More specifically, aspects disclosed herein relate to a drive unit that can be used to drive different processing tools in more than one mode of operation, with different food processing containers, and/or in more than one orientation.

DISCUSSION OF RELATED ART

Food processors such as blenders use a drive unit to spin one or more blades to process food. Many food processors have a drive unit that supports a food processing container.

SUMMARY

According to one illustrative embodiment, a food processing apparatus includes a drive unit configured to drive a processing tool, a first container, a second container, a first activation site to permit actuation of the drive unit and a second activation site to permit actuation of the drive unit. The first activation site is positioned at a different location than the second activation site. The drive unit is useable in a first mode of operation with the first container and is useable in a second mode of operation with the second container. In the first mode of operation, the first container supports the drive unit, and user interaction with the first activation site actuates the drive unit. In the second mode of operation, the drive unit supports the second container, and user interaction with the second activation site actuates the drive unit.

According to another illustrative embodiment, a food processing apparatus includes a drive unit configured to drive a processing tool, a first activation site to permit actuation of the drive unit, a first container, and a second container. The drive unit is useable in a first mode of operation with the first container and is useable in a second mode of operation with the second container. In the first mode of operation, the first activation site is accessible by a user. In the second mode of operation, a user is prevented from activating the first activation site when the drive unit is placed in an upright position on a flat support surface.

According to yet another illustrative embodiment, a food processing apparatus includes a drive unit configured to drive a processing tool and a first container including a lid, a bottom surface, and a sidewall. A food-containing volume is defined between the lid, the bottom surface, and the sidewall, and the lid interfaces with the drive unit. The drive unit includes a first alignment feature and the lid includes a second alignment feature that cooperates with the first alignment feature such that, upon placing the drive unit onto the lid, contact between the first and second alignment features and a weight of the drive unit causes the drive unit to move toward an aligned orientation relative to the lid.

According to yet another illustrative embodiment, drive unit configured to drive a processing tool includes first and second activators, the drive unit being useable in a first mode of operation with a first container and being useable in a second mode of operation with a second container. In the first mode of operation, the first container supports the drive unit, and triggering of the first activator actuates the drive unit. In the second mode of operation, the drive unit supports the second container, and triggering of the second activator actuates the drive unit.

According to one another illustrative embodiment, a method includes arranging a drive unit in a first mode of operation with a first container where the first container supports the drive unit on a support surface. The method also includes interacting with a first activation site to actuate the drive unit in the first mode of operation, removing the drive unit from the first container, vertically flipping the drive unit upside-down, placing the drive unit on the support surface, arranging the drive unit in a second mode of operation with a second container where the drive unit supports the second container, and interacting with a second activation site to actuate the drive unit in the second mode of operation, the second activation site being positioned at a different location than the first activation site.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which:

FIG. 8A is a perspective view of an outside of a second container in accordance with one aspect;

FIG. 8B is a bottom plan view of the second container shown in FIG. 8B;

FIGS. 18A, 18B and 18C are schematic representations of the method of actuating the drive unit in a first mode of operation as depicted in FIG. 17A;

FIGS. 19A, 19B and 19C are schematic representations of another method of actuating the drive unit of FIG. 17A in a first mode of operation;

FIG. 20 is a perspective view of a container lid in accordance with one aspect;

FIG. 28B is an enlarged view of the drain outlet of the ring depicted in FIG. 28A;

DETAILED DESCRIPTION

Figure 1:
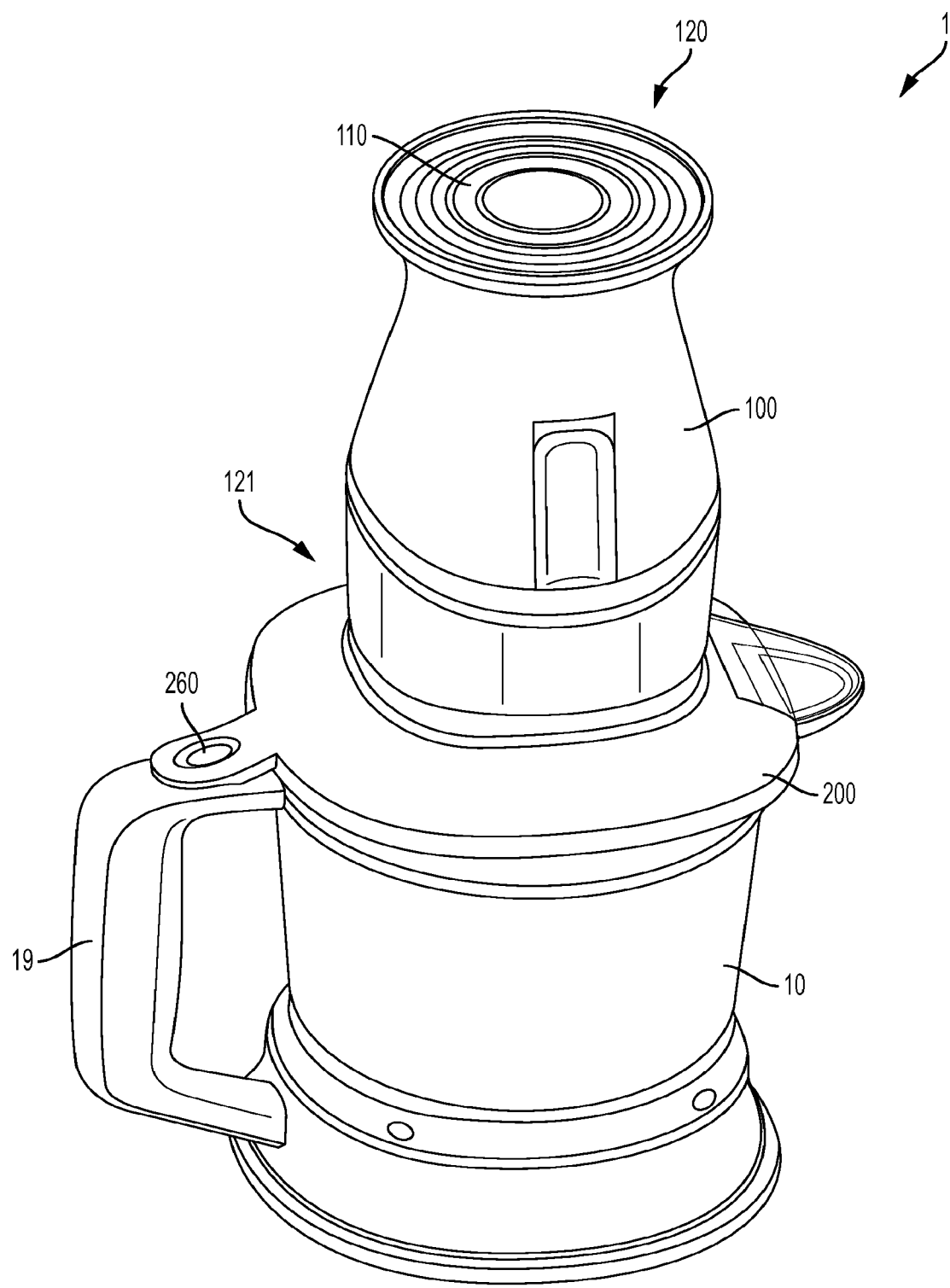
FIG. 1 is a perspective view of a food processing apparatus having a drive unit in a first mode of operation in accordance with one aspect.

Food processors typically include a drive unit that is configured to drive one or more processing tools such as blades, dough hooks, whisks, etc. The inventors have appreciated that users employ many different kitchen tools and appliances to prepare a variety of foods and drinks. The inventors also have appreciated that a reduction in the number and the size of such appliances can help address issues of limited countertop and storage space, as well as a desire to decrease clutter. The inventors have recognized that one way to address these issues is to provide a drive unit that can be used to drive different processing tools that traditionally each required their own, separate drive unit. Provided herein are embodiments where a drive unit has more than one mode of operation, works with different food processing containers, and/or may be used in more than one orientation.

As used herein, the term "processing tool" refers to any tool used to process foods and other materials. A processing tool may include, but are not limited to, one or more blades, one or more whisks, one or more ice crushers, one or more dicers, one or more graters, one or more shredders, one or more combined shredder/slicers, one or more cubers, one or more dough hooks, one or more whippers, one or more slicers, and one or more french fry cutters. In some cases, a processing tool may be one or more tools that are used to clean the food processor container. As used herein, the term "food" includes any solid or liquid comestible, and any mixture of a solid food and a liquid food.

As used herein, the terms "connected," "attached," or "coupled" are not limited to a direct connection, attachment, or coupling, as two components may be connected, attached, or coupled to one another via intermediate components.

According to one aspect, a drive unit has more than one mode of operation, with each mode of operation having a different manner of actuation. The drive unit may include a motor that can be actuated by a user interacting with one or more activation sites. According to one embodiment, shown in FIG. 1, a food processing apparatus 1 is operated in a first mode of operation where the drive unit 100 is supported by a first container 10. The drive unit 100 includes a first end 120 and a second end 121. In the first mode of operation, the second end 121 engages with a lid 200, and a drive coupling of the drive unit drives one or more a food processing tools, such as one or more blades, in the first container. A user can interact with a first activation site 110 located at the first end 120 to actuate the drive unit. As used herein, an "activation site" refers to any portion of the food processing apparatus a user interacts with to actuate a drive unit. In some cases, as will be described below, interaction with an activation may actuate the drive unit via intermediate components. For example, in some embodiments, interaction with the activation site triggers an activator (for example, a switch), which in turn actuates the drive unit. In some embodiments, the first activation site is a button that can be pressed and/or pulled by the user. However, it should be appreciated that other arrangements for the first activation site are possible, such as a switch, a knob, a slider, a motion sensor, a touch screen, a contact surface arranged such that, when a user pushes down on the surface, the entire drive unit moves downwardly and activates a switch, or any other suitable arrangement.

Figure 2:
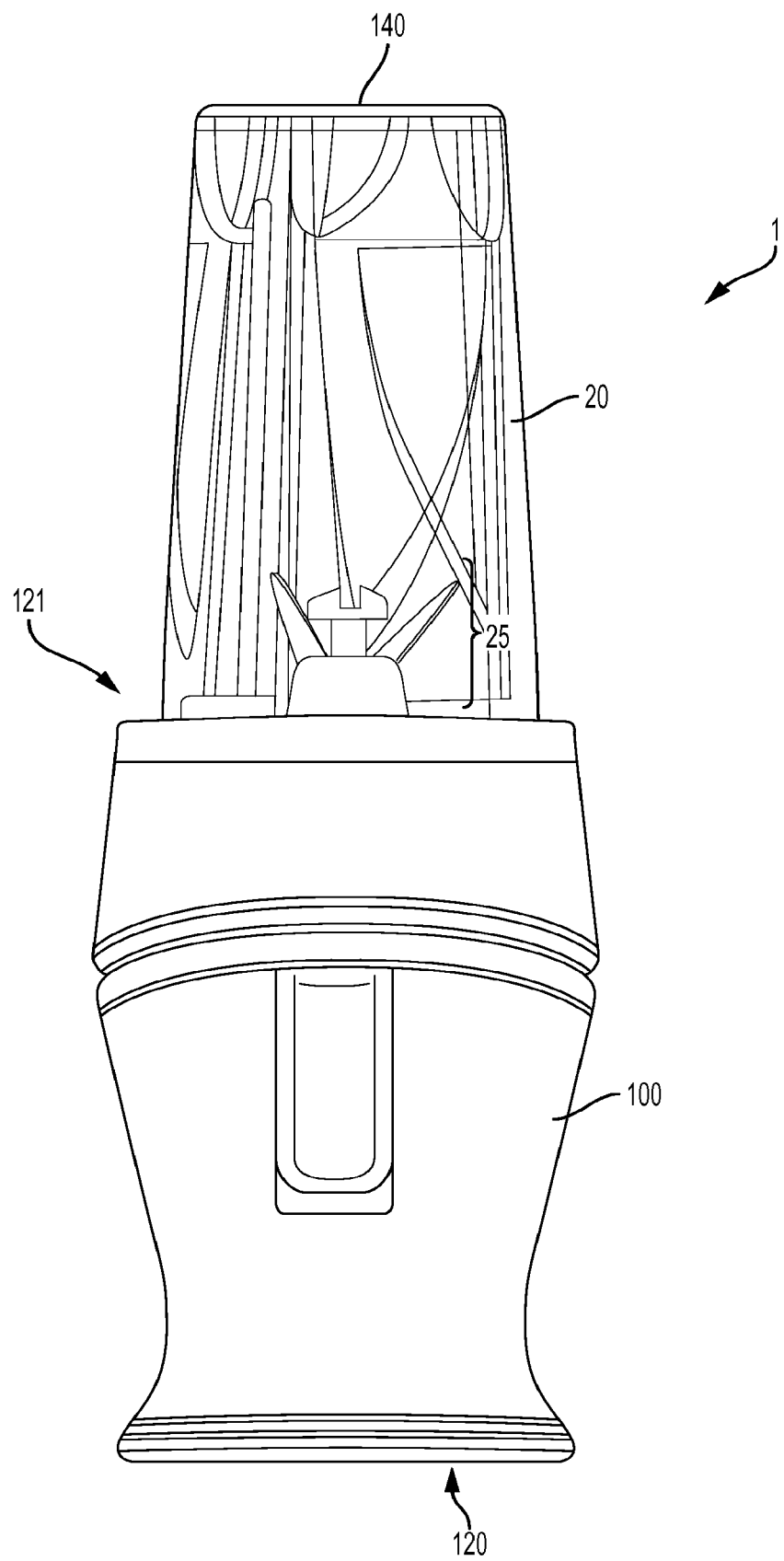
FIG. 2 depicts the drive unit of FIG. 1 in a second mode of operation.

The second mode of operation of the food processing apparatus 1 is shown in FIG. 2, where the drive unit 100 supports a second container 20. In the second mode of operation, the second end 121 of the drive unit 100 engages with the second container 20. The drive unit has a drive coupling that drives a processing tool 25, such as one or more blades, in the second container. In the second mode of operation, a user interacts with a second activation site 140 located at the top end of the second container 20 to actuate the drive unit. In some embodiments, the second activation site is a surface on the second container that can be contacted by a user. When the user presses down on the second activation site 140, the entire container 20 moves downwardly, triggering one or more activators within the drive unit 100, which in turn actuates the drive unit, as will be discussed in more detail below. However, it should be appreciated that other arrangements for the second activation site are possible, such as a button that is depressed and/or pulled, a switch, a knob, a slider, a motion sensor, a touch screen, or any other suitable arrangement, as this aspect is not necessarily so limited.

The drive unit may be used with a container having any suitable volume and design. In some cases, the container is a large pitcher (e.g., the first container 10) that can hold multiple servings. In such an embodiment, the container may include a handle and a spout to facilitate pouring contents and/or the lifting and moving of the container. A lid may be provided and may include a hole through which food can pass such that food can be added to or removed from the food-containing volume of the container without removing the lid. The container also may be a smaller single-serve jar (e.g., the second container 20) out of which a user can consume the food or drink that was processed within the second container. In some cases, the processing tool is removed from the jar before a user consumes the food or drink from the jar.

Figure 3B:
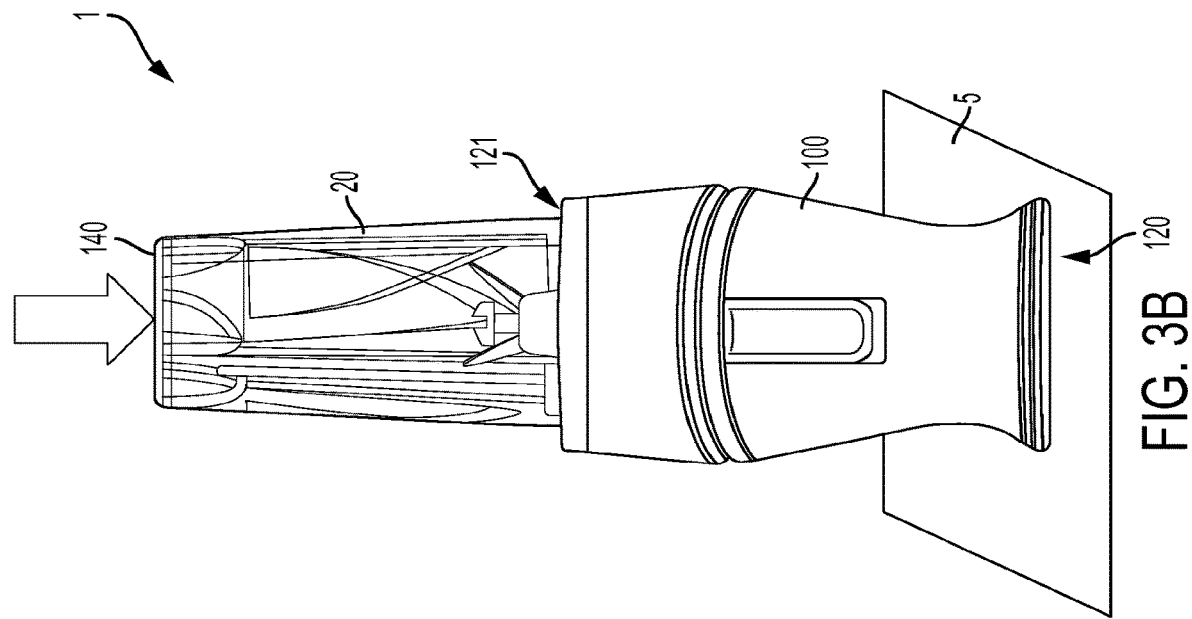
FIGS. 3A and 3B depict a food processing apparatus, where the drive unit is depicted in first and second modes of operation, respectively.
Figure 3A:
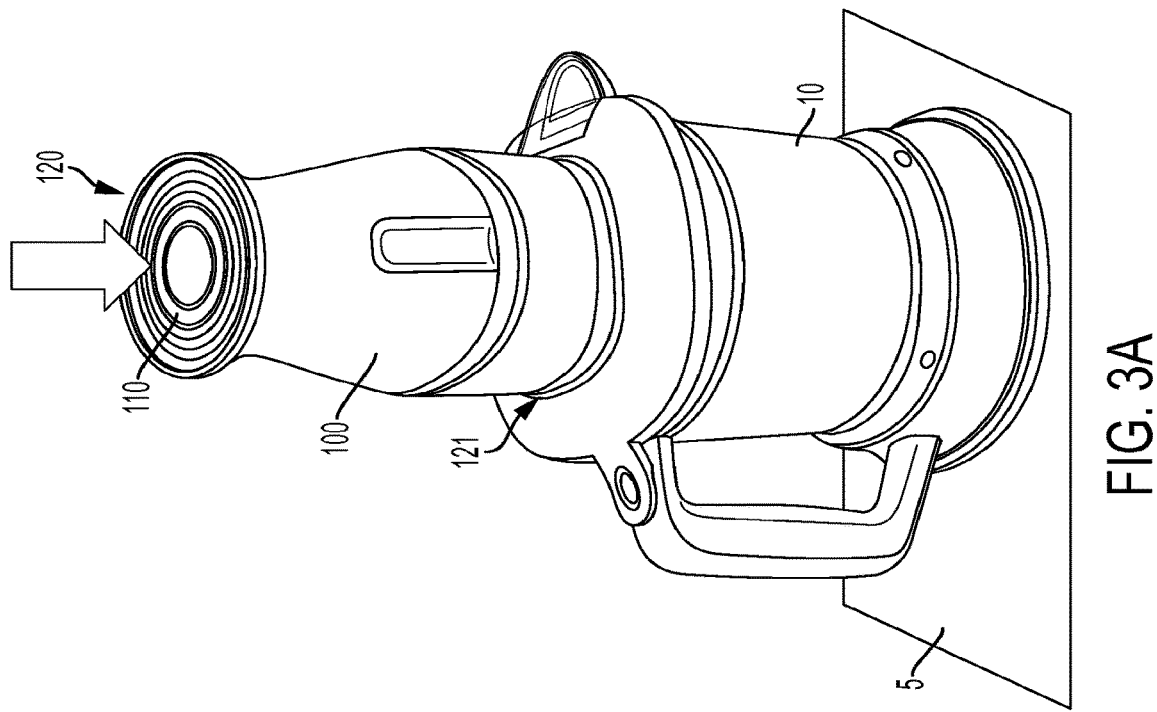

As seen in FIGS. 3A-3B, in some embodiments, the same drive unit 100 can be used in two different modes of operation. FIG. 3A depicts the first mode of operation where a user interacts with the first activation site 110 to actuate the drive unit 100. In the embodiment shown in FIG. 3A, the first activation site 110 comprises a button that a user pushes to actuate the drive unit 100. FIG. 3B depicts the second mode of operation where a user interacts with the second activation site 140 by pushing down on the container 20 at second actuation site 140 to actuate the drive unit. As such, the activation site for the first mode of operation is at a different location than the activation site for the second mode of operation, and thus actuation of the drive unit is performed in a different manner in the second mode of operation as compared to the first mode of operation.

According to one aspect, the drive unit has a different orientation relative to a support surface in the second mode of operation as compared to the first mode of operation. As seen in FIG. 3A, the drive unit 100 has a first orientation relative to a support surface 5 when being used in the first mode of operation, where the first end 120 is located above the second end 121 and the drive unit 100 is being supported by the container 10. As seen in FIG. 3B, the drive unit 100 has a second orientation relative to the support surface 5 when being used in the second mode of operation, where the second end 121 is now above the first end 120 and the drive unit 100 supports a container 20, rather than being supported by a container. The first orientation of drive unit 100 relative to the support surface 5 is vertically flipped upside-down as compared to the second orientation of the drive unit. In this manner, a user can use the same drive unit 100 in two different arrangements, with different containers and/or processing tools.

Each container 10, 20 includes a processing tool. The user can first use the drive unit 100 to drive a first processing tool within the first container 10, then decouple the drive unit from the first container, flip the drive unit 100 upside-down, place the first end 120 of the drive unit 100 onto the support surface 5, couple the second container 20 to the second end 121 of the drive unit, and drive a second processing tool.

Figure 4A:
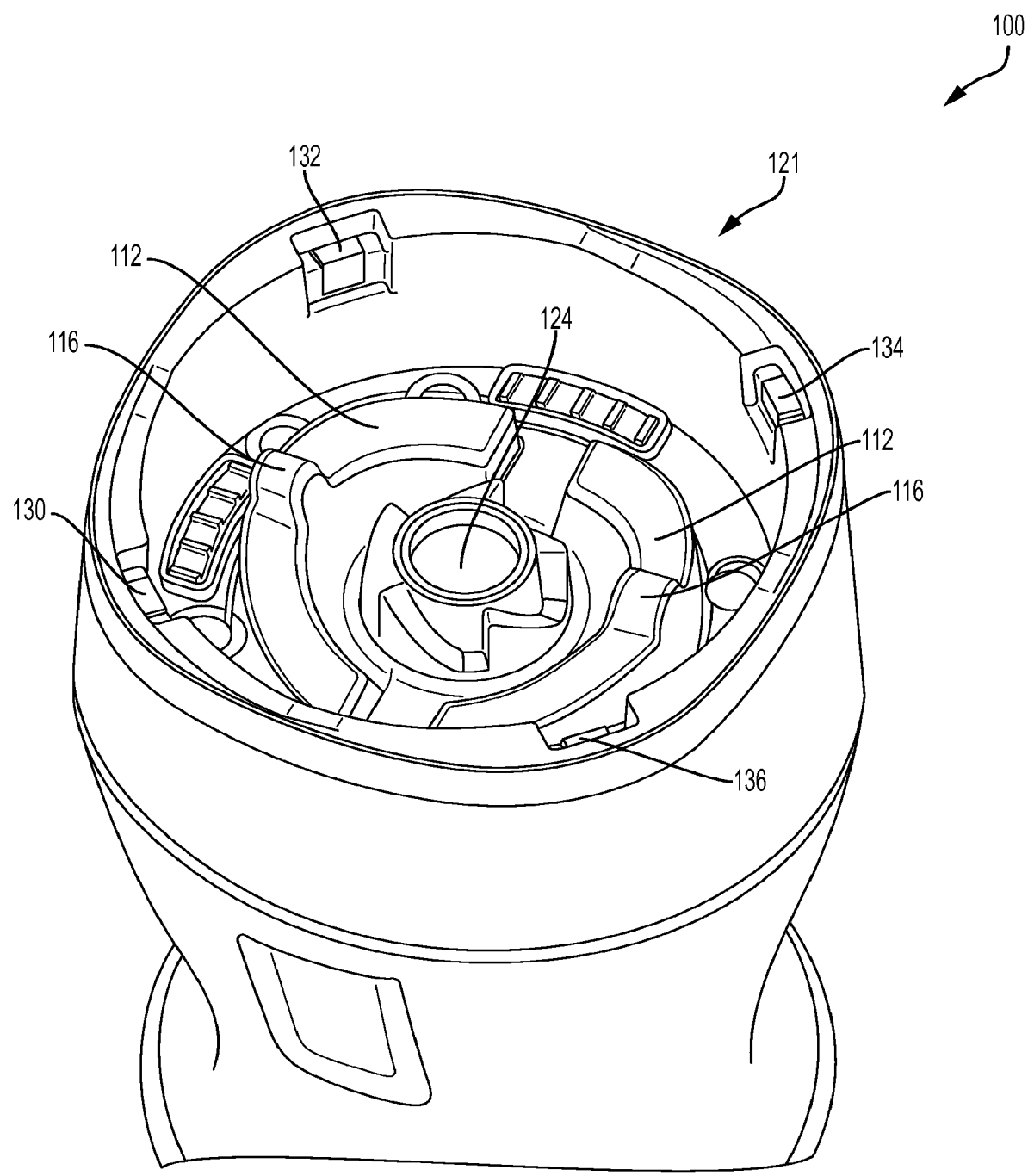
FIG. 4A is a perspective view of the second end of the drive unit shown in FIG. 1.
Figure 4B:
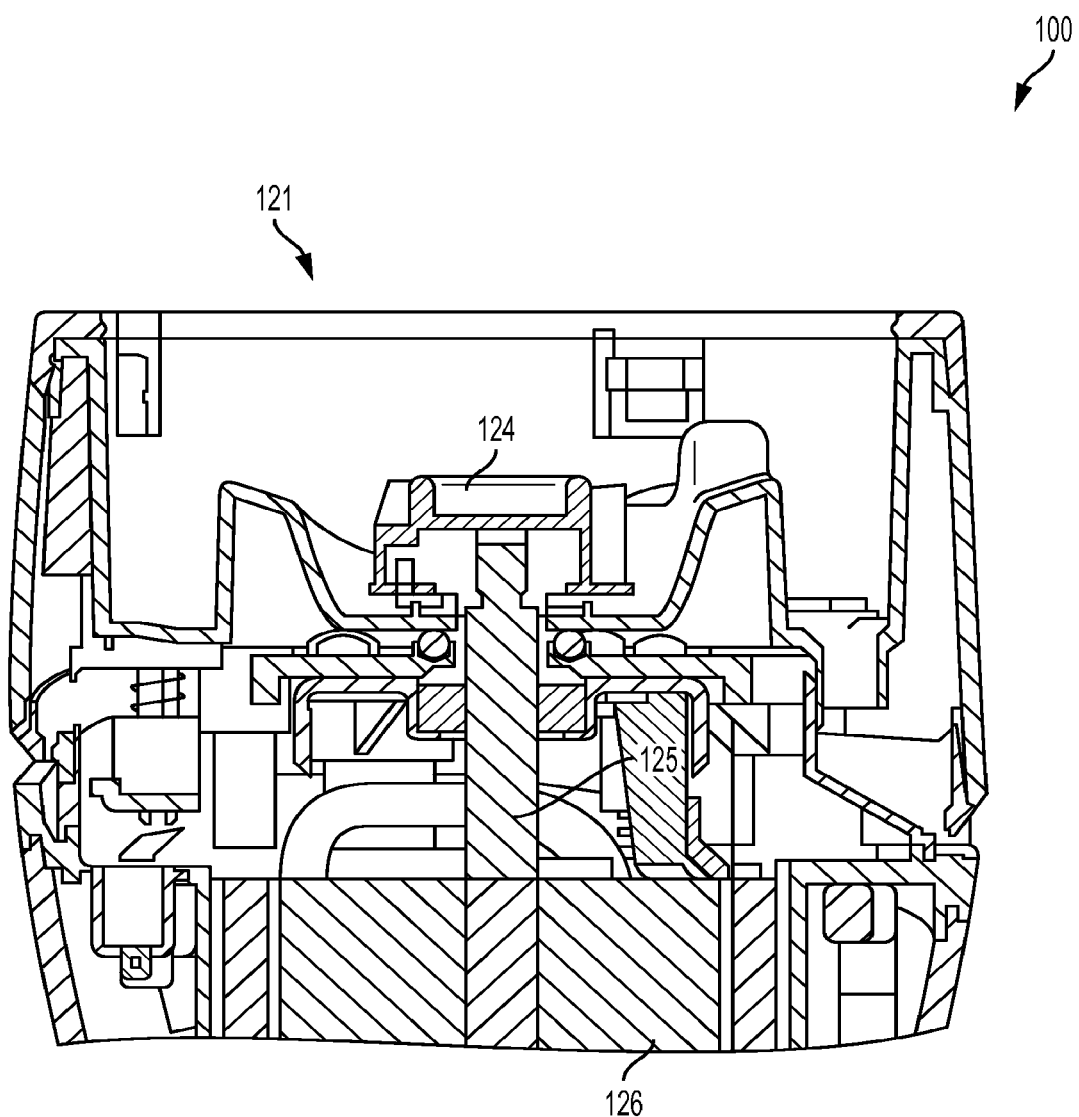
FIG. 4B is a cross-sectional view of a portion of the drive unit shown in FIG. 4A.

The manner in which the drive unit interfaces with the containers and processing tools will now be discussed. In some embodiments, as seen in FIG. 4A, the second end 121 of drive unit 100, which interfaces with the lid 200 of the first container 10 in the first mode of operation (see FIG. 1), includes a drive coupling 124. As seen in FIG. 4B, which is a cross-sectional view of the drive unit 100, the drive coupling 124 is coupled to a motor 126 via a drive shaft 125.

Figure 5:
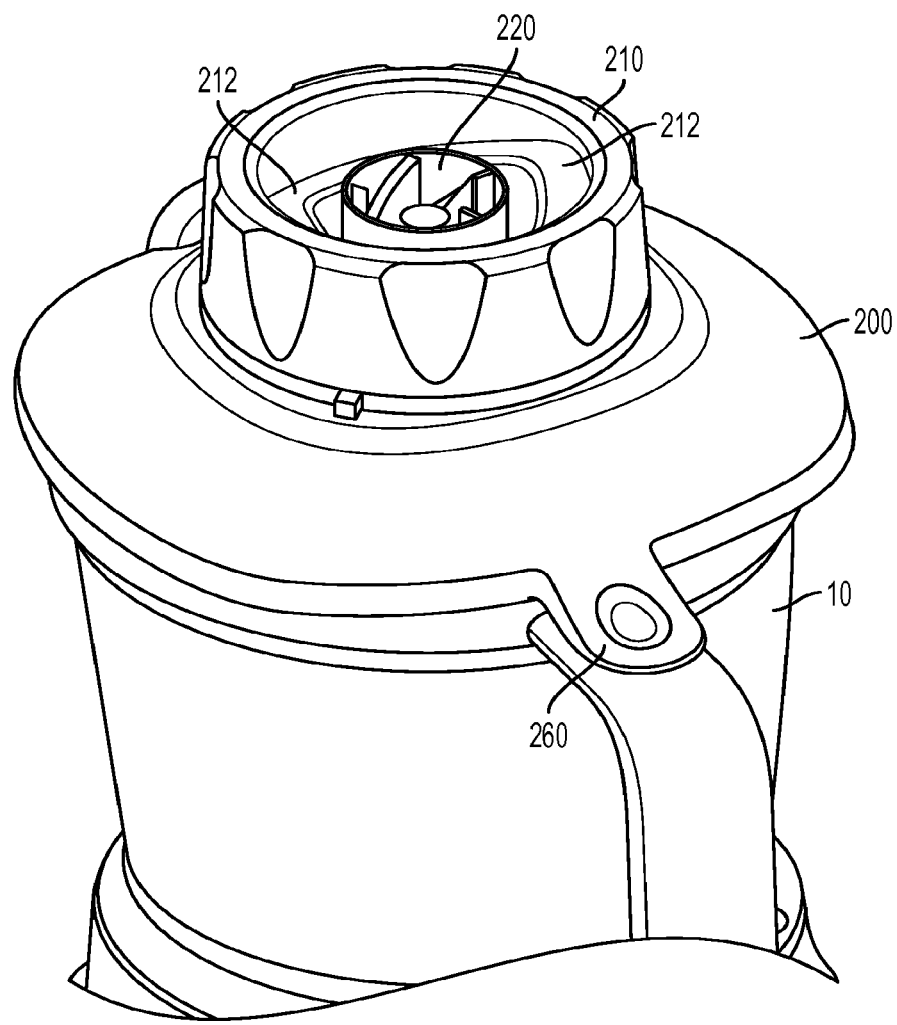
FIG. 5 is a perspective view of a first container and container lid in accordance with one aspect
Figure 6:
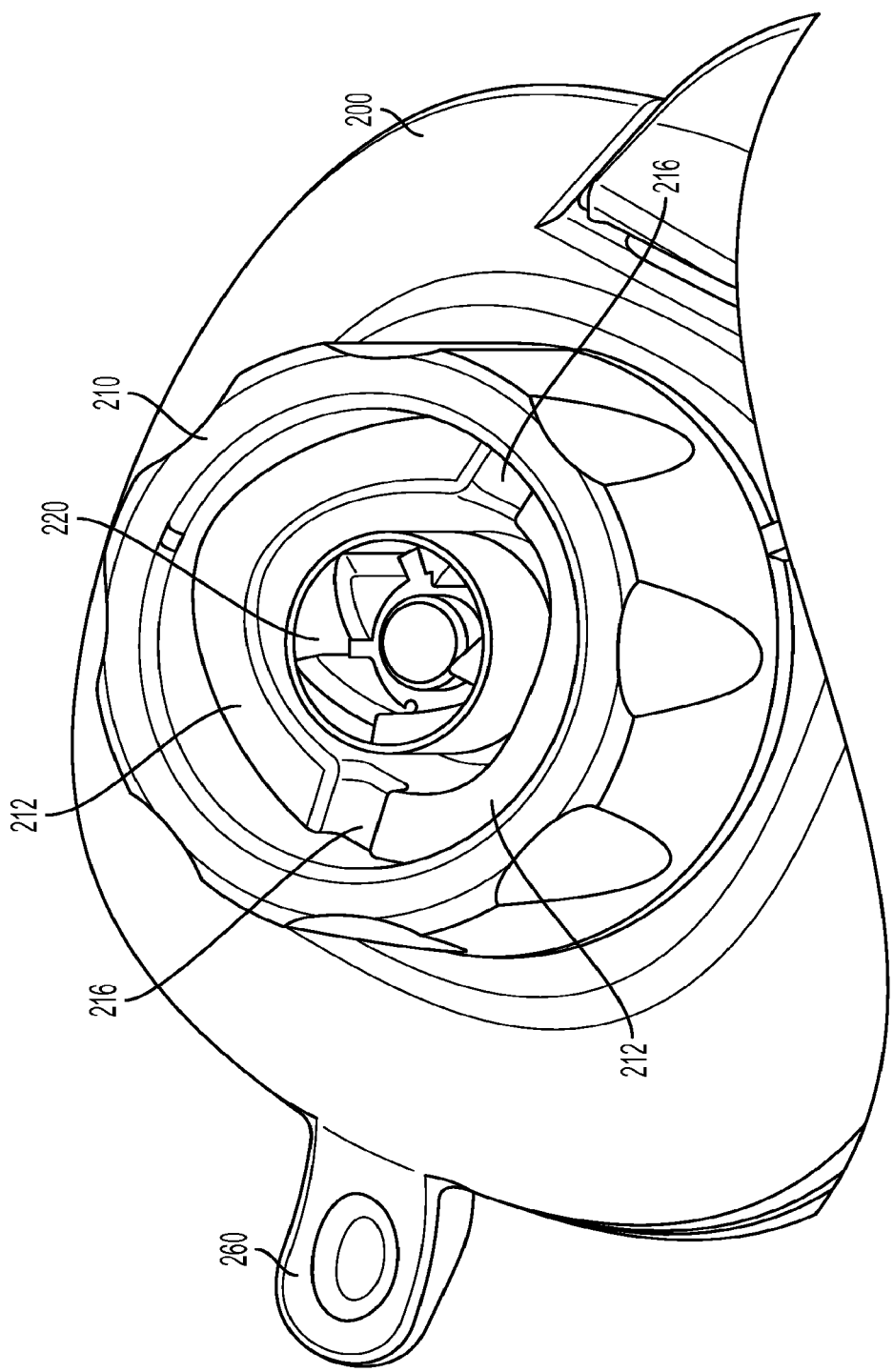
FIG. 6 is an enlarged perspective view of the container lid shown in FIG. 5.

As seen in FIG. 5, the first container 10 includes a lid 200 that can be removed from the container 10. A food-containing volume is defined between the lid 200, the interior bottom surface of the container, and the interior sidewall of the container. The lid has a coupling region 210 that interfaces with the second end 121 of the drive unit 100 in the first mode of operation. As seen in FIG. 1, the drive unit may fit over the coupling region 210 (see FIG. 5) of the lid 200 such that the coupling region 210 is not visible when the drive unit 100 is coupled to the lid 200. Turning back to FIG. 5, the coupling region 210 includes a driven coupling 220 which receives the drive coupling 124 of the drive unit. FIG. 6 depicts an enlarged view of the coupling region 210 of the lid 200.

According to one aspect, the drive unit and container lid include alignment features that help to facilitate proper alignment between the drive unit and the container lid. In one embodiment, as seen in FIG. 4A, the second end 121 also includes one or more alignment features such as curved, angled surfaces 112 which cooperate with alignment features on the container lid. In some embodiments, for example, as shown in FIG. 4A, the alignment feature(s) on the second end of the drive unit include a surface that is angled relative to a direction in which the drive unit and the lid are brought into physical contact with one another. Alternatively or in addition, in some embodiments, for example, as shown in FIG. 4A, the alignment feature(s) on the second end of the drive unit are curved about an axis that is parallel to the axis of rotation of the drive coupling 124. As seen in FIGS. 5 and 6, the coupling region 210 includes alignment features such as curved, angled surfaces 212 that cooperate with the curved, angled surfaces 112 on the drive unit 100. In some embodiments, for example, as shown in FIG. 5, the alignment feature(s) on the container lid include a surface that is angled relative to the direction in which the drive unit and the lid are brought into contact with one another. Alternatively or in addition, in some embodiments, for example, as shown in FIG. 5, the alignment feature(s) on the container lid are curved about an axis that is parallel to the axis of rotation of the driven coupling 220.

In some embodiments, the alignment features on the drive unit and on the container lid are constructed and arranged to facilitate proper alignment between the drive unit and the container lid when the two components are brought together for operation in the first mode of operation. In some embodiments, the alignment features on the drive unit and the container lid permit the drive unit to self-seek the proper alignment orientation relative to the container lid. To couple the drive unit 100 to the container lid 200, a user picks up the drive unit 100 and places the second end 121 of the drive unit 100 onto/over the coupling region 210 of the lid 200. Once the second end 121 of the drive unit 100 has been placed onto/over the coupling region 210 of the lid 200, the user can let go of the drive unit 100, and the drive unit 100 will begin to self-seek the proper alignment orientation relative to the container lid 200. The curved, angled surfaces 112 of the drive unit 100 contact and slide down the curved, angled surfaces 212 of the container lid 200 due to the weight of the drive unit 100, causing the drive unit 100 to automatically rotate relative to the lid 200 toward an aligned orientation until the drive unit 100 reaches the lowest point of the angled surfaces 212 of the container lid and cannot move downward any farther. In some cases, this lowest point is the aligned orientation.

In other embodiments, the drive unit does not automatically move relative to the lid toward an aligned orientation once the user places the drive unit onto the coupling region of the lid and lets go of the drive unit. In some embodiments, the user continues to apply a force on the drive unit to move the drive unit toward the aligned orientation relative to the lid. In some cases, alignment features on the drive unit and the container lid may facilitate movement of the drive unit toward the aligned orientation. For example, in some embodiments, a user may rotate the drive unit relative to the lid to place the drive unit in the aligned orientation, and, in some cases, alignment features on the drive unit and the lid facilitate rotation of the drive unit relative to the lid toward the aligned orientation.

In some embodiments, as seen in FIGS. 4A and 6, the second end 121 of the drive unit 100 and the container lid 200 have additional alignment features such as protrusions 116 on the drive unit 100 that cooperate with depressions 216 on the container lid 200. When the user places the drive unit 100 onto/over the coupling region 210 of the lid 200 and lets go of the drive unit, the curved, angled surfaces 112 of the drive unit slide down the curved, angled surfaces 212 of the container 10 due to the weight of the drive unit 100, causing the drive unit 100 to rotate relative to the lid 200 until the protrusions 116 enter the depressions 216.

Although the drive unit rotates relative to the lid to reach the aligned orientation, it should be appreciated that other arrangements are possible, as this aspect is not so limited. For example, instead of, or in addition to rotation, the drive unit may slide laterally relative to the lid. In some embodiments, the angled surfaces on the container lid and the drive unit may be substantially straight instead of curved. In some embodiments, the lid moves relative to the drive unit to place the lid and drive unit in the aligned orientation relative to one another.

In the embodiment shown in FIGS. 4-6, the drive unit 100 has two aligned orientations relative to the lid 200, where the aligned orientations are rotated 180 degrees from one another. In other embodiments, there may be a single aligned orientation between the lid and the drive unit. In yet other embodiments, there may be 3, 4, 5, 6, 7, 8 or any other suitable number of aligned orientations, as this aspect is not so limited. In addition, the aligned orientations may be rotated any suitable number of degrees relative to one another.

Figure 7:
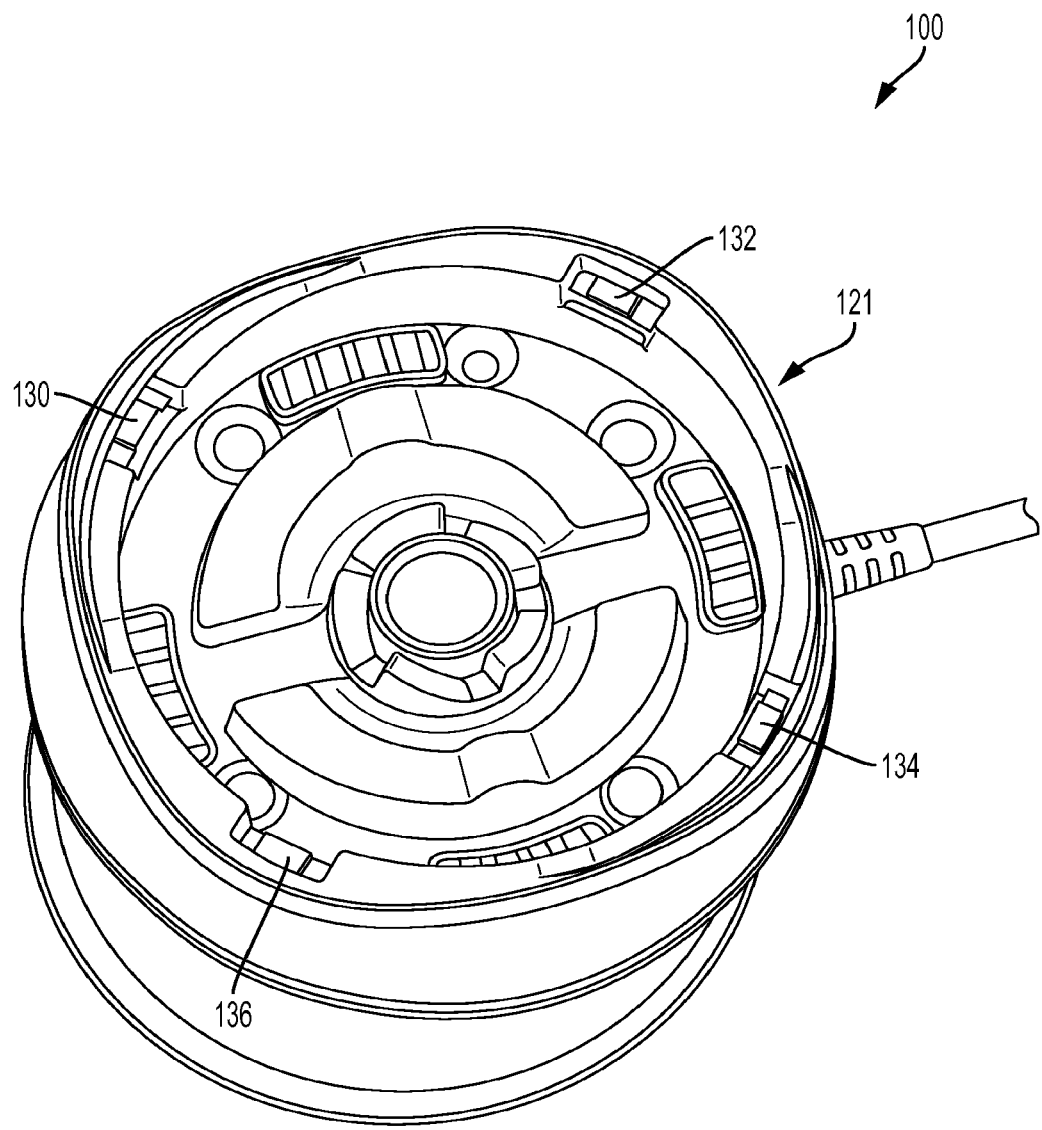
FIG. 7 is another perspective view of the second end of the drive unit shown in FIG. 1.

In the second mode of operation, as seen in FIG. 2, the second container 20 is supported by the drive unit 100. The bottom end of the second container 20 interfaces with the second end 121 of the drive unit. As seen in FIGS. 8A-8B, the bottom end of the second container 20 includes a plurality of tabs 22. As seen in FIG. 7, the second end 121 of the drive unit includes a plurality of plungers 130, 132, 134 and 136 that cooperate with the tabs 22 of the second container. When the container 20 is supported by the drive unit 100, the tabs 22 of the container 20 rest upon the plungers 130, 132, 134 and 136 of the drive unit 100. As will be discussed in more detail below, downward movement of the container 20 causes the tabs 22 of the container 20 to push down upon the plungers 130, 132, 134 and 136 of the drive unit 100, which actuates the drive unit.

Aspects related to actuation of the drive unit will now be discussed. According to one aspect, an activation site is recessed into a first end of the drive unit such that the drive unit can be placed on a support surface with the first end contacting the support surface without activating the activation site.

Figure 9:
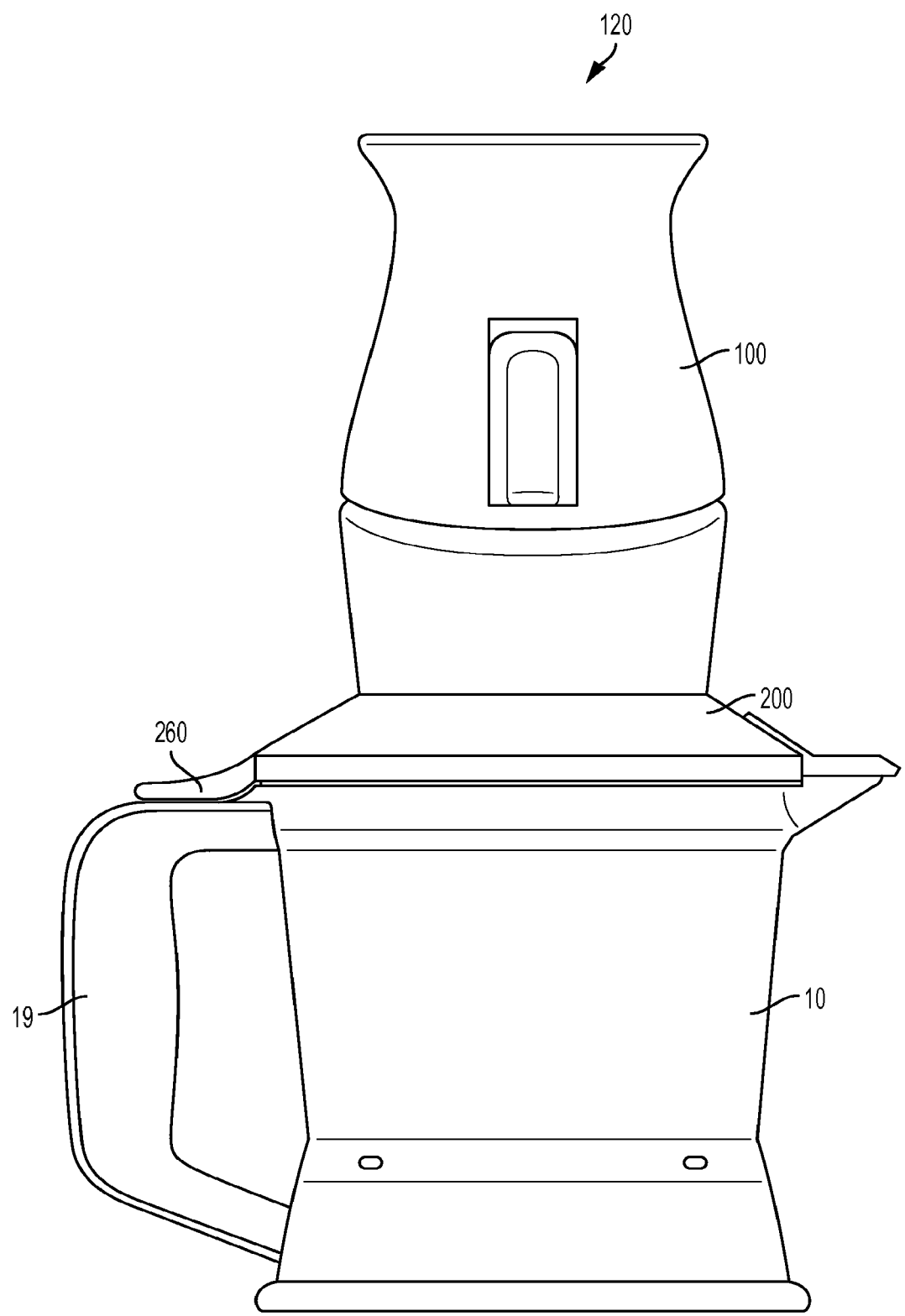
FIG. 9 is a side view of the food processing apparatus depicted in FIG. 1.
Figure 10A:
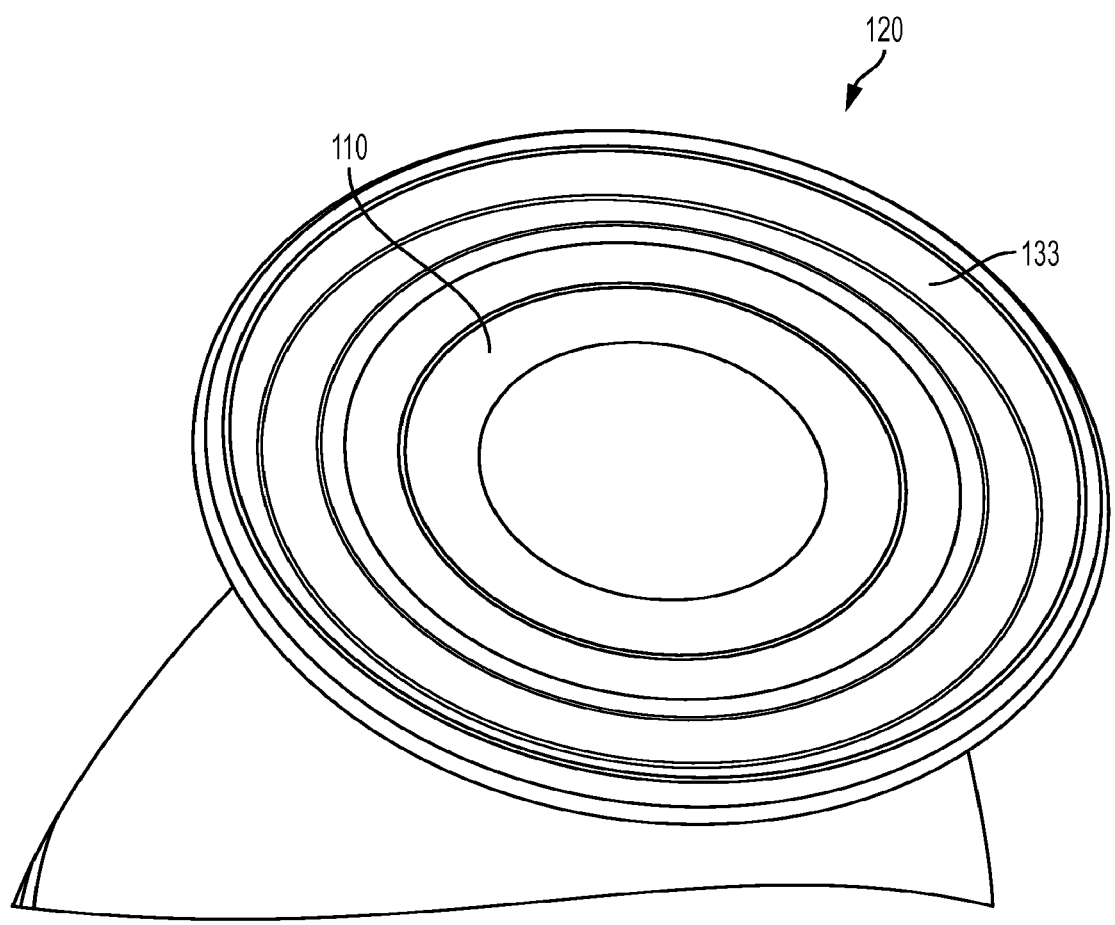
FIG. 10A is an enlarged view of the first end of the drive unit having a first activation site in accordance with one aspect.
Figure 10B:
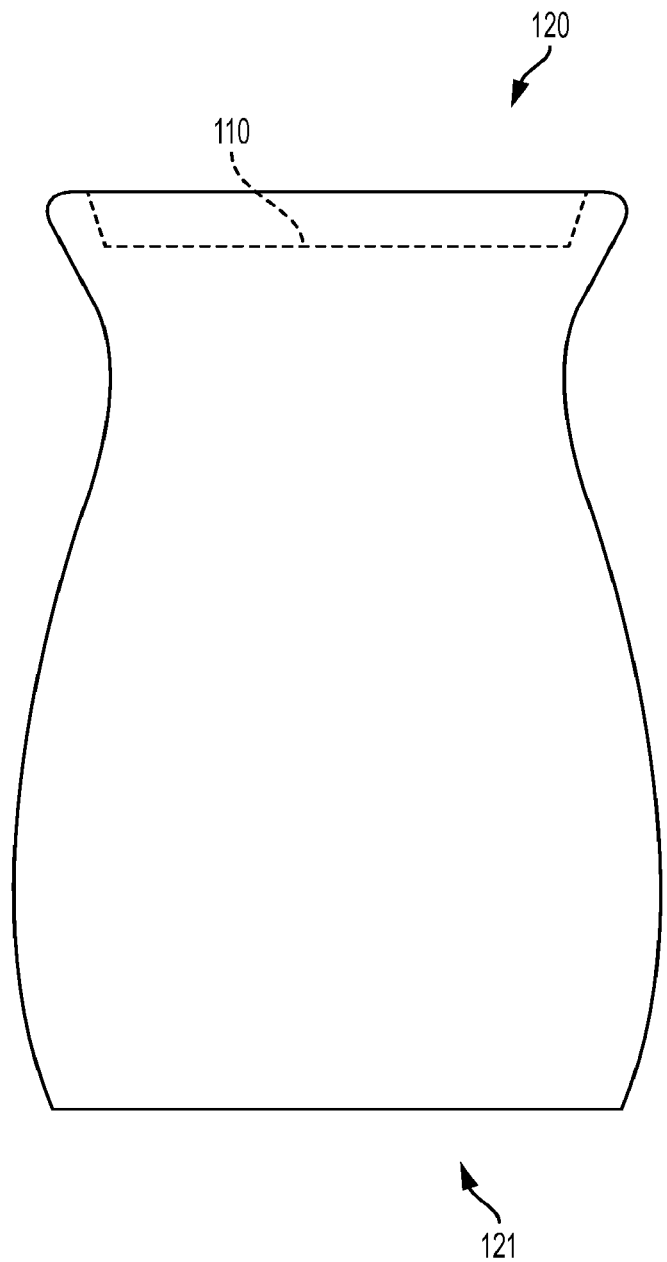
FIG. 10B is a side view of the drive unit depicting a recessed first activation site.

As discussed previously, in the embodiment shown in FIG. 3A, in the first mode of operation, a user turns on the drive unit by pressing down on button 110. In some embodiments, the button 110 is recessed into the first end 120 of the drive unit 100. As seen in FIG. 9, which is a side view of the drive unit and first container, the button is not visible because the button is recessed into the first end 120. FIGS. 10A-10B further illustrate that button 110 is recessed into the first end 120 of the drive unit. As a result, when the drive unit 100 is flipped upside down relative to the orientation shown in FIG. 9 such that the first end 120 rests upon a support surface, the button 110 remains unactuated. In addition, with the button recessed inside the first end 120 and with the first end 120 resting upon a support surface in an upright position, as seen in FIG. 3B, a user is prevented from actuating the button because the user is unable to access the button.

According to another aspect, the interface between the first activation site and the drive unit is sealed to prevent ingress of fluids and debris into the drive unit. In the embodiment shown in FIG. 10A, a gasket seal 133 is provided to prevent ingress of liquids into the drive unit from the first end 120. In some embodiments, the gasket seal is overmolded onto both the button 110 and the first end 120 of the drive unit. The gasket seal may be made of rubber, an elastomer, a polymer, or any other suitable material.

In some embodiments, interaction with the first activation site triggers an activator, which in turn actuates the drive unit. As used herein, an "activator" is a component that, when triggered, actuates the drive unit. Possible activators may include, but are not limited to, mechanical switches, electromechanical switches, piezoelectric switches, solid state relays, switches with no moving parts, any other type of switch, valves, buttons, sliders, knobs, or any other suitable arrangement, as this aspect is not so limited.

Figure 11:
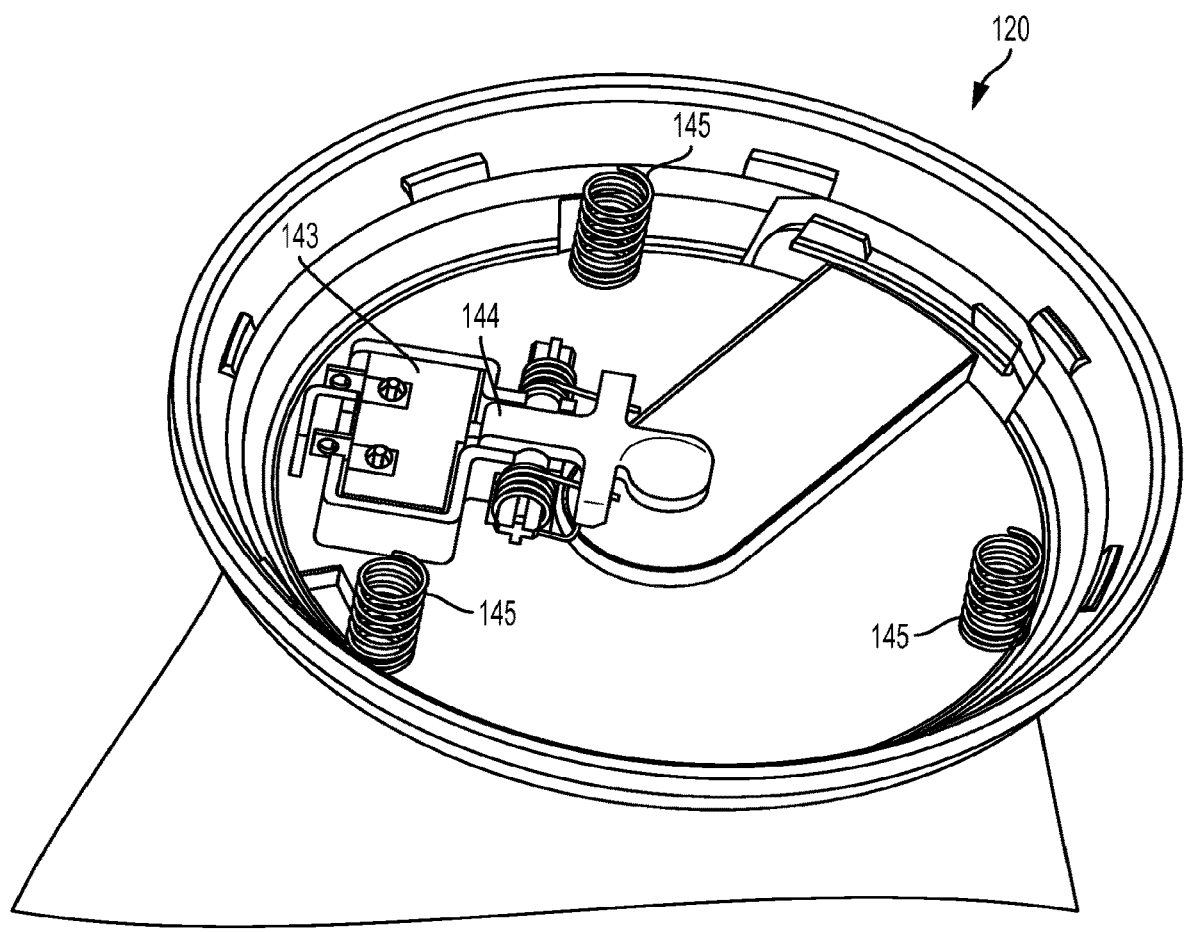
FIG. 11 an enlarged view of the first end of the drive unit with the outer button surface and gasket seal removed.

FIG. 11 shows one embodiment including an activator that comprises a switch 143. Closure of switch 143 actuates the drive unit. FIG. 11 depicts the first end 120 of the drive unit with the outer button surface and gasket seal removed, revealing the switch 143, an activation lever 144 and springs 145 beneath. The springs 145 support and bias the button 110 toward a raised position. In the embodiment shown in FIG. 11, the switch 143 and activation lever 144 comprise a rocker switch that is constructed and positioned such that the user may press down upon any portion of the button 110 to actuate the switch 143, not just a localized region near/at switch 143. In some embodiments, the switch 143 includes a plate to prevent contact with high voltage if the gasket seal 133 breaks.

The inventors have recognized that unintentional, premature, or improper actuation of the drive unit may lead to unintended release of food contents, particularly when the drive unit is coupled to a processing tool. In some cases, a user may assemble the food processor in an improper manner, and attempt to actuate the drive unit. For example, if a container lid is not properly secured to the container, or the drive unit is not properly coupled to a container and/or container lid, actuating the drive unit may lead to release of contents or injury. According to one aspect, the actuation arrangement of the drive unit includes one or more safety features that prevent actuation of the drive unit unless one or more safety conditions are met.

Figure 12A:
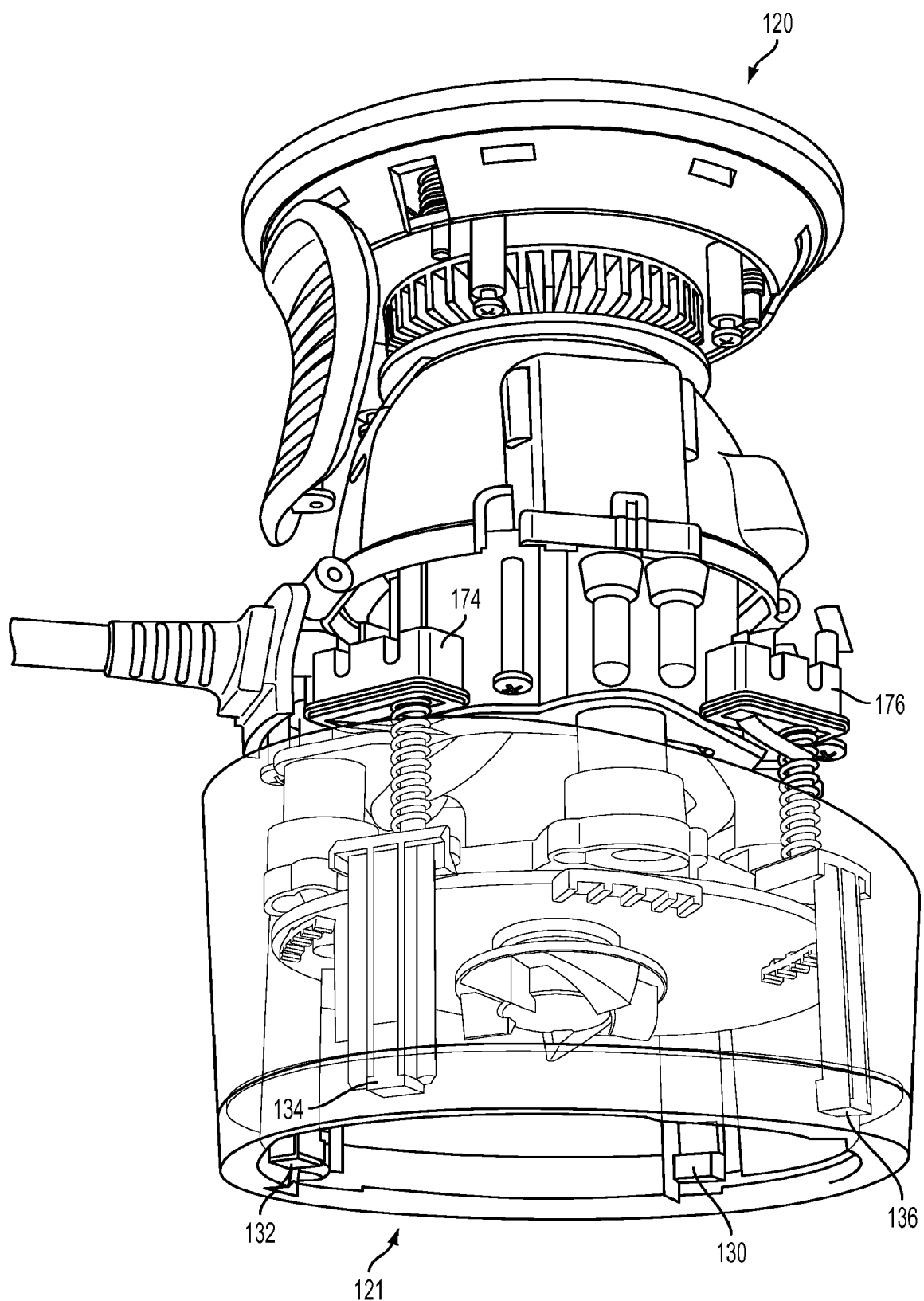
FIG. 12A is a perspective view of the drive unit with portions of the outer housing removed or in phantom to reveal a plurality of plungers and switches in accordance with one aspect.
Figure 12B:
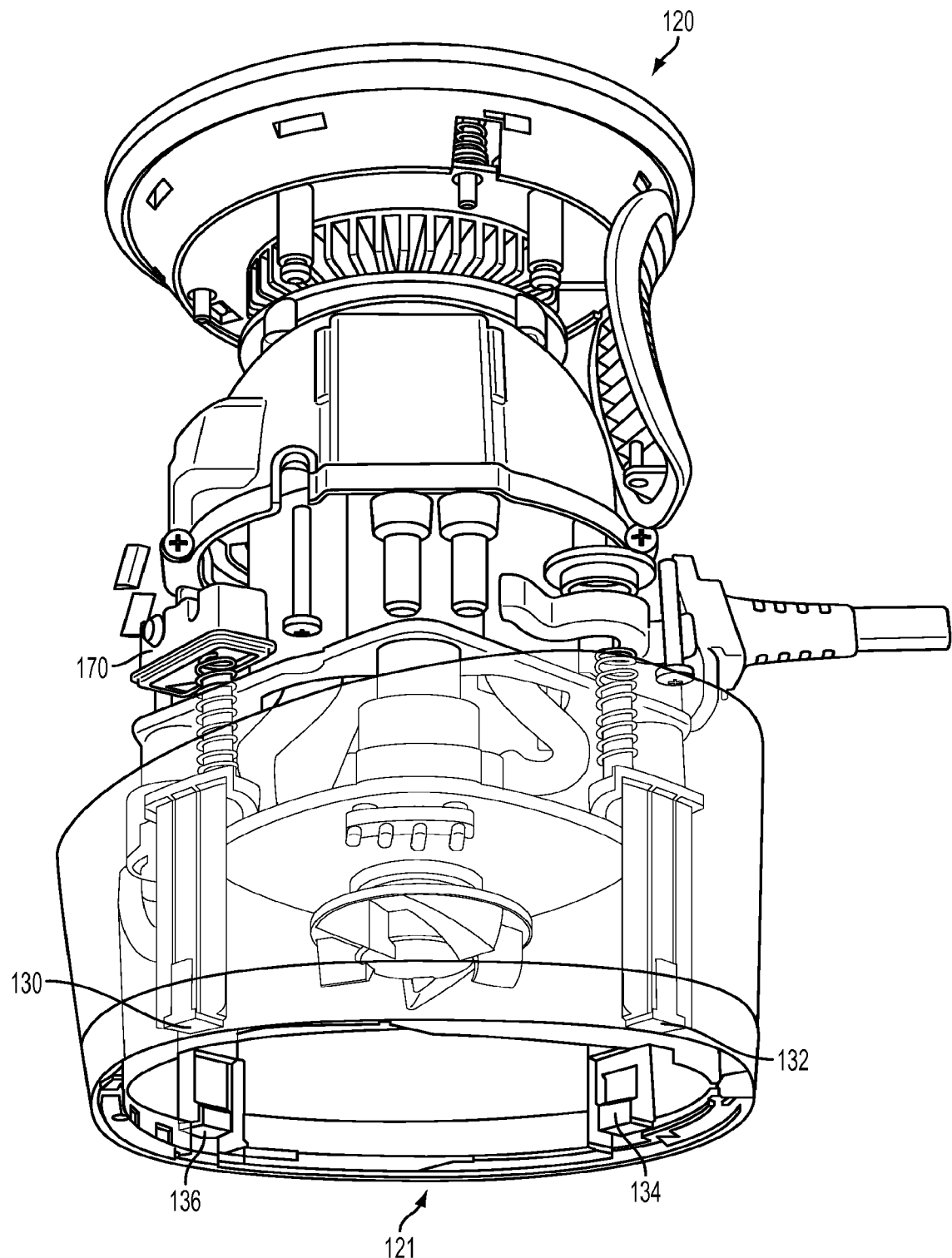
FIG. 12B is a perspective view of the opposite side of the drive unit shown in FIG. 12B.
Figure 13:
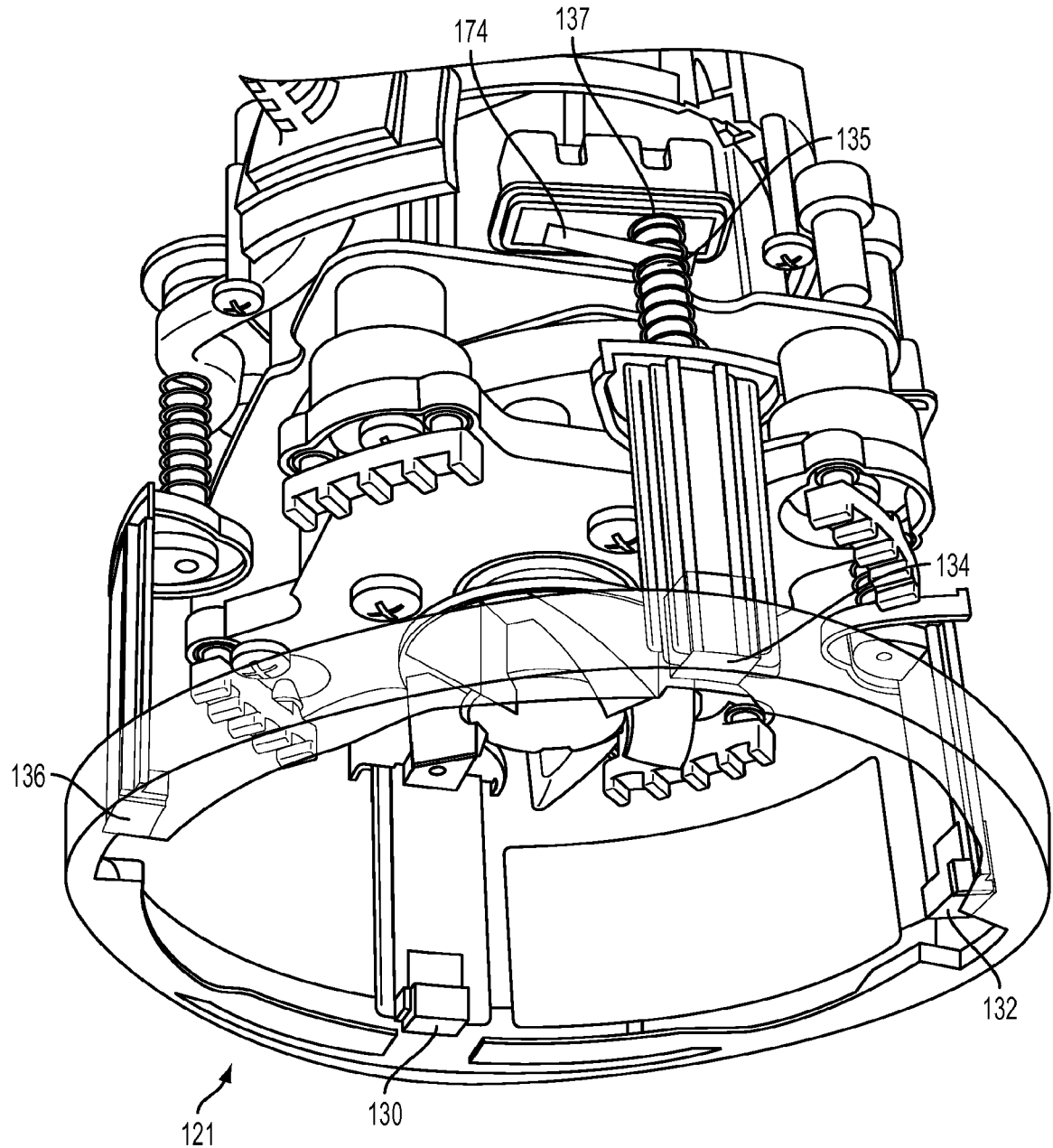
FIG. 13 is an enlarged view of the drive unit depicting an interaction between a plunger and a switch.

Actuation of the drive unit in the first mode of operation will now be described. In some embodiments, triggering the activator, switch 143, alone is not sufficient to actuate the drive unit. Some embodiments may include safety features that also must be triggered before the drive unit can be actuated. In the embodiment shown in FIGS. 12A-12B, portions of the housing of the drive unit 100 are removed or shown in phantom to reveal the components beneath. As seen in FIGS. 12A-12B, the drive unit includes a plurality of safety features comprising switches 174, 176 and 170. Each switch is associated with a plunger. As best seen in FIG. 13, when plunger 134 is pushed toward switch 174, a plunger end 135 abuts against and closes the switch 174. Each plunger interacts with a spring that biases the plunger away from its associated switch. Movement of the plunger 134 towards the switch 174 compresses the spring 137. In some embodiments, plungers 130 and 134 are associated with safety switches 170 and 174, respectively. In this embodiment, plungers 132 and 136 are not used in the first mode of operation.

Figure 14A:
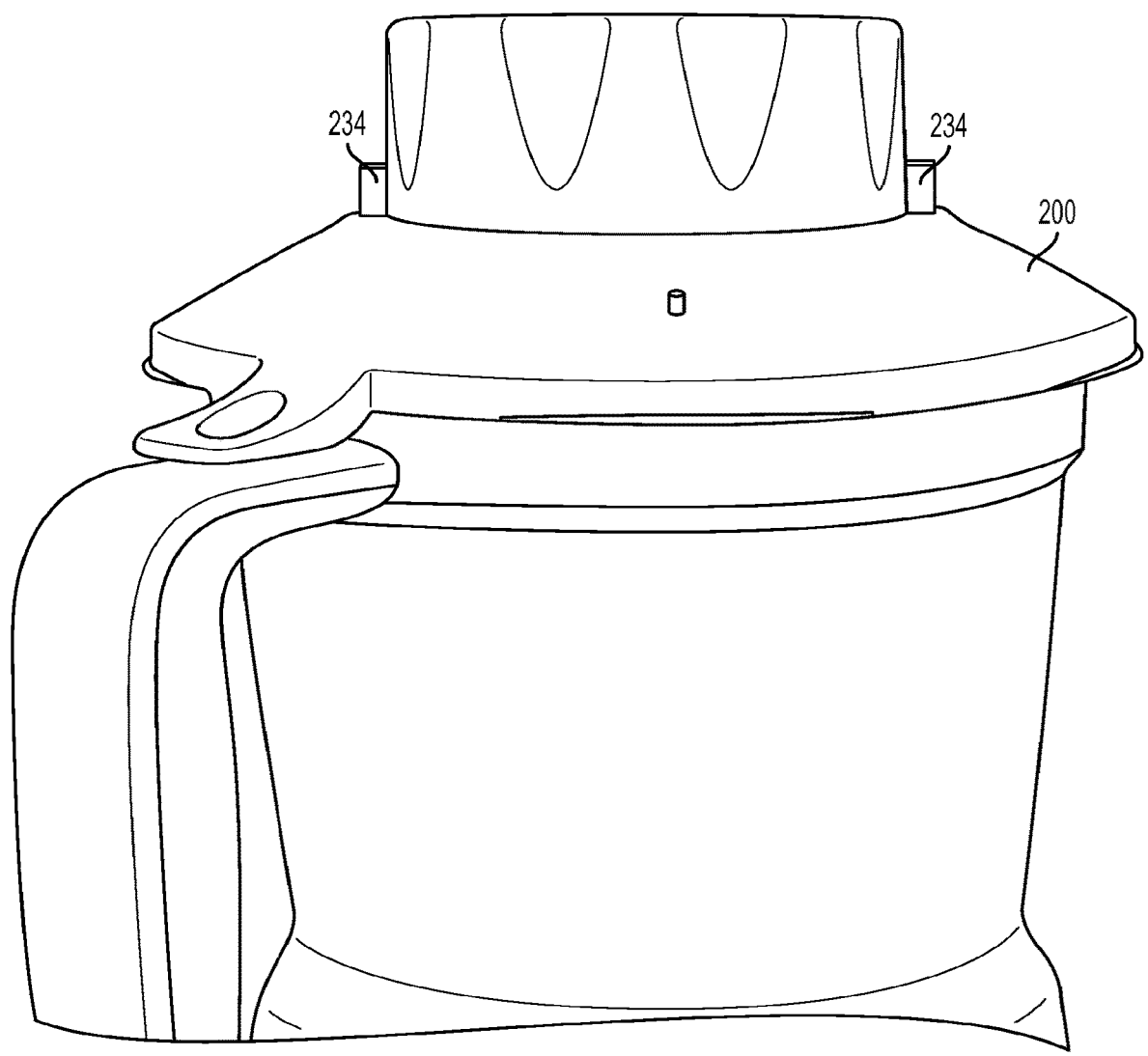
FIG. 14A depicts a container with a container lid having protrusions in accordance with one aspect.
Figure 14B:
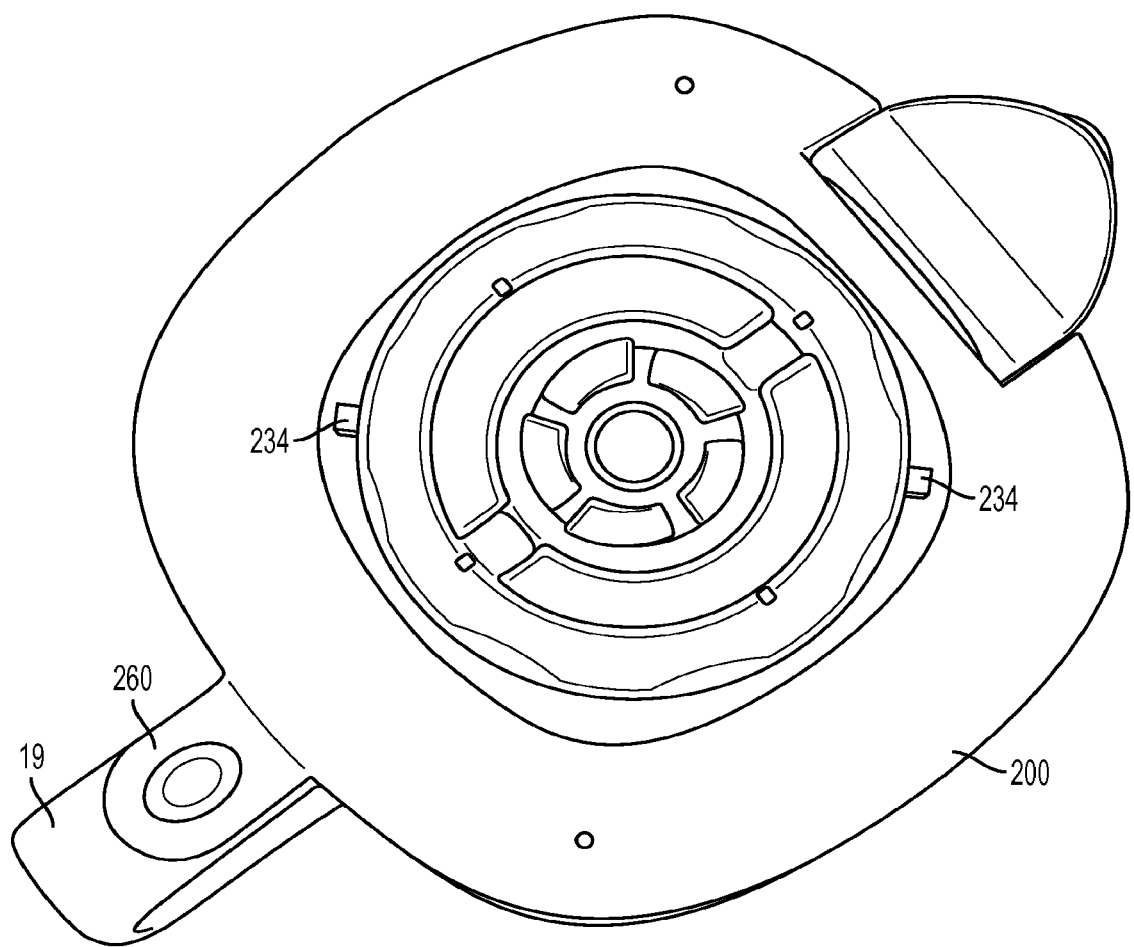
FIG. 14B is a top plan view of the container and container lid depicted in FIG. 14A.

As seen in FIGS. 14A-14B, the lid 200 includes two protrusions 234 that interact with plungers 130, 134. When the drive unit 100 is coupled to the lid 200 in an aligned orientation, the plungers 130, 134 of the drive unit 100 abut against the protrusions 234 of the lid 200, causing the plungers 130, 134 to move toward safety switches 170, 174, respectively. As a result, safety switches 170, 174 close when the drive unit 100 is coupled to the lid 200 in an aligned orientation. In some embodiments, at least two safety switches are included, and all safety switches must be closed before the drive unit can be actuated. The safety switches may be arranged to be spaced 180 degrees apart from one another to verify proper alignment and complete coupling of the drive unit to the container lid. For example, if the drive unit were improperly coupled to the container lid such that one side of the drive unit abutted against the lid but the other side were raised such that the drive unit is tilted relative to the drive unit, one of the safety switches may be closed while the other is not. The safety switches may be arranged such that the drive unit cannot be actuated unless all safety switches are closed.

Figure 14C:
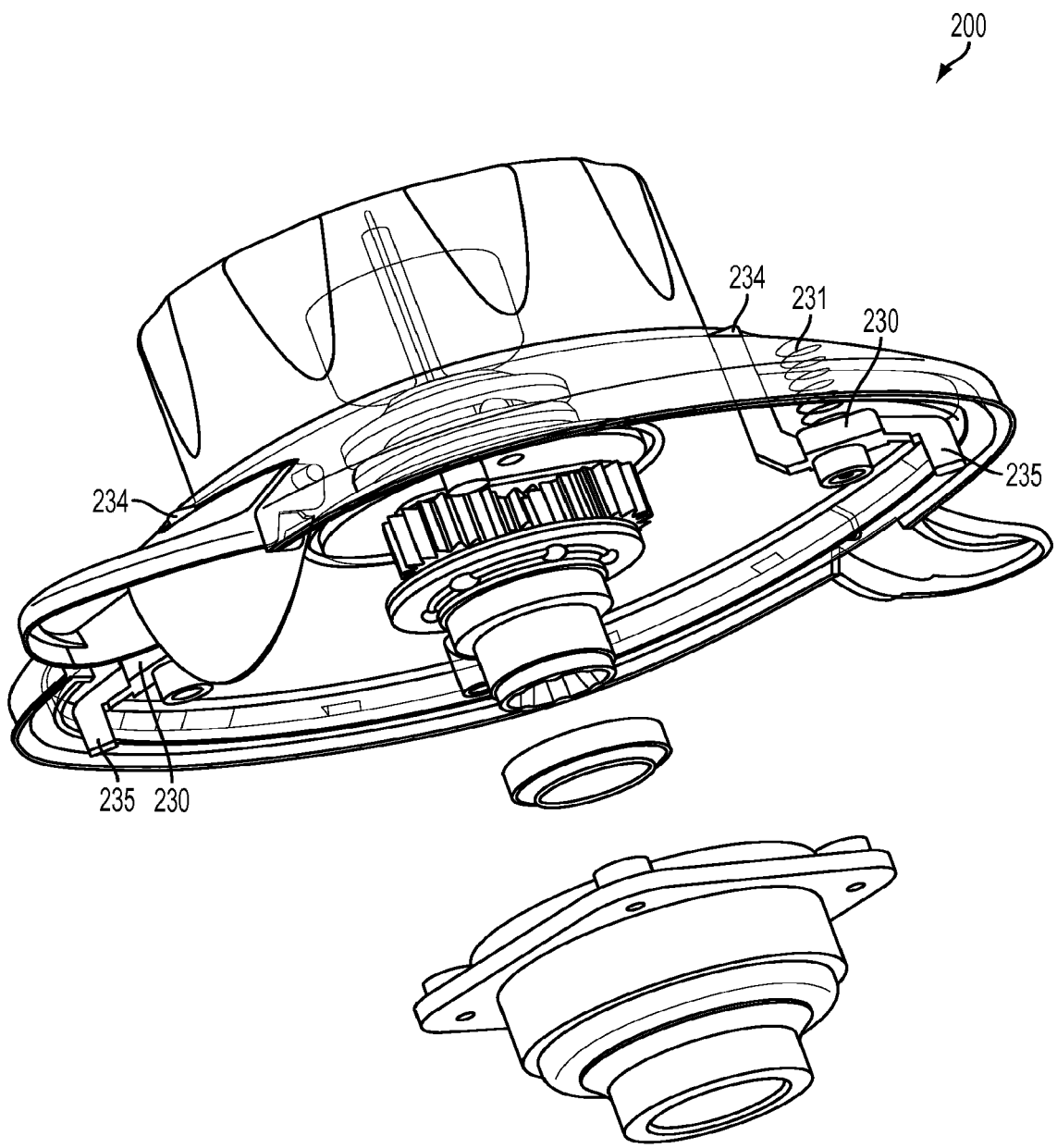
FIG. 14C depicts the lid of FIG. 14A in phantom to reveal two interlocks.

As seen in FIG. 14C, each protrusion 234 is located at the top end of an interlock 230. The interlock 230 is biased by a spring 231 toward a downward position where the top end 234 of the interlock 230 is in a lowered, non-protruding or semi-protruding position, and the bottom end 235 of the interlock 230 protrudes below a bottom surface of the lid 200. When the lid 200 is coupled to the container 10, the bottom end 235 of the interlock 230 abuts against a rim of the container 10 and causes the interlock 230 to be pushed upwardly, thereby causing the top end 234 of the interlock 230 to protrude. In some embodiments, the interlock 230 may serve as an additional safety feature. That is, unless the lid 200 is properly secured to the container 10, the interlock remains in a downward position where the top end 234 of the interlock does not protrude sufficiently to trigger the safety switches 170, 174 of the drive unit to close. If the safety switches 170, 174 are not closed, the drive unit cannot be actuated in this embodiment. As seen in FIG. 14C, the lid 200 may have two interlocks 230. In other embodiments, the lid may have only one interlock, or may have three or more interlocks.

Of course, it should be appreciated that other arrangements for disabling the drive unit before the lid is attached to the container can be used. For example, the lid and container may use one or more sensors, other interlock arrangements, or any other suitable arrangement, as this aspect is not necessarily so limited.

Figure 15B:
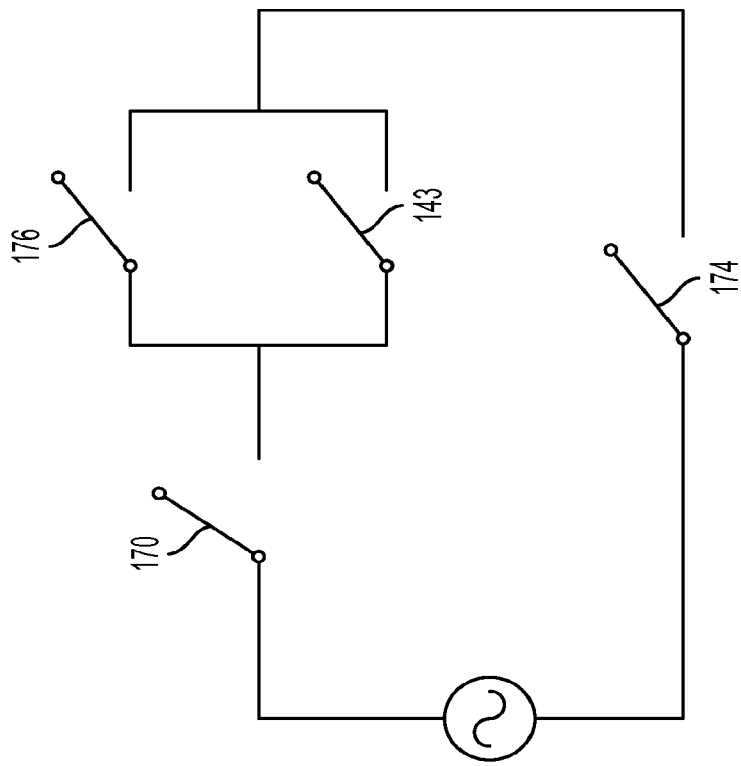
FIG. 15B is a schematic representation of the actuation arrangement of the drive unit in accordance with an aspect.
Figure 15A:
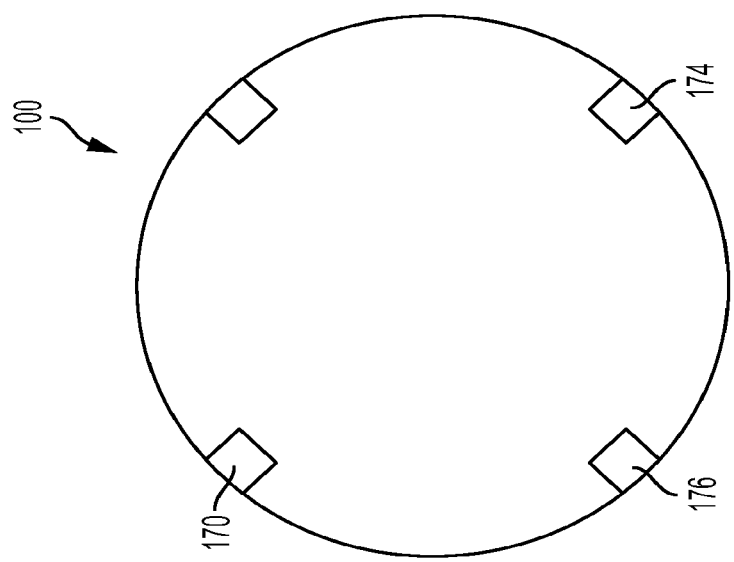
FIG. 15A is a schematic representation of the switches of the drive unit in accordance with an aspect.

FIG. 15A depicts a schematic representation of the switches 170, 174 and 176 of the drive unit 100. FIG. 15B depicts a schematic circuit diagram of the drive unit, where 170 and 174 are the safety switches. Switch 143 that is the activator that is triggered by depression of the button 110 located at the first end 120 of the drive unit (see FIG. 3A). Switch 176 is a second activator associated with the second mode of operation, as will be discussed. The circuit diagram of FIG. 15B illustrates that both safety switches 170 and 174 must be closed to complete the circuit, but only one of the switches 143 or 176 needs to be closed to complete the circuit and actuate the drive unit. Switch 143 closes when the drive unit is operated in the first mode of operation and switch 176 closes when the drive unit is operated in the second mode of operation.

Figure 16A:
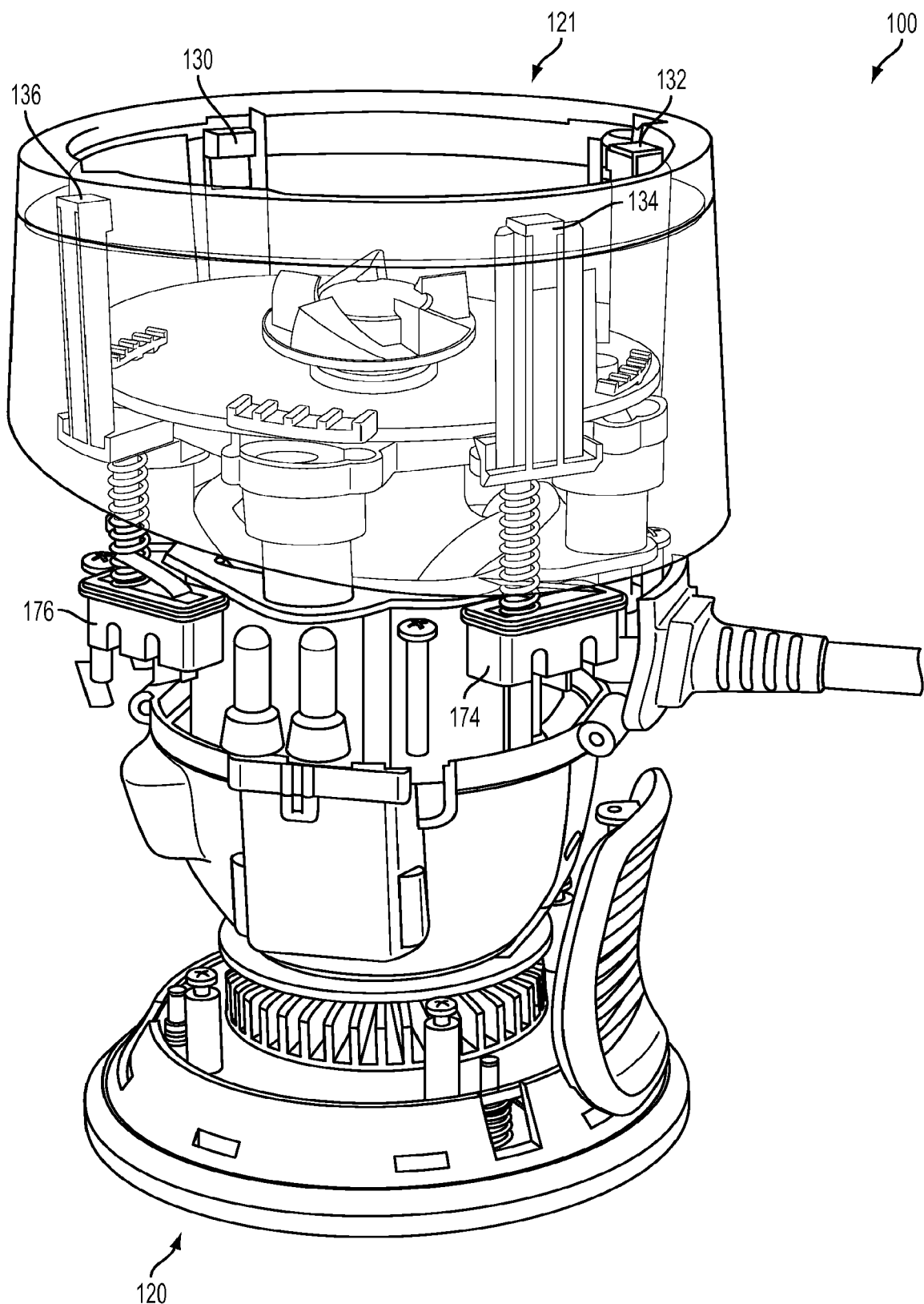
FIG. 16A is a perspective view of a drive unit arranged in the second orientation for use in the second mode of operation with portions of the outer housing hidden or shown in in phantom.
Figure 16B:
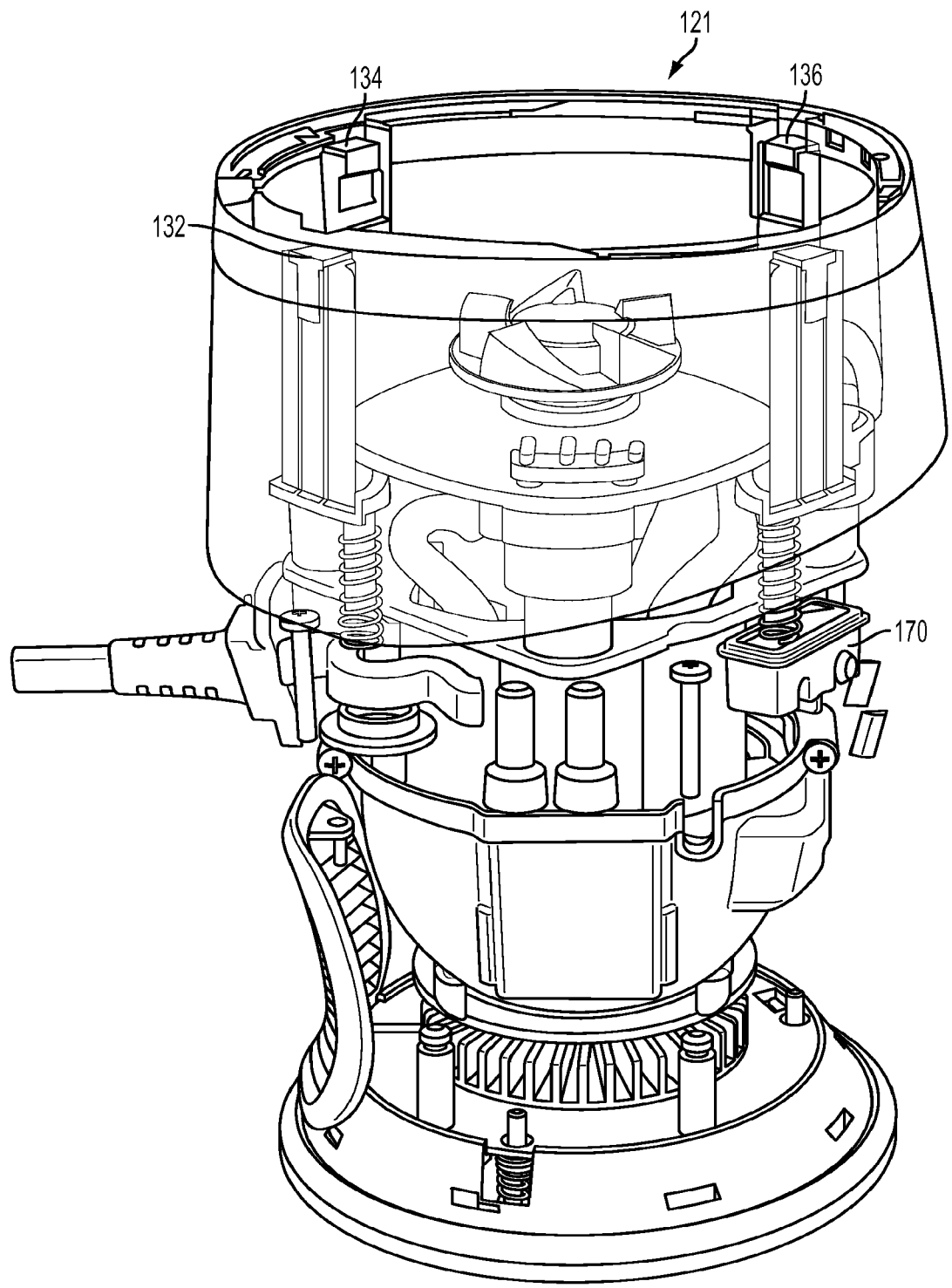
FIG. 16B is a perspective view of the opposite side of the drive unit shown in FIG. 16A.

Actuation of the drive unit in the second mode of operation will now be described. As discussed above, in the second mode of operation, the second container 20 is supported by the drive unit 100, as seen in FIG. 3B. As such, the drive unit 100 is oriented with the second end 121 facing upward and the first end 120 facing downward, as shown in FIGS. 16A-16B. The tabs 22 of the second container 20 (see FIGS. 8A-8B) are aligned with and rest upon the plungers 130, 132, 134 and 136 of the drive unit 100. The weight of the container 20 alone is insufficient to cause the plungers 130, 132, 134 and 136 to move toward their associated switches, and thus when the tabs 22 of container 20 are resting upon the plungers 130, 132, 134 and 136, none of the switches 170, 174 and 176 are closed. However, when a user presses down on the container 20 as seen in FIG. 3B, the tabs 22 abut against and move the plungers 130, 132, 134 and 136 towards the first end 120 of the drive unit. The ends of the plungers 130, 134 and 136 abut against and close switches 170, 174 and 176, respectively.

Turning back to circuit diagram FIG. 15B, with safety switches 170 and 174 closed and with switch 176 closed, the drive unit is actuated. Thus, in the second mode of operation, when the container 20 is properly aligned with the drive unit 100, and a user pushes the container 20 down toward the drive unit 100, the drive unit is actuated. The user can repeatedly press down on the container, release, then press down again to create a pulsing action. The user can also maintain pressure onto the container 20 to create a continuous processing action. In some embodiments, the drive unit may have features that permit the container to be releasably locked in an actuated position. For example, the user may press down on the container 20, and, while still applying downward pressure, rotate the container 20 relative to the drive unit 100 such that the tabs 22 of the container 20 slide under a locking surface in the drive unit 100 that hold the tabs 22, and thus the container 20, in a releasably locked position such that the switches associated with drive unit actuation remain closed. In this manner, a user need not maintain pressure on the container. Instead, the locking feature of the drive unit 100 may hold the container in the actuating position. The user may then release the container from the locked, actuating position by rotating the container 20 back relative to the drive unit into an unlocked orientation.

In some embodiments, such as the embodiment depicted in FIG. 12B, one of the plungers is a plunger that is not associated with any switch. As seen in FIGS. 12A-12B, while plungers 134, 136 and 130 are each associated with a switch, plunger 132 is not associated with a switch. Movement of plunger 132 towards the first end 120 of the drive unit does not close a switch. The plunger may be included for symmetry and to provide stability to the assembly. For example, inclusion of a fourth plunger may help to keep the container from tilting to one side as the container is pushed downward toward the first end of the drive unit. In other embodiments, however, an additional safety switch that is associated with plunger 132 may be included in the drive unit.

It should be appreciated that the drive unit may be actuated in other arrangements in the second mode of operation. For example, instead of having a user press down on the container, the drive unit itself may include an activation site with which a user interacts. For example, the drive unit may include a control panel, button, or other suitable activation site that a user interacts with to actuate the drive unit in the second mode of operation.

Figure 17A:
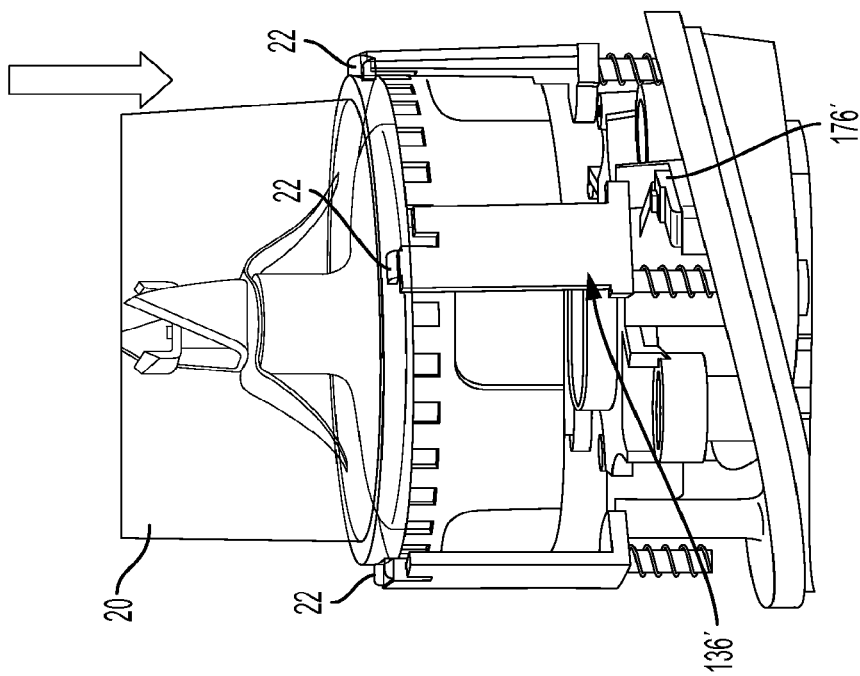
FIG. 17A depicts a method of actuating a different embodiment of a drive unit in a first mode of operation in accordance with one aspect.
Figure 17B:
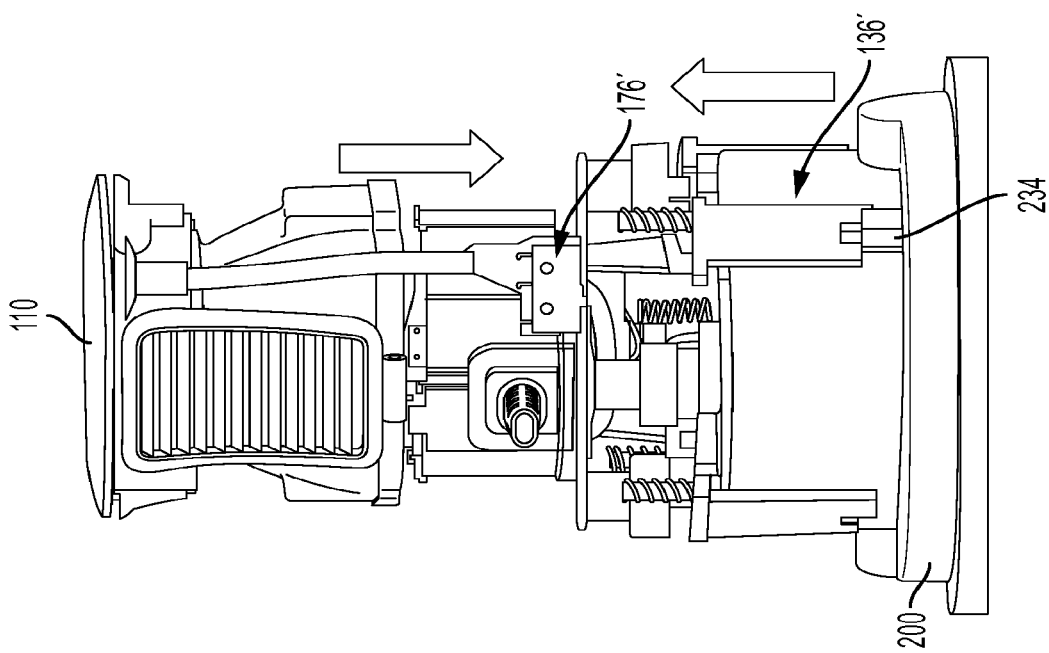
FIG. 17B depicts a method of actuating the drive unit of FIG. 17A in a second mode of operation.

While the embodiment above uses a first activator, switch 143, in the first mode of operation, and a second, different activator, switch 176, in the second mode of operation, it should be appreciated that, in other embodiments, the first and second modes of operation may use the same activator to actuate the drive unit. For example, as seen in FIGS. 17A-17B, an activator, switch 176', is used to actuate the drive unit in both the first and second modes of operation. As seen in FIG. 17A, when the drive unit is coupled to and aligned with container lid 200, the protrusion 234 on the lid 200 abuts against the plunger 136' and raises the plunger 136' a first distance toward the switch 176'. Next, a user pushes down on button 110. As seen in FIG. 17A, the button 110 is coupled to the switch 176' such that translation of the button 110 causes the switch 176' itself to translate with the button. Thus, as a user pushes button 110 down toward the plunger 136', switch 176' moves down towards the plunger 136' as well. Movement of the switch 176' toward the plunger 136' causes the switch 176' to abut against the plunger 136', which causes the switch 176' to close. Closure of switch 176' actuates the drive unit. In some embodiments, one or more safety switches also must be closed before the drive unit can be actuated, as discussed in previous embodiments.

FIGS. 18A-18C schematically illustrate actuation of the drive unit in the first mode of operation. As seen in FIGS. 18A-18B, when the drive unit is coupled to and aligned with the container lid 200, the protrusion 234 on the lid 200 abuts against the plunger 136' and raises the plunger 136' a first distance D1 toward the activator, switch 176'. Next, as seen in FIGS. 18B-18C, a user pushes down on button 110, which causes switch 176' to move downward toward the plunger 136' by a distance D2 until the switch 176' abuts against the plunger 136', thus closing the switch 176'.

As seen in FIG. 17B, downward movement of the container 20 causes tabs 22 to abut against and move plunger 136' downward toward the switch 176', which causes the plunger 136' to abut against and close the switch 176'.

Although the switches are shown as horizontal switches, it should be appreciated that vertical switches may be used as well, such as switch 176" depicted in FIGS. 19A-19C. With a vertical switch, the switch 176" may continue to move past plunger 136' after the switch 176" has been closed, as seen in FIG. 19C.

The inventors have recognized that when a user pours contents out of a container or otherwise tilts the container, the lid of the container can become detached from the container. According to one aspect, the lid and/or container may include one or more engagement features that help to facilitate engagement of the lid with the container.

Figure 21:
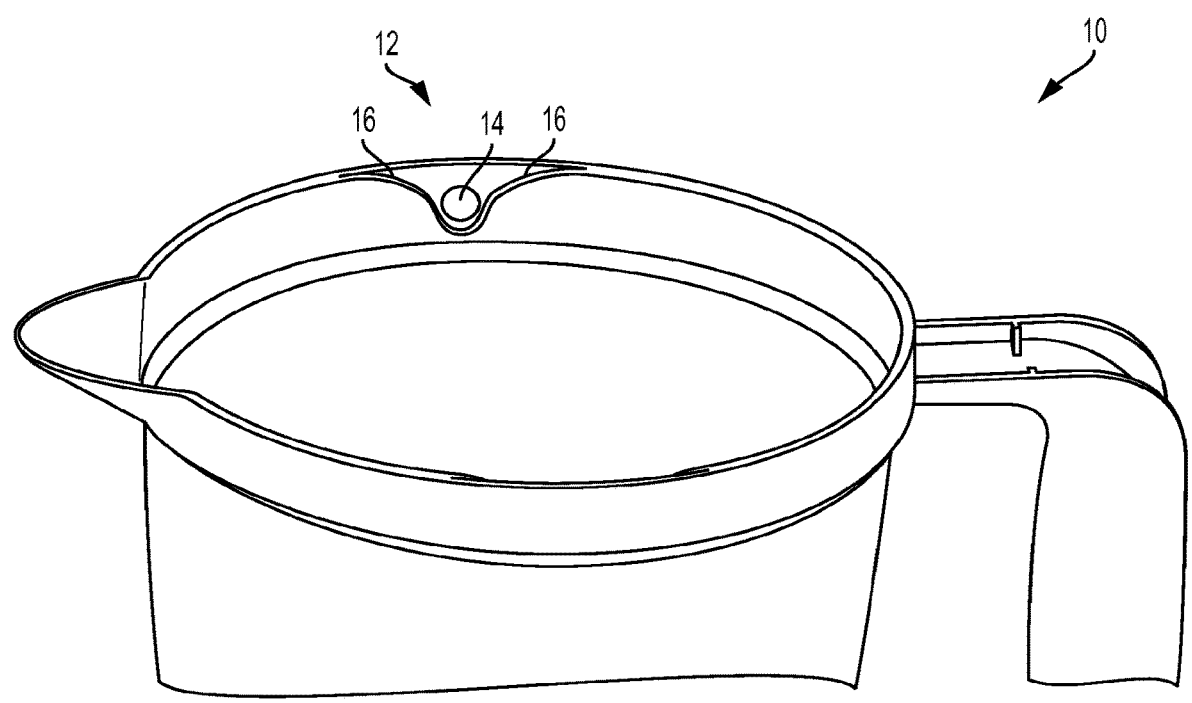
FIG. 21 is a perspective view of a top portion of a container in accordance with one aspect.

As discussed above, the first container includes a lid that can be attached and removed from the container. In one embodiment, shown in FIGS. 20-21, the lid 200 includes an indexing feature 262 and an indentation 264. An identical or similar second indexing feature and indentation may be included on the opposite side of the lid. The indexing feature 262 may cooperate with a corresponding alignment feature 12 on the container 10, as seen in FIG. 21. When a user places the lid 200 onto the opening of container 10, the indexing feature 262 is received by the alignment feature 12. As the user pushes the lid 200 down into the opening of the container 10, the indexing feature 262 may slide against the sloped edges 16 of the alignment feature on the container 10, which helps guide indexing feature 262 toward the aligned orientation. When the indexing feature 262 settles into the aligned orientation, a protrusion 14 on the container 10 is received by the indentation 264 of the lid 200, and engagement of the protrusion with the indentation may help to keep the lid 200 engaged with the container 10. The lid 200 also may include a gasket 250 that forms a seal against the inner sidewall of the container 10 when the lid 200 is engaged with the container 10.

It should be appreciated that other arrangements may be used to help keep the lid engaged with the container. The lid and container may use a physical interlock, one or more detents, one or more magnets, an interference-type fit, one or more latches, a screw-top arrangement, or any other suitable arrangement, as this aspect is not so limited.

Figure 22A:
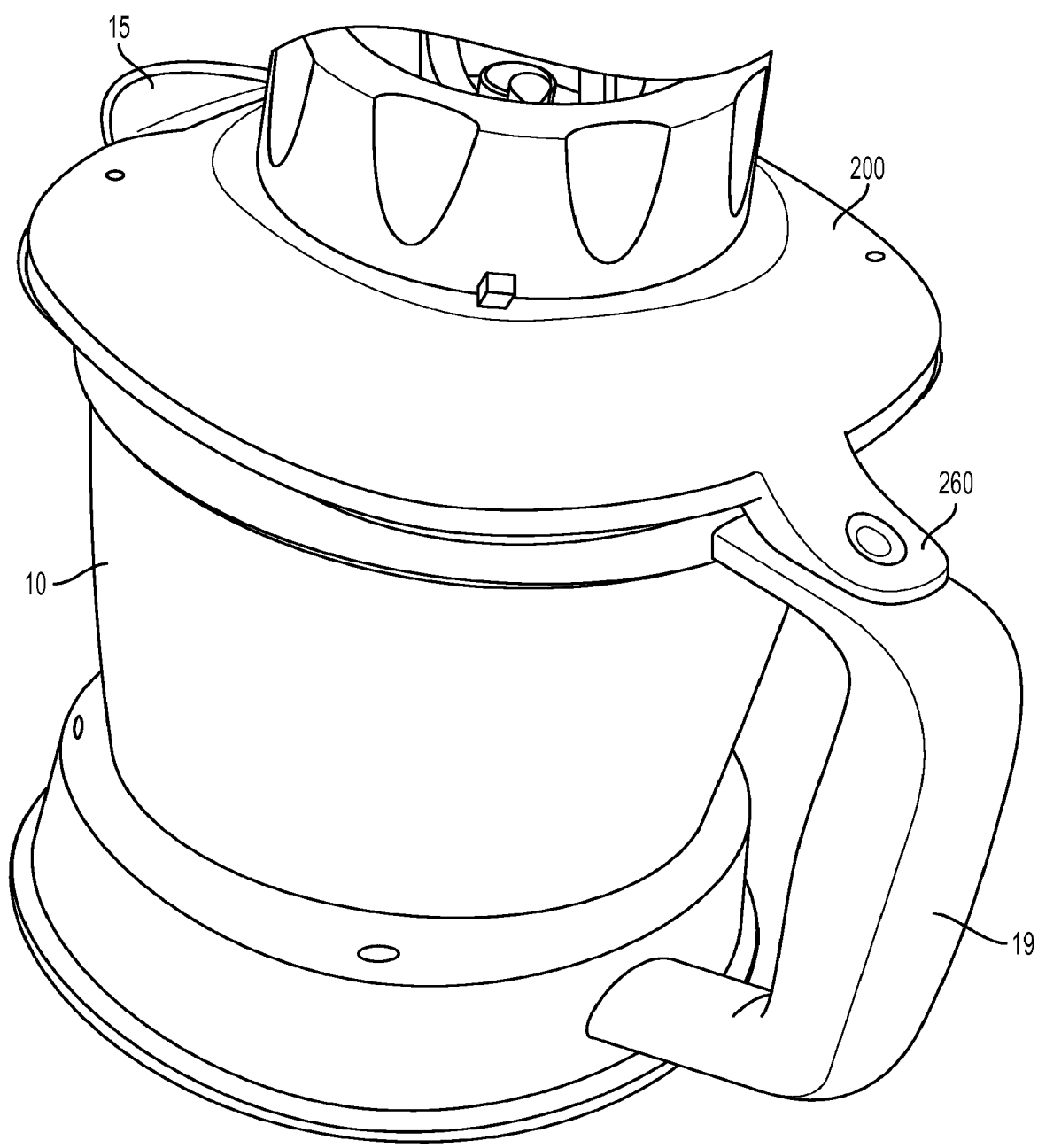
FIG. 22A is a perspective view of a container and a container lid, the container lid having a tab that overlies a handle of the container in accordance with one aspect.
Figure 22B:
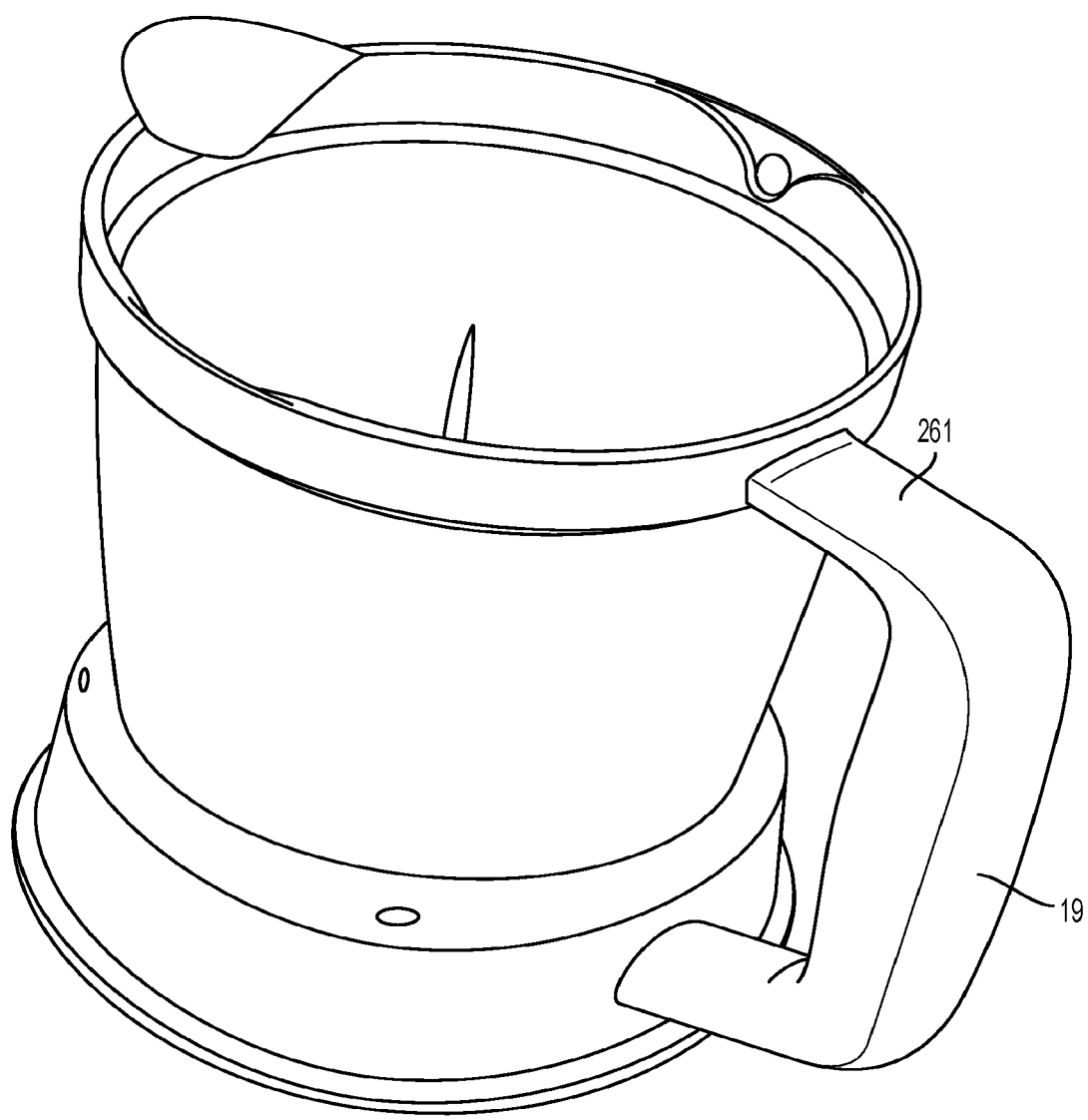
FIG. 22B is a perspective view of the container depicted in FIG. 22A with the container lid removed.

In some embodiments, as seen in FIG. 22A, the lid 200 may include a tab 260 that extends from the lid and overlies a portion of the handle 19 of the container 10. Additional views of the tab 260 can be seen in FIGS. 1, 5, 6, 9 and 14B. In some embodiments, when the user wishes to pour contents from inside the container 10 out of a spout 15, the user may grasp the handle 19, with the thumb pressing the tab 260 downward towards the handle 19. In this manner, the user compresses the tab 260 against a top surface 261 of the handle 19 (see FIG. 22B), which may allow the user to help maintain engagement of the container lid 200 to the container 10 when the container 10 is tipped forward to pour contents out of the spout 15. In some embodiments, the tab may be flexible to facilitate compression of the tab toward the handle.

In an illustrative embodiment, a food processing apparatus is provided. The food processing apparatus includes a first container having an opening and a drive unit configured to drive a first processing tool in the first container. The food processing apparatus also includes a lid configured to couple with the first container. The lid includes an indexing feature that cooperates with an alignment feature on the first container to facilitate alignment between the lid and the first container. In some embodiments, the indexing feature may comprise a protrusion and the alignment feature comprises at least one sloped edge that guides the protrusion toward the aligned orientation. In some embodiments, the lid may include an indentation that receives a protrusion of the container such that interaction with the indentation and the protrusion resists detachment of the lid from the container. In some embodiments, the food processing apparatus may be provided as part of a food processing apparatus, the food processing apparatus further comprising a second container, where the drive unit is configured to drive a second processing tool in the second container.

In another illustrative embodiment, a food processing apparatus is provided. The food processing apparatus includes a first container having a handle, an opening and a drive unit configured to drive a first processing tool in the first container. The food processing apparatus also includes a lid configured to couple with the first container. The lid includes a tab that overlies the handle of the first container when the lid is coupled to the first container. The tab is configured to be compressed against the handle by a user to resist separation of the container lid from the container. In some embodiments, the tab may be compressed against the handle by a thumb of the user.

Aspects associated with the container lid will now be discussed. According to one aspect, the container lid may house a transmission system that drives a processing tool at a different speed and/or rotational direction than the output from the drive unit.

The transmission system receives power from the drive coupling of the drive unit and drives an output that couples to a processing tool. The transmission system receives power from the drive coupling of the drive unit at a first speed and direction, and drives the output at a different speed and/or direction. In some embodiments, the transmission system may be a reduction type transmission where the transmission system drives the output shaft at a speed that is lower than that of the drive unit, but at a higher torque than the drive unit. In other embodiments, the transmission system may be an overdrive type transmission where the transmission system drives the output shaft at a speed that is higher than that of the drive coupling, but at a lower torque than the drive coupling.

Figure 23:
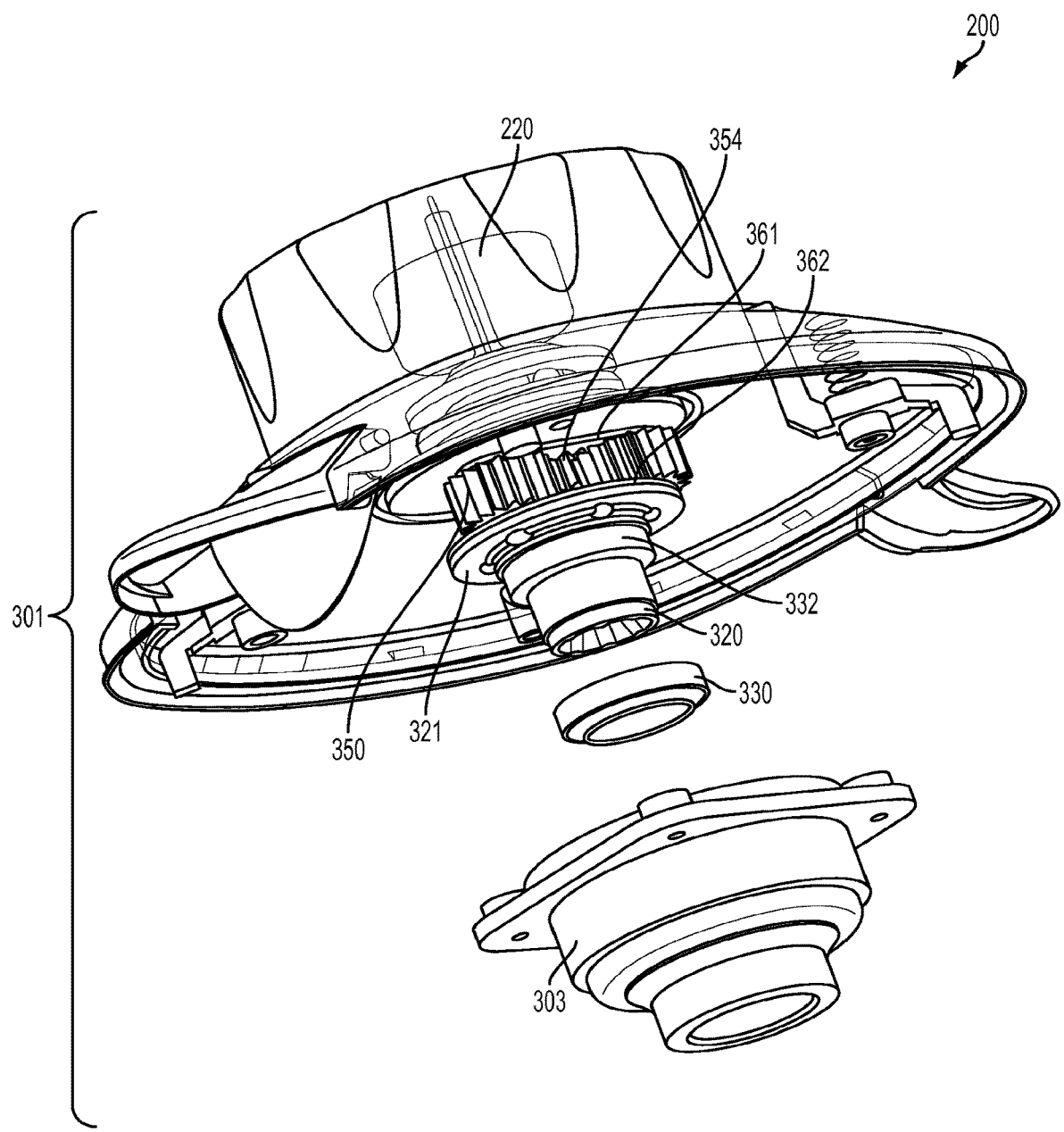
FIG. 23 is an exploded view of a container lid that houses a transmission system accordance with one aspect.

As seen in FIG. 23, the transmission system 301 drives the output coupling 320 at a different speed and/or direction than that of the driven coupling 220, which is driven by a drive coupling 124 of the drive unit. The transmission system 301 may serve as a reduction type transmission or an overdrive type transmission.

Where the transmission system 301 is a reduction type transmission, the transmission system 301 may have any suitable gear reduction, as this aspect is not limited in this regard, For example, the transmission system 301 may have a gear reduction ratio of 2:1, 3:1, 4:1, 5:1, 6:1, 7:1, 8:1, 9:1, or 10:1. Where the transmission system 301 is an overdrive type transmission, the transmission system 301 may have any suitable overdrive ratio, as this aspect is not limited in this regard, For example, the transmission system 301 may have an overdrive ratio of 1:2, 1:3, 1:4, 1:5, 1:6, 1:7, 1:8, 1:9, or 1:10. The transmission system 301 may be any suitable transmission system, such as, but not limited to, a planetary gear system, a step gear system, worm gears, beveled gears, and/or spur gears.

In the embodiment shown in FIG. 23, the transmission system 301 includes a planetary gear system with a sun gear 354 and a plurality of planet gears 350 surrounding the sun gear 354. The planetary gear system may have any number of planet gears, including 2, 3, 4, 5, 6, 7, 8, 9, 10, or more planet gears, as this aspect is not limited in this regard. Rotation of the sun gear 354 about its axis causes the planet gears 350 to both rotate about their own individual planet axes and to revolve around the sun gear 354 within a ring gear inside a transmission housing 303.

The planet carrier includes two plates: an upper plate 361 and a lower plate 362. Each planet gear rotates about an axle that passes through the planet gear along the planet gear's longitudinal axis. The upper end of each axle is attached to the upper plate 361, and the lower end of each axle is attached to the lower plate 362. Revolution of the planet gears 350 around the sun gear 354 causes the upper and lower plates 361, 362 to rotate about the sun axis. The lower plate 362 is rotationally fixed to a coupling plate 321 of the output coupling 320. Thus, rotation of the lower plate 362 about the sun axis causes the output coupling 320 to rotate about the sun axis as well. The output coupling 320 engages with a coupling on a processing tool to drive the processing tool. A bearing 332 may permit rotation of the output coupling 320 relative to the transmission housing 303.

According to one aspect, the transmission system is sealed to prevent ingress of liquid and debris into the transmission housing. As seen in FIG. 23, the transmission system 301 includes a lip seal 330 that is mounted onto the output coupling 320 of the transmission system. When the transmission system 301 is assembled, the lip seal 330 is compressed between the outer surface of the output coupling 320 and the inner surface of the transmission housing 303. In the embodiment shown in FIG. 23, the output coupling 320 is directly coupled to the lower plate 362 of the planet carrier without an intervening output shaft. Without an intervening output shaft, the vertical length of the transmission system 301 may be shortened, which may permit a lower profile lid housing to contain the transmission system. In some cases, where the vertical height of the lid housing is limited to a maximum height, a lower profile transmission system may permit the underside of the lid to sit flat against a support surface. Transmission systems with longer vertical heights may protrude out from the lowermost surface of the lid housing. Such a protrusion may prevent the underside of the lid from sitting flat against a support surface.

Of course, it should be appreciated that the transmission system is not limited to the embodiment shown in FIG. 23. In other embodiments, the transmission system may include an output shaft that connects the plate carrier to the output coupling. In such embodiments, the lip seal may seal against the outer surface of the output shaft rather than the output coupling.

Figure 24A:
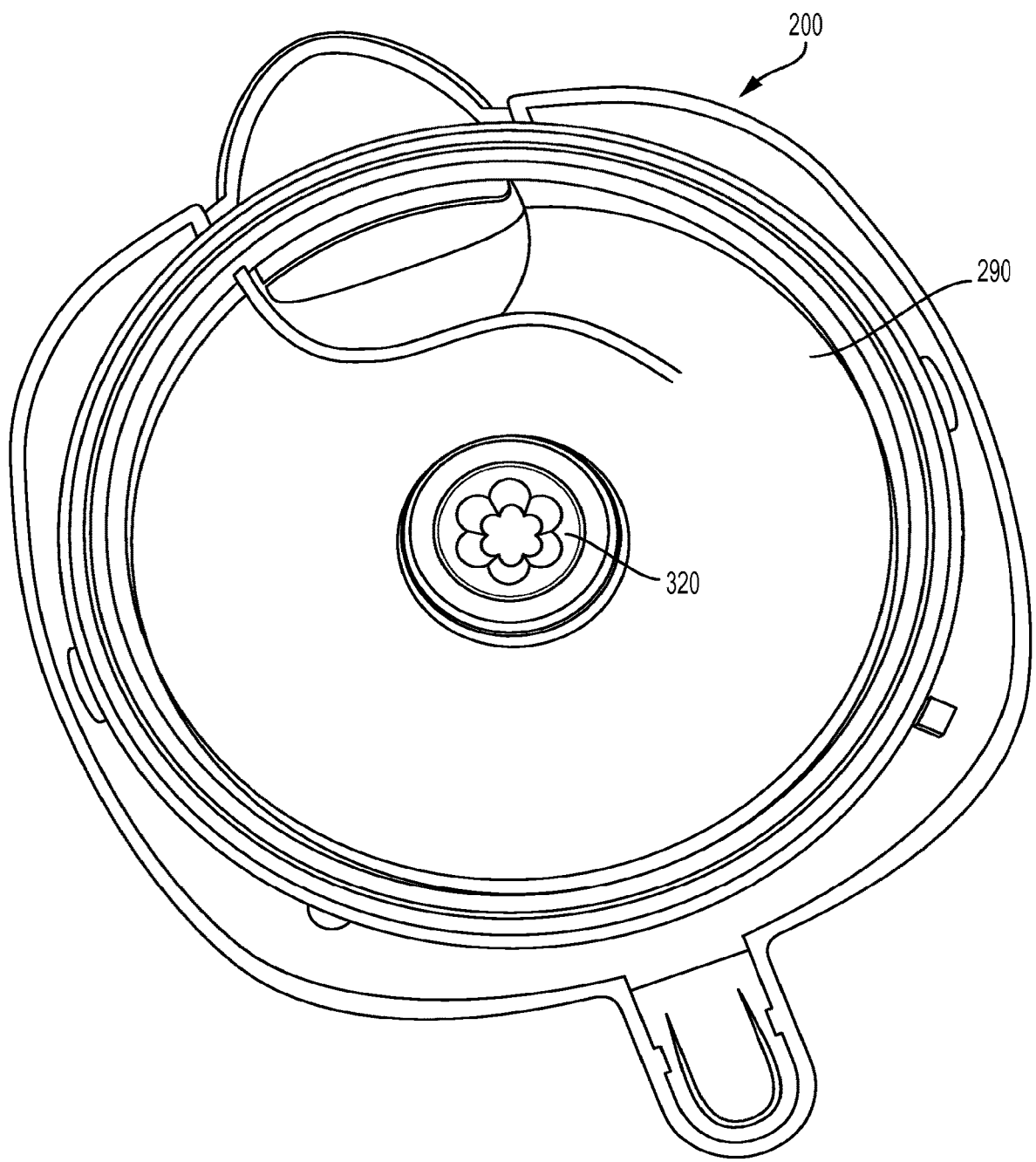
FIG. 24A depicts an underside of a container lid in accordance with one aspect.
Figure 24B:
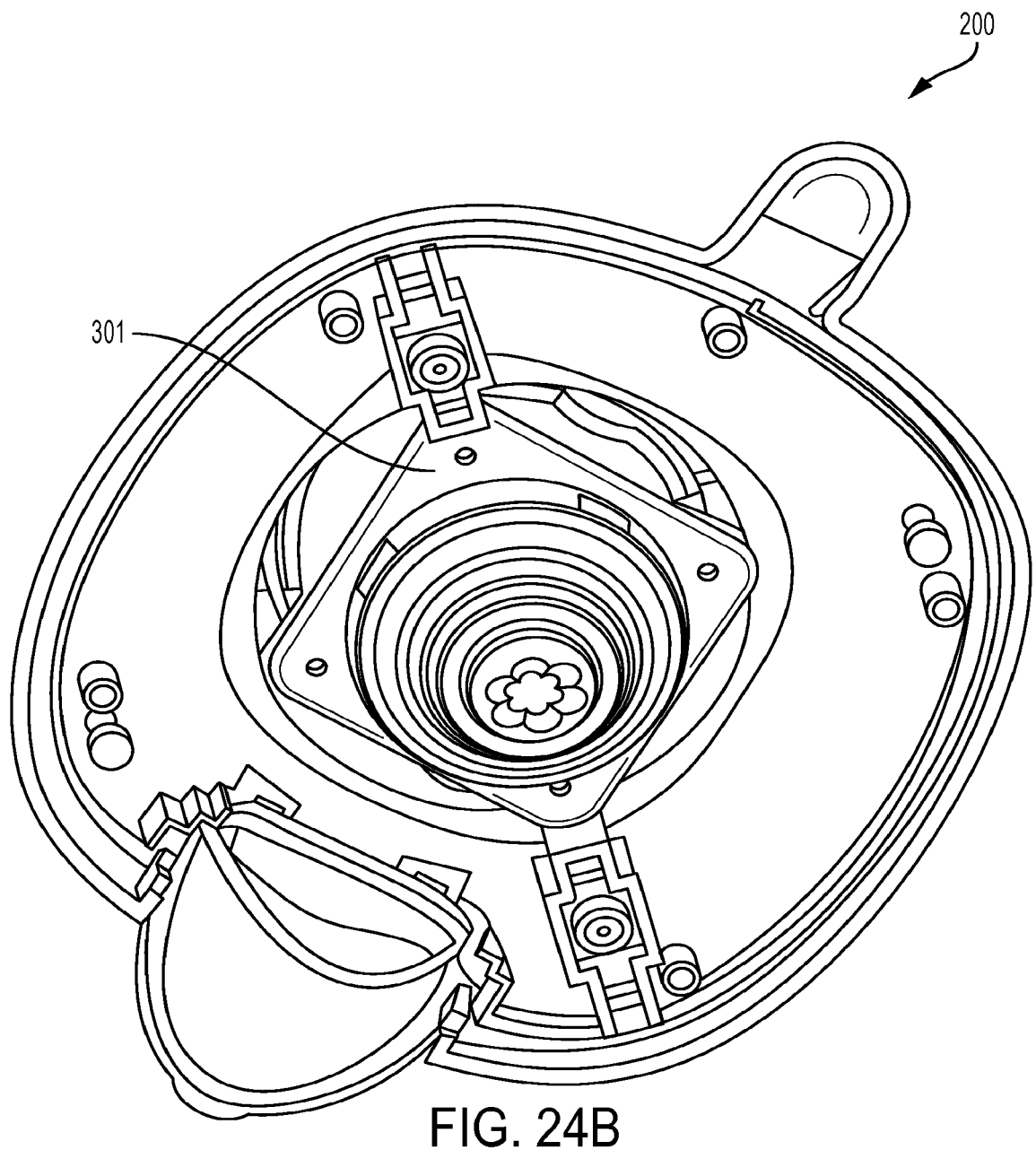
FIG. 24B depicts the container lid of FIG. 24A with the bottom surface of the lid removed.

In some embodiments, the underside of the lid includes a bottom surface that serves to house the transmission system. As seen in FIG. 24A, the lid 200 includes a bottom surface 290 such that the transmission system is housed inside the lid 200. The bottom surface 290 protects the transmission from liquids and debris and makes the underside of the lid 200 easier to clean. For example, by including a bottom surface 290, the number of crevices and edges, which can be difficult to clean, are reduced. FIG. 24B depicts the container lid of FIG. 24A with the bottom surface of the lid removed, revealing numerous crevices and edges that may be difficult to clean if exposed to liquid and/or debris.

In another illustrative embodiment, a food processing apparatus is provided. The food processing apparatus includes a first container having an opening and a drive unit configured to drive a first processing tool in the first container. The food processing apparatus also includes a lid configured to couple with the first container. The lid includes a transmission system configured to couple an output of the drive unit to an input of the first processing tool. The transmission system includes an output coupling and a seal mounted on the output coupling. In some embodiments, the transmission system may include a planetary gear system having a plate carrier, where the output coupling is directly coupled to the plate carrier.

In another illustrative embodiment, a food processing apparatus is provided. The food processing apparatus includes a first container having an opening and a drive unit configured to drive a first processing tool in the first container. The food processing apparatus also includes a lid configured to couple with the first container. The lid includes a transmission system configured to couple an output of the drive unit to an input of the first processing tool. An underside of the lid includes a bottom surface that reduces exposure of the transmission system to debris and liquids.

Aspects related to venting and draining of the drive unit will now be discussed. The inventors have recognized that, when the drive unit is used to support the processing container in the second mode of operation, liquids from the container may leak onto the drive unit. A drain system through the drive unit is provided to allow such liquids to drain out of the drive unit.

Figure 25:
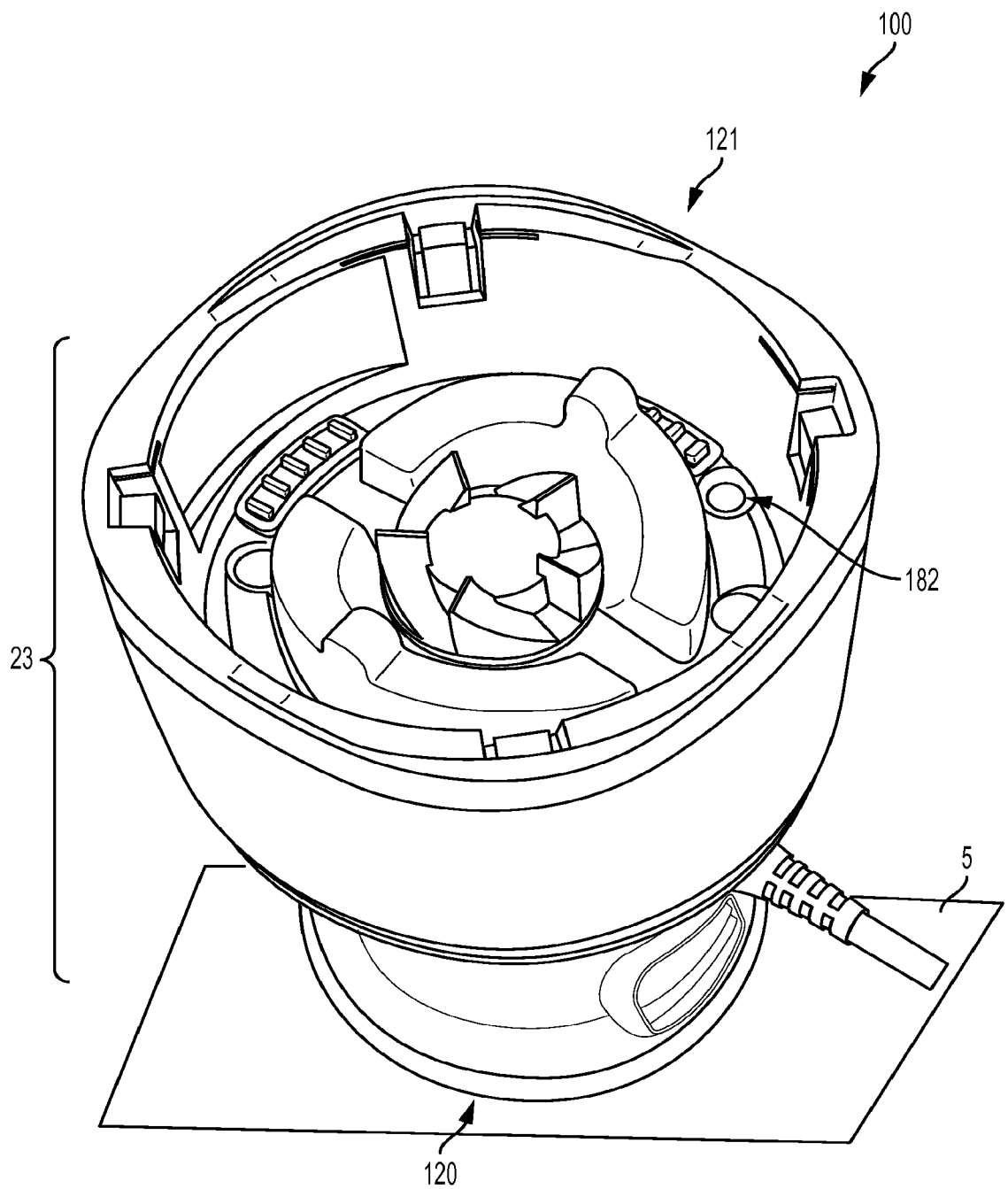
FIG. 25 is a perspective view of a second end of a drive unit having a drain hole in accordance with one aspect.
Figure 26B:
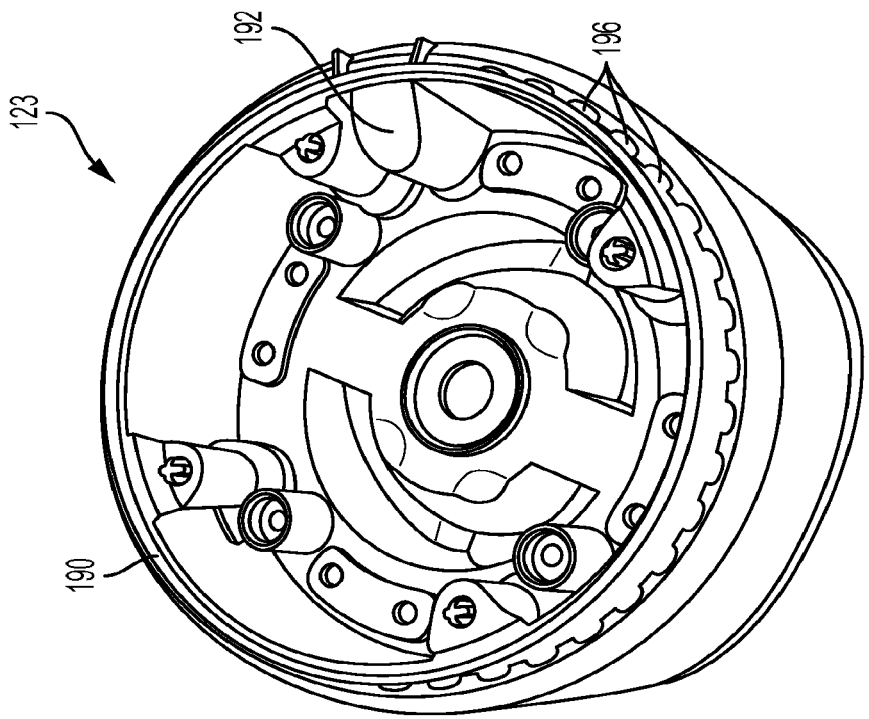
FIG. 26B is a perspective view of the segment depicted in FIG. 26A being coupled to a ring.
Figure 26A:
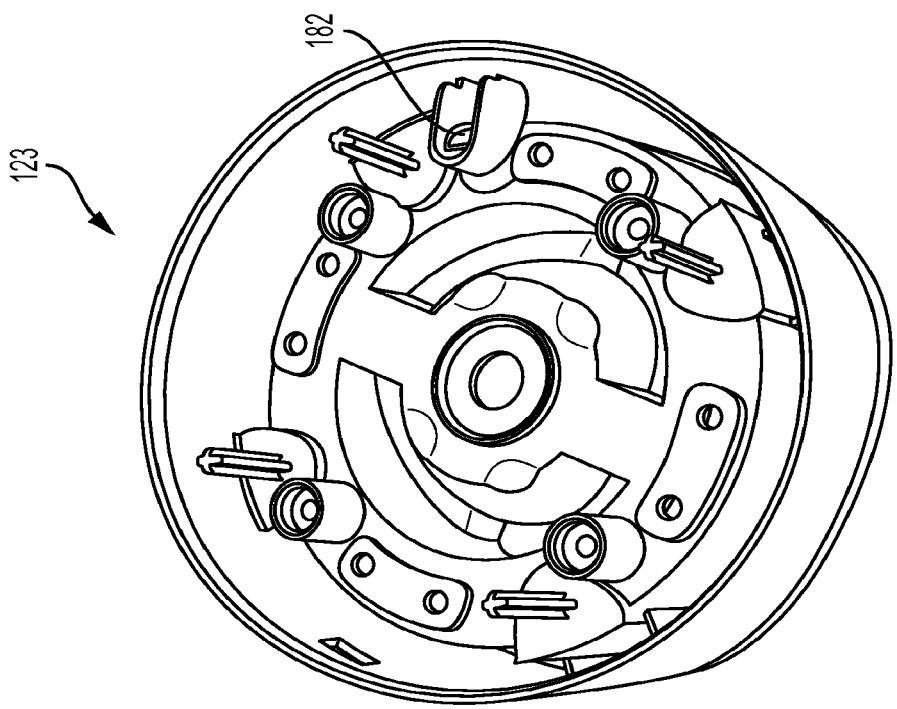
FIG. 26A is a perspective view of the underside of a segment of the drive unit having the drain hole depicted in FIG. 25.
Figure 27B:
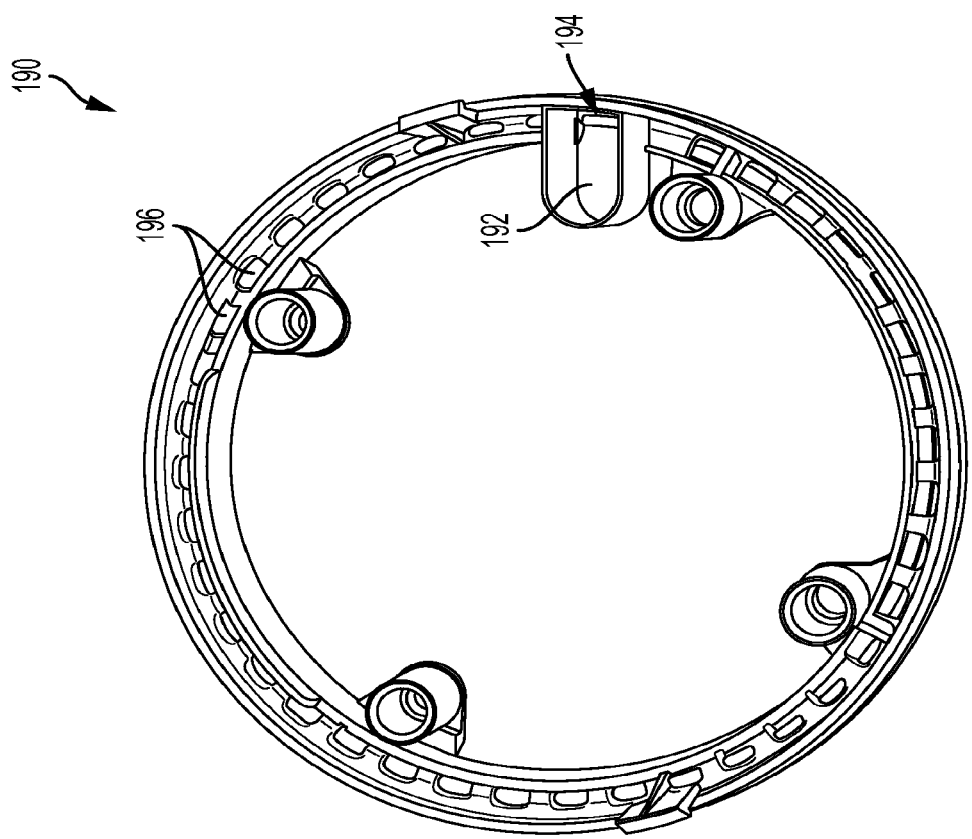
FIG. 27B is a perspective view of the opposite side of the ring as shown in FIG. 27A.
Figure 27A:
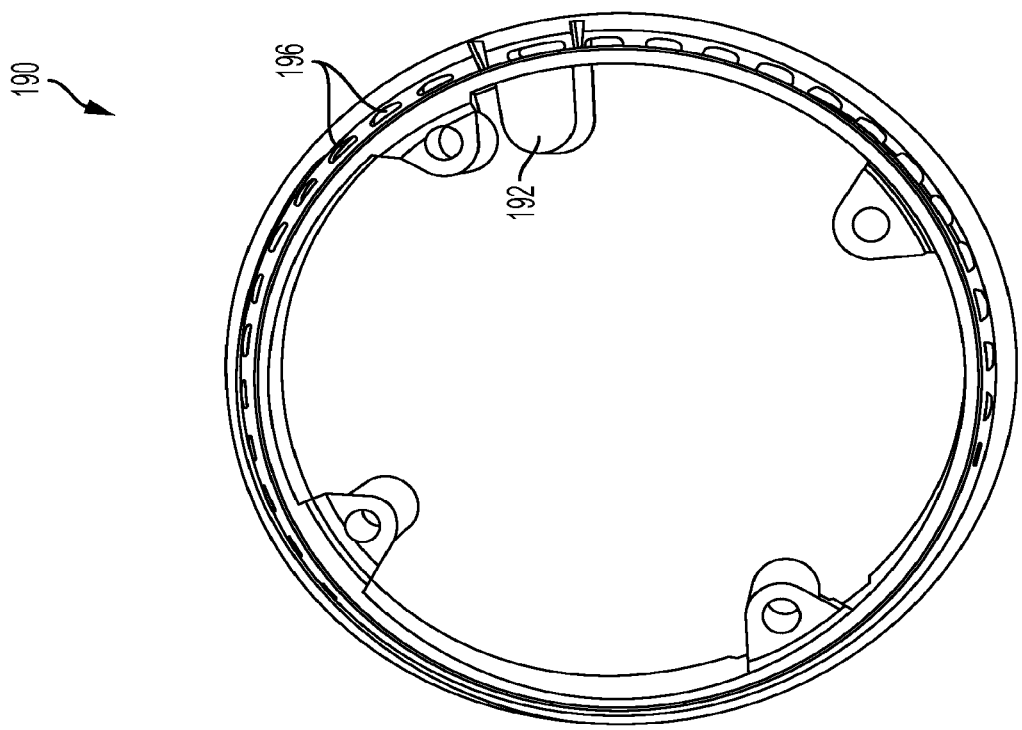
FIG. 27A is a perspective view of the ring depicted in FIG. 26B.
Figure 27C:
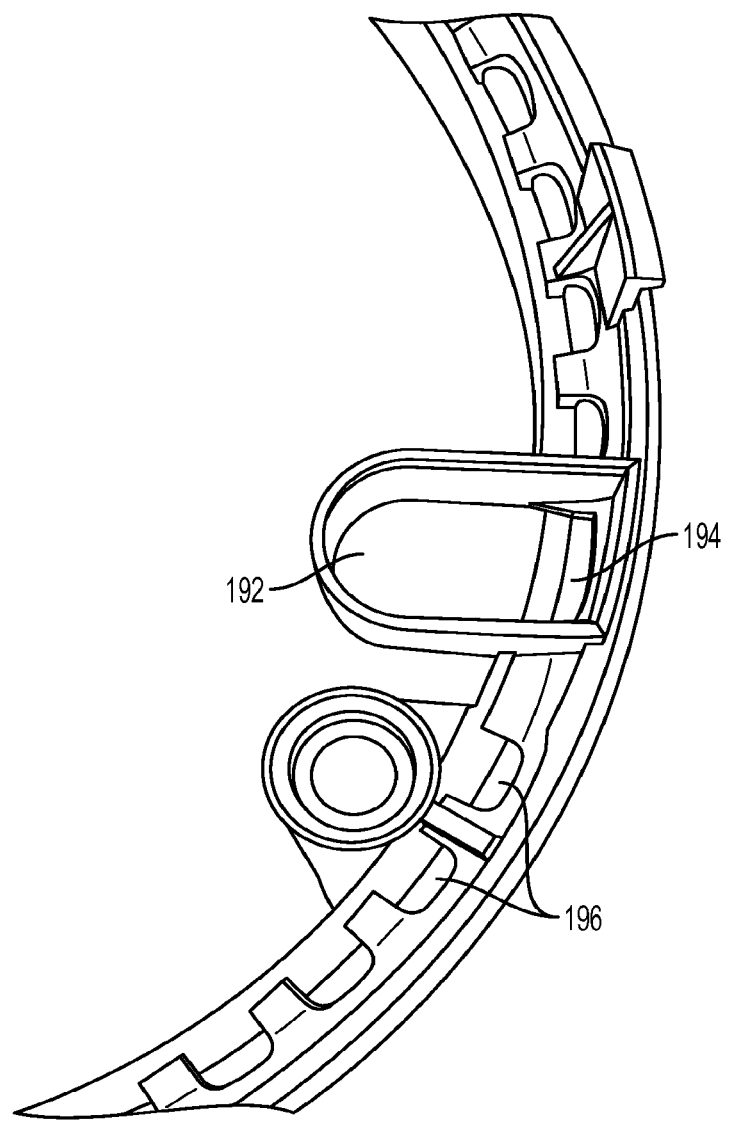
FIG. 27C is an enlarged view of the ring depicted in FIG. 27A, the ring having a drain collector and drain outlet.

In some embodiments, as seen in FIG. 25, the drive unit is oriented for use in the second mode of operation. The first end 120 of the drive unit is set upon the support surface 5 and the second end 121 faces upwardly to receive a container. The second end 121 includes a drain hole 182 that permits liquids that drip into the second end 121 to escape out of the drive unit. The drain hole 182 is formed through the segment 123 of the drive unit. FIGS. 26A-26B depict the underside of the segment 123. The underside of the drain hole 182 is seen in FIG. 26A, which illustrates that drain hole 182 allows liquids to pass through the segment 123 of the drive unit. FIG. 26B shows the segment 123 of the drive unit coupled to a ring 190. The ring 190 includes a drain collector 192 that fits over the underside of the drain hole 182 and prevents liquids from passing further into the drive unit. FIGS. 27A-27C depict the ring 190 in isolation. FIG. 27A depicts the ring 190 in the orientation seen in FIG. 26B. FIG. 27B depicts the other side of the ring 190, illustrating that drain collector 192 includes a drain outlet 194. FIG. 27C is an enlargement of the drain collector 192 and drain outlet 194.

Figure 28A:
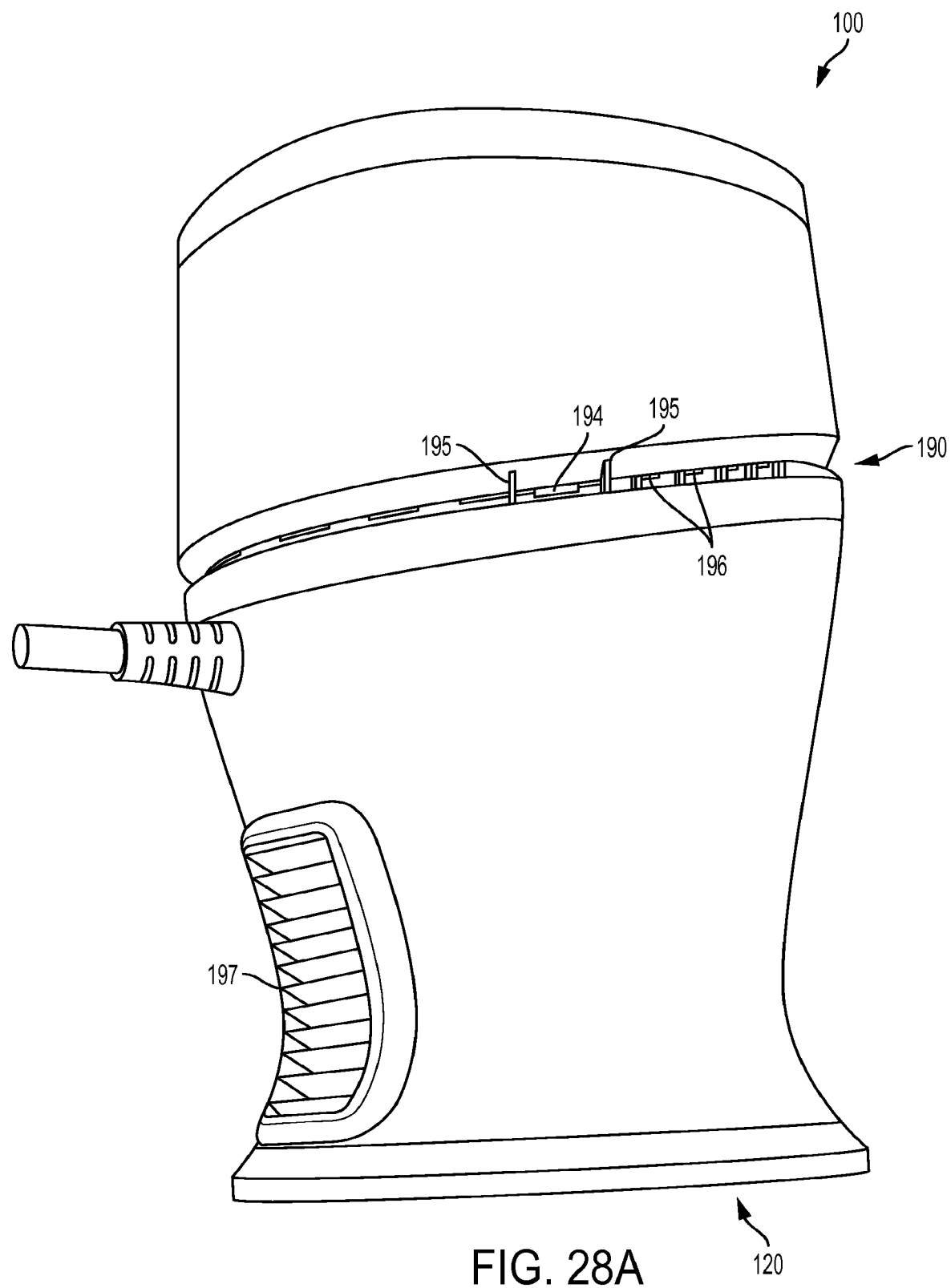
FIG. 28A is a perspective view of the ring depicted in FIG. 27A integrated into a drive unit.

As seen in FIGS. 28A-28B, which show the ring 190 integrated with the rest of the drive unit 100, the drain outlet 194 communicates with the outside of the drive unit. Liquid exiting the drain outlet 194 leaks down the side of the drive unit. In some cases, the drain outlet 194 is positioned away from the exhaust vent 197 such that liquid exiting the drain outlet 194 does not enter the drive unit through the exhaust vent 197. In some cases, allowing liquid to drain out the side of the drive unit rather than through the center of the drive unit may allow the drive unit to retain a smaller size. In some cases, arranging a liquid drain through the center of the drive unit may require the drive unit to be increased in diameter in order to accommodate the drain. However, it should be appreciated that the drain may be positioned at other locations in the drive unit. The drain may be positioned through the center of the drive unit, through more than one side of the drain unit, or any other suitable location, as this aspect is not so limited. It should be appreciated that more than one drain hole and/or drain outlet may be used, as this aspect is not so limited.

In other embodiments, the liquid exiting the drain outlet may be rerouted, or a channel may direct the drained liquid from the drain outlet to the first end 120 of the drive unit such that a user may grasp the sides of the drive unit without coming into contact with the drained liquid.

According to one aspect, in addition to an exhaust vent, in some embodiments, the drive unit may include exhaust holes to facilitate cooling of the motor housed in the drive unit. As seen in FIGS. 26B, 27A-C, and FIG. 28A, ring 190 includes a series of holes 196 arranged around the perimeter of the ring. The holes 196 communicate with the inside of the drive unit such that, in some embodiments, air entering the holes 196 flows through the inside of the drive unit and out of the exhaust vent 197 to cool the drive unit motor and the inside of the drive unit. As such, the ring may have one or more holes for air intake, as well as one or more holes for draining liquid from the drive unit. In some embodiments, the holes 196 are positioned such that liquid draining out of the drain outlet 194 is not drawn into the holes 196. As best seen in FIG. 28B, the holes 196 may be positioned at an upper surface 199 of the ring. Without wishing to be bound by theory, in some cases, positioning the holes at the upper surface of the ring may decrease the likelihood that liquid draining downward out from the drain outlet will be drawn into the holes. Alternatively or in addition, the ring 190 may include barriers 195 on either side of the drain outlet 194 that may help to prevent liquid draining out of the drain outlet 194 from being drawn into the holes 196.

In an illustrative embodiment, a drive unit is provided. The drive unit includes a drain hole at a first end portion of the drive unit that communicates with a drain outlet to guide liquid out of a side wall of the drive unit. In some embodiments, the drain outlet may be positioned above a bottom surface of the drive unit. In some embodiments, the drive unit may further include a ring comprising a plurality of air intake holes. In some cases, the drain outlet may be located on the ring.

It should be appreciated that although many of the embodiments included herein disclose a drive unit that is flipped upside-down between two different modes of operation, other arrangements are possible, as this aspect is not so limited. For example, in some embodiments, the drive unit may be arranged such that the first end of the drive unit drives a first processing tool in a first mode of operation, while the second end of the drive unit drives a second processing tool in a second mode of operation. Thus, instead of having the same end of the drive unit interact with the containers and processing tools therein, the drive unit may have a first end that interacts with a first container and a second end that interacts with a second container. In some embodiments, each end of the drive unit includes a drive coupling.

Figure 29B:
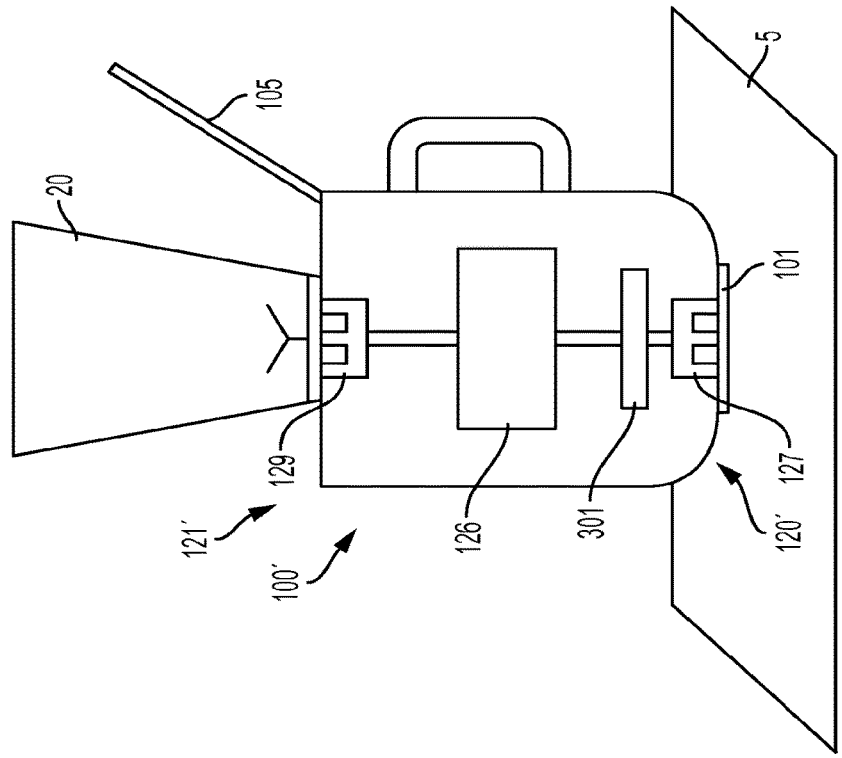
FIG. 29B is a schematic representation of the drive unit of FIG. 29A in a second mode of operation.
Figure 29A:
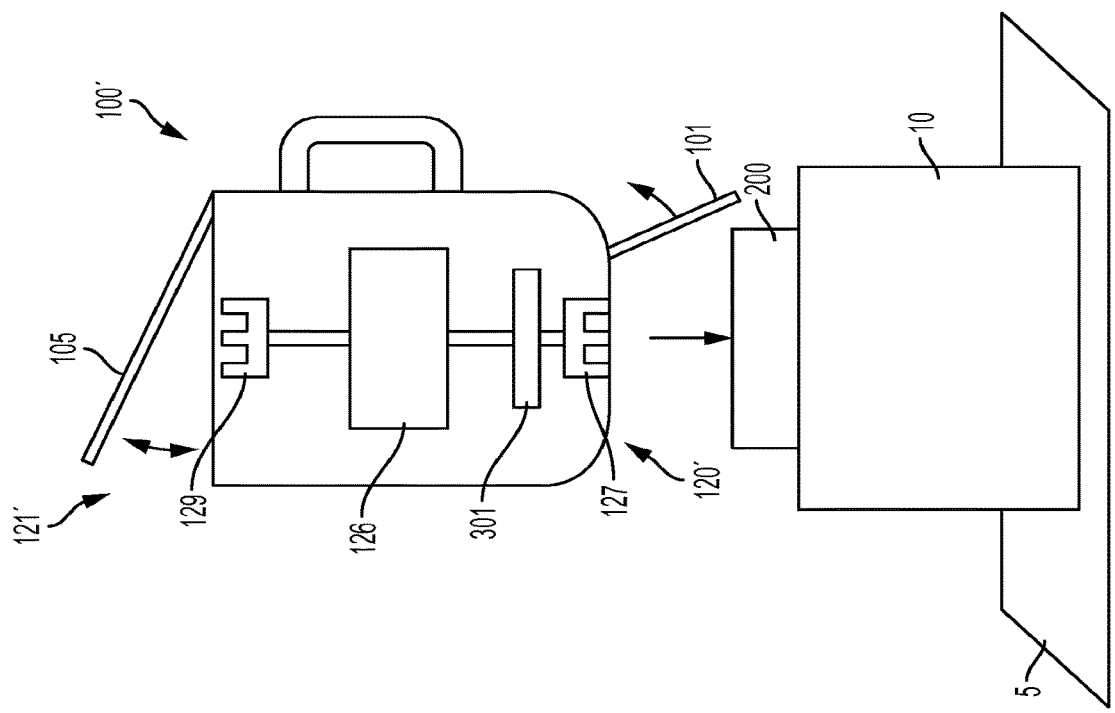
FIG. 29A is a schematic representation of another embodiment of a drive unit in a first mode of operation in accordance with one aspect.

For example, one embodiment is shown in FIGS. 29A and 29B, which depict first and second modes of operation, respectively, of a drive unit 100'. Drive unit 100' includes a first drive coupling 127 at a first end 120' of the drive unit and a second drive coupling 129 at a second end 121' of the drive unit. Both drive couplings 127, 129 are coupled to and driven by a motor 126. In some embodiments, the first drive coupling 129 is coupled to motor 126 via a transmission 301 that drives the coupling 127 at a different speed and/or direction than the output of motor 126. As seen in FIG. 29A, which depicts a first mode of operation, the first drive coupling 127 couples to a lid 200 of a container 10. In some embodiments, the drive coupling 127 may couple directly to a processing tool located within container 10. As seen in FIG. 29B, which depicts a second mode of operation, the second drive coupling 129 couples to a processing tool located within a second container 20. In this embodiment, the drive unit 100' remains in the same orientation relative to a support surface 5 when switched between the first and second modes of operation, rather than being flipped upside-down. In some embodiments, the drive unit 100' may include a first lid 101 to cover the first end 120' when the first drive coupling 127 is not in use. The drive unit 100' may also include a second lid 105 to cover the second end 121' when the second drive coupling 129 is not in use.

Figure 30:
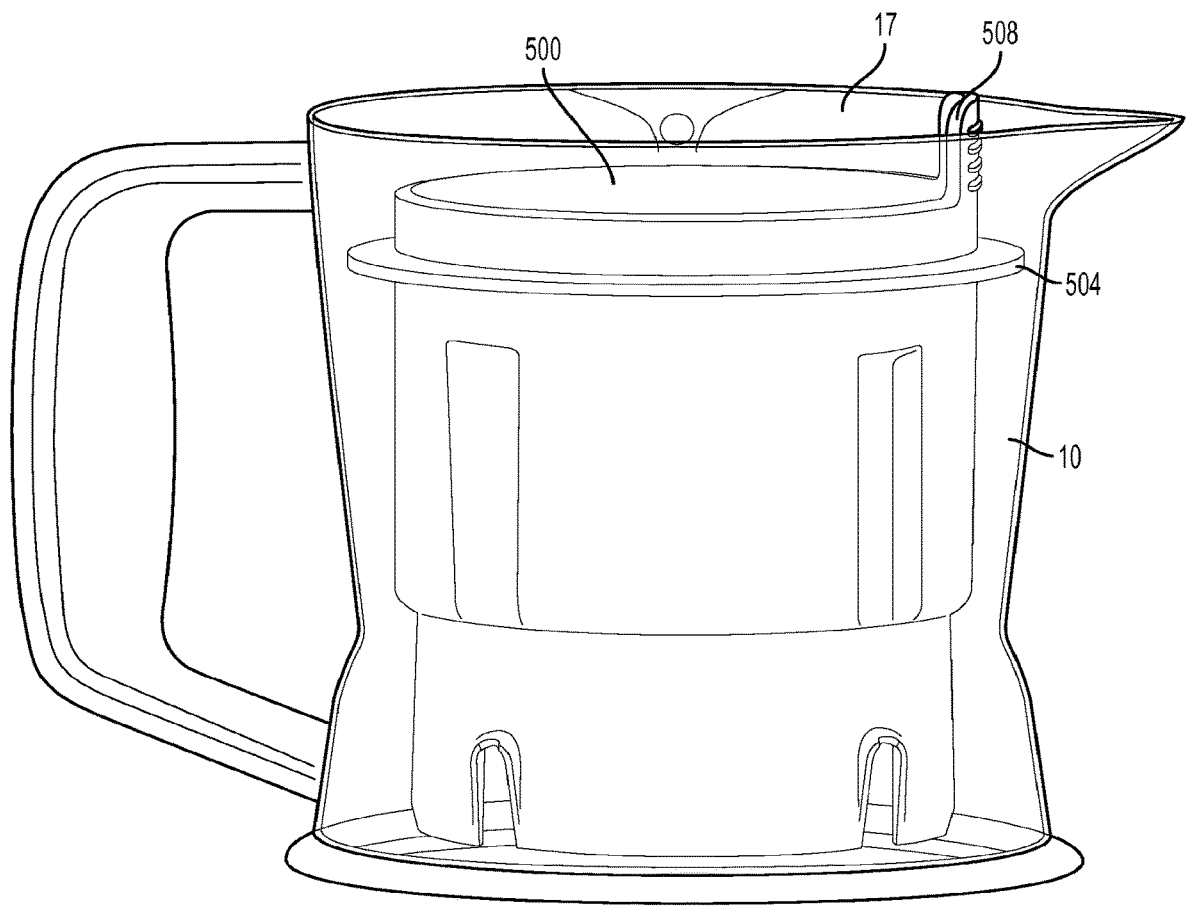
FIG. 30 is a perspective view of a bowl nested within a container according to one embodiment.

In some embodiments, as shown in FIG. 30, the food processing apparatus may include a bowl 500 that can be nested within the container 10 (e.g., the first container 10). In such an embodiment, the bowl may be used by a user to keep the container clean and/or to store or serve a food item prepared by the food processing apparatus. When the bowl and container are nested together it may be difficult to remove the bowl from the container because of the size of the bowl and the position of the bowl within the container. To address this issue, the bowl may include a tab 508 to facilitate removal of the bowl from the container. In some embodiments, the tab 508 includes surface features, for example, a frictional tab surface, to facilitate gripping of the tab.

Figure 31:
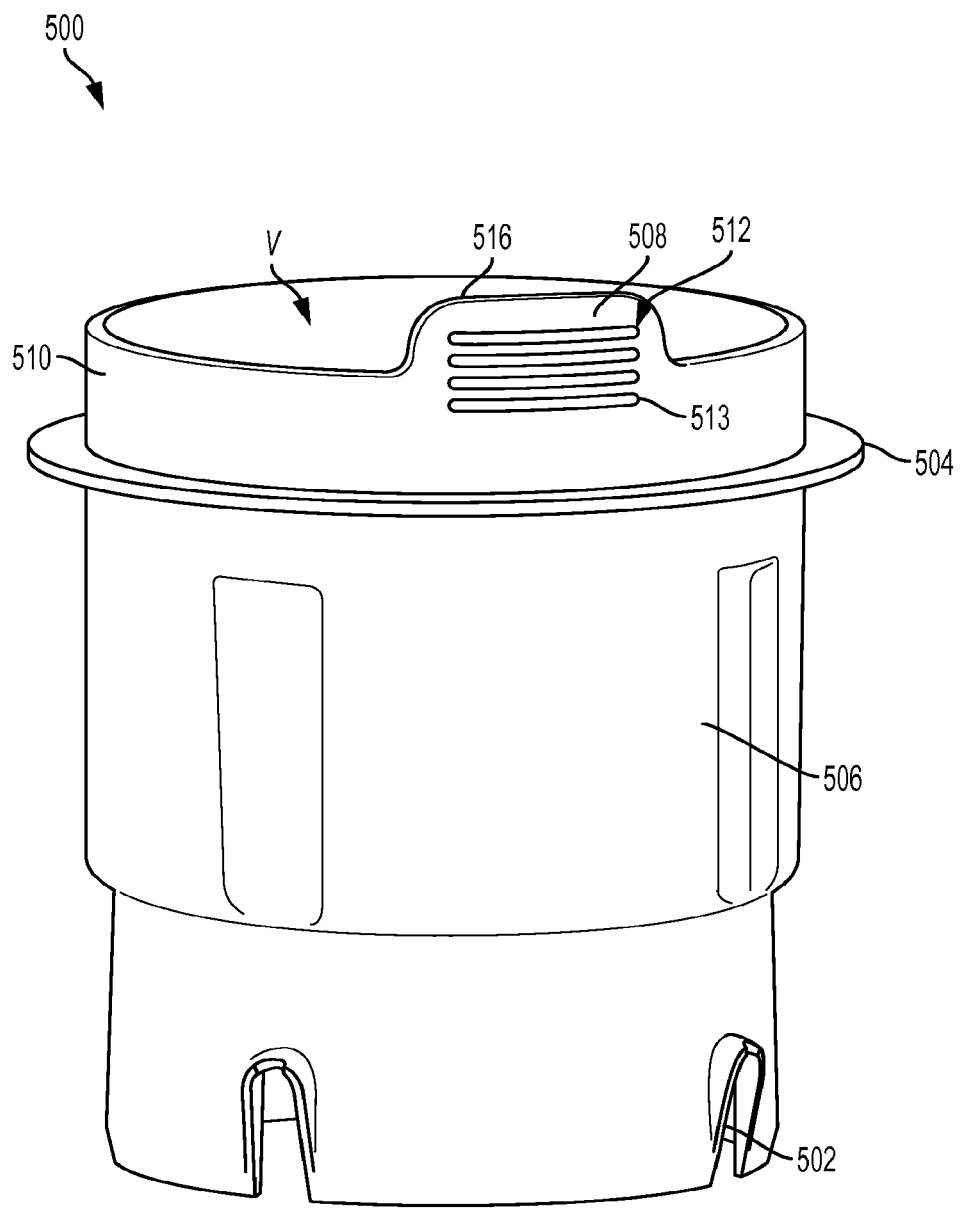
FIG. 31 is a perspective view of a bowl including a lifting tab according to one embodiment.

The bowl 500 may be removably engaged with the container 10 via engagement portions 502 (see FIG. 31). The bowl 500 has a volume V and, in some embodiments, the volume V of the bowl 500 is different than the volume of the container 10. In some embodiments, a user may select to use a bowl having a volume sized to accommodate the food he will be preparing (e.g., a bowl 500 that is smaller than the container). In another embodiment, the volume of the bowl 500 may be substantially the same as the volume of the container 10 and used to keep the container clean. The bowl 500 also may be configured such that the bowl 500 may be used for serving or storing a food item prepared by the food processing apparatus.

As shown in FIG. 31, the bowl 500 includes a ledge 504, which extends outwardly from an exterior surface 506 of the bowl 500. As shown, the ledge 504 may extend horizontally from the exterior surface 506 of the bowl 500, although the ledge 504 also may extend in other directions. In some embodiments, the ledge 504 of the bowl 500 may be configured to rest on a corresponding ledge (not shown) of the container 10 to allow the bowl 500 to be nested within the container 10. The corresponding ledge of the container 10 may extend inwardly from an interior surface 17 of the container 10. In other embodiments, the ledge 504 of the bowl is configured to position the bowl 500 inside the container (e.g., with respect to the interior surface of the container) when the bowl 500 is nested within the container.

In some embodiments, the bowl 500 includes the tab 508 to facilitate insertion and/or removal of the bowl 500 from the container 10. In some embodiments, the tab 508 extends vertically from a rim 510 of the bowl 500. As shown in FIG. 31, the rim 510 of the bowl 500 may be located above the ledge 504.

The tab 508 may have any shape and size suitable for inserting and/or removing the bowl 500 from the container 10. As shown, in one embodiment, the tab 508 has a substantially rectangular shape. The tab 508 may instead have a circular, semicircular, oval, triangular, square, other polygonal shape, or other suitable. The tab 508 may be curved to match the contour of the exterior surface 506 of the bowl 500. In some embodiments (see, e.g., FIG. 32A), the tab 508 has a length $L_T$ of between about 0.5 inches and 3 inches, although other suitable lengths may be used. In some embodiments, the tab 508 has a height $H_T$ of between about 0.1 inches and 2 inches.

Figure 32A:
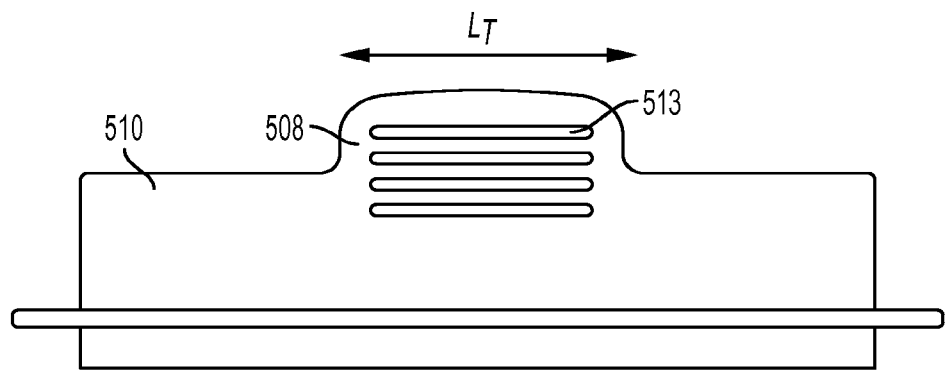
FIG. 32A is a front view of the tab of FIG. 31.
Figure 32B:
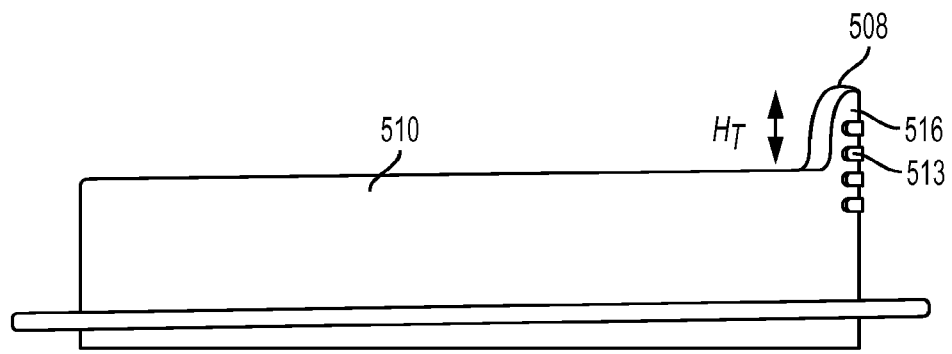
FIG. 32B is a side view of the tab of FIG. 31.

In some embodiments, the tab 508 includes surface features 513 to facilitate gripping of the tab 508. As is shown in FIGS. 32A and 32B, in one embodiment, the surface features 513 are raised ridges 513, though other suitable surface features 513 may be used. For example, in some embodiments, the surface features 513 may include surface roughness or surface textures that facilitate gripping of the tab 508 by creating a frictional tab surface. Although the surface features 513 are included on only one side of the tab 508 in these embodiments, in other embodiments, the surface features 513 may be included on one or both sides of the tab 508.

As shown in FIG. 30, in some embodiments, the tab 508 is configured to extend above the top of the container 10, such that the tab is easily accessible when the bowl 500 and container 10 are nested. In such an embodiment, as will be appreciated, the lid 200 of the container also is configured to extend above the top of the container 10, thus allowing the tab 508 to be covered while the food processing apparatus is in use. In other embodiments, the tab 508 is configured such that the top 516 of the tab 508 is aligned with the top of the container 10. In such an embodiment, the tab 508 is positioned inwardly from the interior surface of the container 10 such that a user can access the tab 508 once the bowl 500 and container 10 are nested.

A user may grasp the tab 508 with his/her fingers and insert the bowl 500 into the container 10 until the bowl 500 and container 10 are nested, for example, until the ledge 504 of the bowl 500 is resting against a ledge (not shown) of the container 10. In another example, the user may grasp the tab 508 with his/her fingers and insert the bowl 500 into the container until the bottom of the bowl is in contact with the bottom of the container and the ledge is in contact with the interior surface 17 of the container 10. Once the bowl 500 and container 10 are nested, the user may place the lid 200 and drive unit 100 on the container and may use the food processing apparatus to prepare the desired food. Once finished, the user can remove the lid (and drive unit 100) to reveal the nested bowl 500 and container 10. To remove the bowl 500, the user grasps the tab 508 with his/her fingers and pulls upwardly on the tab 508 to remove the bowl 500 from the container 10.

According to one embodiment, a food processor, such as a blender, includes a first container and a second container. The second container is insertable within the first container. The container has a side wall having an upper rim and a protrusion extending upwardly from the upper second rim. The protrusion is large enough to be pinched between two adult fingers. In some embodiments, the protrusion includes a grip feature on one or both sides.

Figure 33:
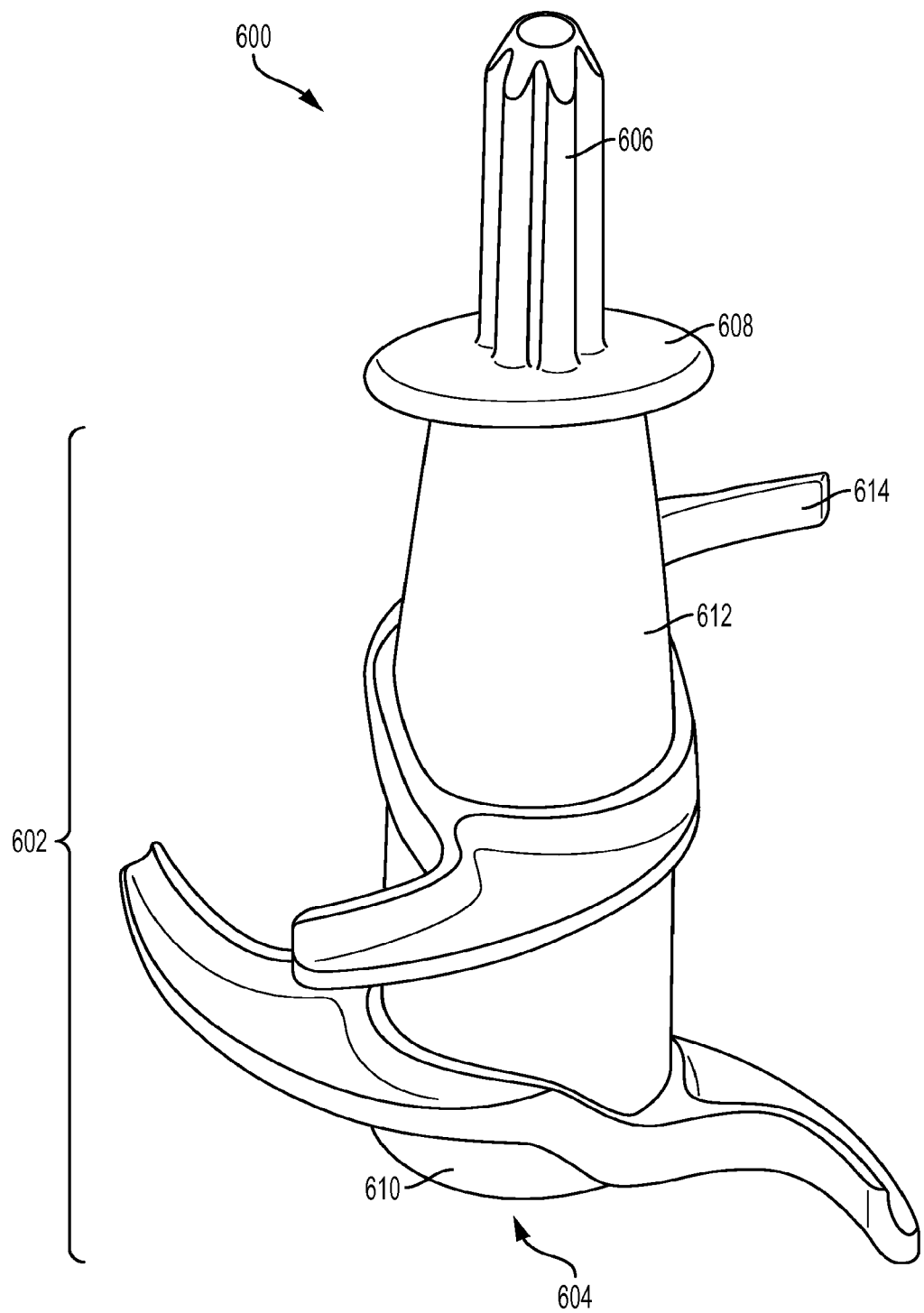
FIG. 33 is a top perspective view of a dough hook having a grasping disc according to one embodiment.

In some embodiments, the food processing apparatus also includes a processing tool. In one embodiment, as shown in FIG. 33, the processing tool is a dough hook 600 which can be removably coupled to a container of the apparatus. In some embodiments, it can difficult to remove the dough hook 600 from the container 10 (e.g., the first container 10) because a vacuum suction is formed by the dough within the container. That is, in some circumstances, it is difficult to pull the dough hook 600 from the container 10 because the dough hook is embedded in the dough, and the dough seals against the inner wall of the container. To address this issue, the dough hook 600 is provided with a grasping portion, such as a grasping disc 608, to facilitate removal of the dough hook 600 from the container 10.

As shown, the dough hook includes a blade assembly 602, coupling portions 604, 606, and the grasping disc 608. A first coupling portion 604 (see FIG. 34), located at a bottom 610 of the dough hook 600, allows the dough hook 600 to be coupled to the bottom of the container 10. In some embodiments, as shown, the dough hook 600 also has a second coupling portion 606 for coupling the dough hook 600 to the lid 200 of the apparatus, or, in some embodiments, to an output coupling 320 of the lid 200, or to a drive coupling 124 of the drive unit 100. As with previous embodiments, the lid 200 may be coupled to the drive unit 100.

Figure 34:
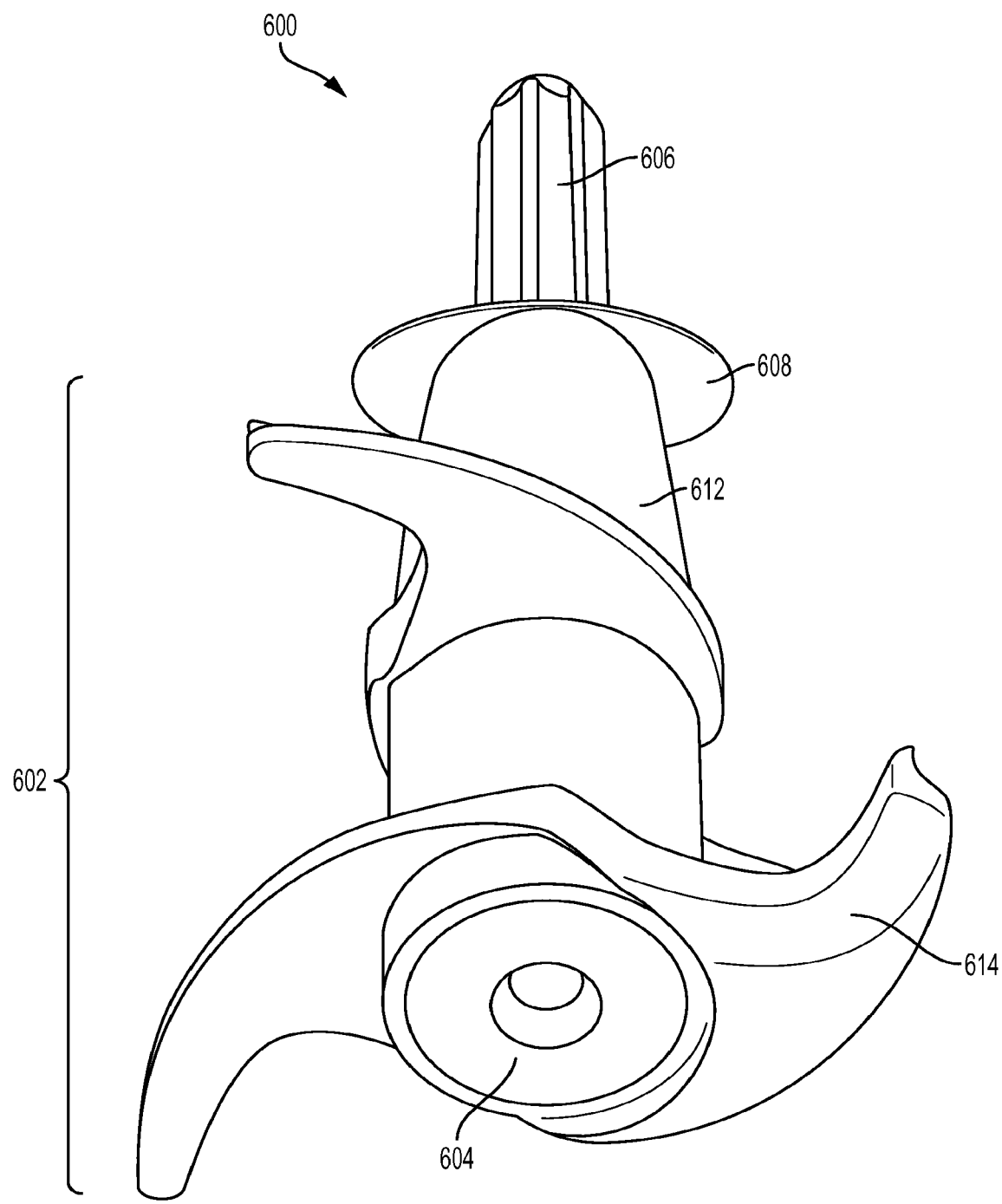
FIG. 34 is a bottom perspective view of the dough hook of FIG. 33.

As shown in FIGS. 33 and 34, the blade assembly 602 includes a shaft 612 with at least one blade 614 extending outwardly from the shaft 612. In one embodiment, as shown, the blade assembly 602 includes four blades 614, though the blade assembly 602 also may include more or fewer blades. In some embodiments, the first coupling portion 604 is coupled to the shaft 612 of the blade assembly 602 (e.g., to a bottom of the shaft 612). The first coupling portion 604 may be integral with the shaft 612 in some embodiments, though the first coupling portion 604 may be a separate piece that is connected thereto. Similarly, in embodiments having the second coupling portion 606, the second coupling portion 606 may be coupled to the shaft 612 of the blade assembly 602 or may be integral with the shaft 612.

As shown in FIGS. 33 and 34, the grasping disc 608 may be connected to the blade assembly 602, and, in some embodiments, the grasping disc 608 may be coupled to the shaft 612 of the blade assembly 602. The grasping disc 608 and blade assembly 602 may be formed integrally with one another, although the grasping disc 608 also may be a separate part attached thereto. As shown, in embodiments having the second coupling portion 606, the grasping disc 608 may be located between the blade assembly 602 and the second coupling portion 606. In some embodiments, the grasping disc 608 is positioned a distance from and, in some embodiments, a substantial distance from, the blades 614 of the blade assembly 602. In such an embodiment, the grasping disc 608 is positioned such that the user will not place his/her fingers near the blades 614 when using the grasping disc 608 to remove the dough hook 600 from the container 10.

Figure 35A:
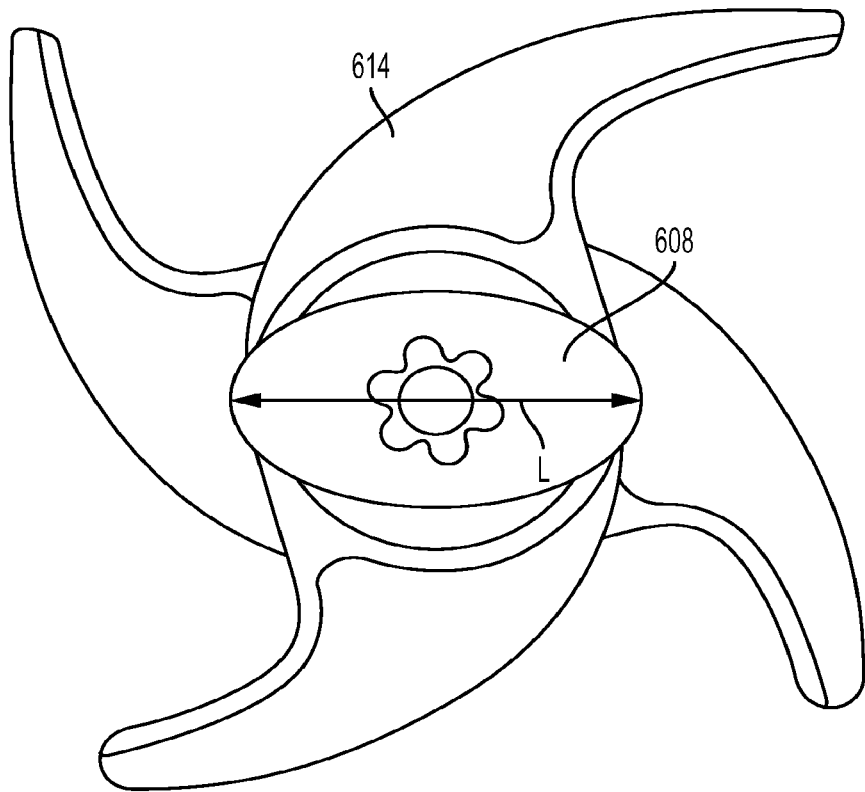
FIG. 35A is a top view of the dough hook of FIG. 33.

In some embodiments, as shown in FIG. 35A by way of example, the grasping disc 608 has a substantially oval shape, though the grasping disc 608 can have other suitable shapes. For example, in some embodiments, the grasping disc 608 may have a square, rectangular, circular, triangular, other polygonal shape, or other suitable shape.

Figure 35B:
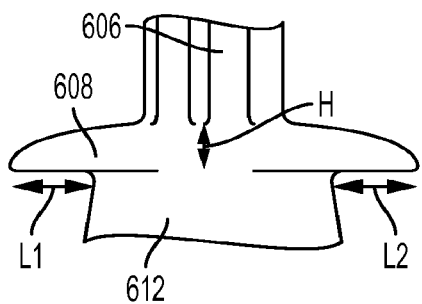
FIG. 35B is a side view of the grasping disc of FIG. 33.
Figure 35C:
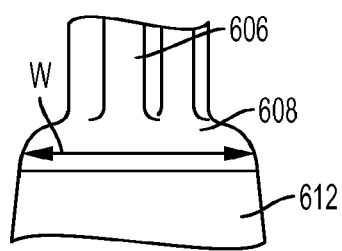
FIG. 35C is a side view of the grasping disc of FIG. 33.

As illustrated in FIGS. 35A-35C, the grasping disc 608 has a length L, a width W, and a height H. As is shown in FIGS. 35A and 35B, the grasping disc 608 may have any suitable length L. For example, in some embodiments, the length L of the grasping disc 608 may be between about 0.75 inches and 3 inches. In some embodiments, the grasping disc 608 is centered on the shaft 612 of the blade assembly 612 such that the length L of the grasping disc 608 is evenly distributed across the shaft 612. Stated differently, as shown, the grasping disc 608 may be coupled to the shaft 612 such that a first length L1 of the grasping disc 608 extending beyond one side of the shaft 612 is substantially the same as a second length L2 of the grasping disc 608 extending beyond the other side of the shaft 612. In other embodiments, the first length L1 and the second length L2 may differ.

The grasping disc 608 also may have any suitable width W, for example, in some embodiments, the width W of the grasping disc 608 may be between about 0.25 inches and 2 inches. In some embodiments, as shown in FIG. 35C, the width W of the grasping disc 608 may be the same as a width of the shaft 612, while in other embodiments, the grasping disc 608 also may differ from the width of the shaft 612.

As shown in FIG. 35B, the grasping disc 608 may have any suitable height H, for example, in some embodiments, the height H of the grasping disc 608 is between about 0.05 inches and about 1 inch. The height H of the grasping disc 608 may be constant across the length L of the grasping disc 608 (e.g., the grasping disc 608 may have a substantially rectangular cross section), while in other embodiments, the height H of the grasping disc 608 also may vary across the length L of the grasping disc 608. For example, as is shown in FIG. 35B, in some embodiments the width W of the grasping disc 608 is largest in a middle of the grasping disc 608 and is smallest at ends of the grasping disc 608. That is, the height H of the grasping disc 608 may taper from the middle of the grasping disc 608 to the ends of the grasping disc 608.

To use the grasping disc 608 to remove the dough hook 600 from the container, a user may place his/her fingers under the grasping disc 608. In one embodiment, the user places at least one finger under the first length L1 of the grasping disc 608 and at least one finger under the second length L2 of the grasping disc 608. Next, the user lifts his/her hand to remove the dough hook 600 from the container 10. In another embodiment, the user grasps the grasping disc 608 from above and pulls the grasping disc 608 to pull the dough hook 600 from the container.

Although the grasping disc 608 has been shown and described on the dough hook 600, the grasping disc 608 also may be used with other processing tools to facilitate removal of the processing tool from the container 10. For example, in another embodiment, the grasping disc may be used with a dicing assembly.

According to one embodiment, a processing tool assembly for a food processor, such as a blender, includes a shaft and a processing tool mounted thereto. The processing tool assembly includes a grasping portion positioned higher on the shaft than the processing tool when the assembly is in a use position in the food processor. The grasping portion protrudes outwardly from the shaft. The outward protrusion may be substantially perpendicular or perpendicular to the lengthwise direction of the shaft. In some embodiments, the grasping portion may protrude outwardly at an angle other than ninety degrees relative to the lengthwise direction of the shaft. The grasping portion may provide a first surface area on a first side of the shaft, and a second surface area on a second side of the shaft, wherein each of the first and second surface areas is sized to accommodate an adult's finger, and faces at least partially downwardly. The first and second surface areas may be curved or flat.

The above described components may be made with various materials, as the invention is not necessarily so limited.

The above aspects may be employed in any suitable combination, as the present invention is not limited in this respect. Additionally, any or all of the above aspects may be employed in a food processing apparatus; however, the present invention is not limited in this respect, as the above aspects may be employed to process materials other than food.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:
    arranging a drive unit in a first mode of operation with a first container where the first container supports the drive unit on a support surface;
    interacting with a first activation site to actuate the drive unit in the first mode of operation;
    removing the drive unit from the first container;
    vertically flipping the drive unit upside-down;
    placing the drive unit on the support surface;
    arranging the drive unit in a second mode of operation with a second container where the drive unit supports the second container; and
    interacting with a second activation site to actuate the drive unit in the second mode of operation, the second activation site being positioned at a different location than the first activation site.

2. The method of claim 1, wherein the first activation site comprises a button on the drive unit.

3. The method of claim 2, wherein interacting with the first activation site comprises pressing the button.

4. The method of claim 1, wherein the second activation site comprises a surface on the second container.

5. The method of claim 4, wherein interacting with the second activation site comprises pressing on the surface of the second container.

6. The method of claim 1, wherein interacting with the first activation site causes a first switch in the drive unit to close, which actuates the drive unit.

7. The method of claim 1, wherein interacting with the second activation site causes a second switch in the drive unit to close, which actuates the drive unit.

8. The method of claim 7, wherein interacting with the second activation site causes the first switch in the drive unit to close, which actuates the drive unit.

9. The method of claim 1, wherein:
    in the first mode of operation, the first activation site is accessible by a user; and
    in the second mode of operation, a user is prevented from activating the first activation site when the drive unit is placed in an upright position on the support surface.

* * * * *